US009588686B2

(12) United States Patent
Baptist et al.

(10) Patent No.: US 9,588,686 B2
(45) Date of Patent: Mar. 7, 2017

(54) ADJUSTING EXECUTION OF TASKS IN A DISPERSED STORAGE NETWORK

(71) Applicant: CLEVERSAFE, INC., Chicago, IL (US)

(72) Inventors: Andrew Baptist, Mt. Pleasant, WI (US); Ilya Volvovski, Chicago, IL (US); Joseph Martin Kaczmarek, Chicago, IL (US); Yogesh Ramesh Vedpathak, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 14/452,475

(22) Filed: Aug. 5, 2014

(65) Prior Publication Data
US 2015/0100966 A1    Apr. 9, 2015

Related U.S. Application Data

(60) Provisional application No. 61/886,452, filed on Oct. 3, 2013.

(51) Int. Cl.
*G06F 9/46* (2006.01)
*G06F 3/06* (2006.01)
(Continued)

(52) U.S. Cl.
CPC ............ *G06F 3/0604* (2013.01); *G06F 3/067* (2013.01); *G06F 3/0611* (2013.01);
(Continued)

(58) Field of Classification Search
None
See application file for complete search history.

(56) References Cited

U.S. PATENT DOCUMENTS 4,092,732 A    5/1978  Ouchi
5,454,101 A    9/1995  Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Gregory A Kessler
(74) *Attorney, Agent, or Firm* — Garlick & Markison; Timothy W. Markison; Randy W. Lacasse

(57) ABSTRACT

A method includes a set of execution units of a dispersed storage network (DSN) receiving sets of sub-task requests from a computing device and storing the sets of sub-task requests, where each execution unit stores a request of each of the sets of sub-task requests to produce a corresponding plurality of sub-task requests. The method continues with each execution unit generating sub-task estimation data and adjusting timing, sequencing, or processing of the corresponding plurality of sub-task requests based on the estimation data to produce a plurality of partial results, where, due to one or more difference factors from a list of difference factors, the execution units process pluralities of sub-task requests at difference paces, where the list of difference factors includes differences in amounts of data to be processed per sub-task request, processing capabilities, memory storage capabilities, and networking capabilities.

18 Claims, 60 Drawing Sheets

(51) Int. Cl.
*H04L 29/08* (2006.01)
*G06F 11/10* (2006.01)
*G06F 9/48* (2006.01)
*G06F 12/14* (2006.01)
*G06F 21/31* (2013.01)
*G06F 21/62* (2013.01)

(52) U.S. Cl.
CPC .......... *G06F 3/0647* (2013.01); *G06F 3/0655* (2013.01); *G06F 3/0665* (2013.01); *G06F 3/0689* (2013.01); *G06F 9/4881* (2013.01); *G06F 11/1076* (2013.01); *G06F 12/1458* (2013.01); *G06F 21/31* (2013.01); *G06F 21/6272* (2013.01); *H04L 67/1002* (2013.01); *H04L 67/1095* (2013.01); *H04L 67/1097* (2013.01); *H04L 67/145* (2013.01); *G06F 2003/0698* (2013.01); *G06F 2212/1052* (2013.01); *G06F 2212/154* (2013.01); *G06F 2221/2149* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0115143 A1* | 5/2008 | Shimizu | G06F 9/5066 718/105 |
| 2008/0127193 A1* | 5/2008 | Ishisaka | G06F 9/4881 718/103 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2013/0198756 A1* | 8/2013 | Grube | G06F 11/2094 718/104 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

DST allocation info 242 | data partition info 320: data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-4_z & R1-3_5 - R1-3_z | 1_1, 2_1, 3_1, 4_1, & 5_1 1_2, 2_2, 6_1, 7_1, & 7_2 | R1-4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 2_3, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 4_2, & 5_2 | R3-2 | DST unit 5 | DST unit 5 | DST units 5, 6, 1-3 |

FIG. 32

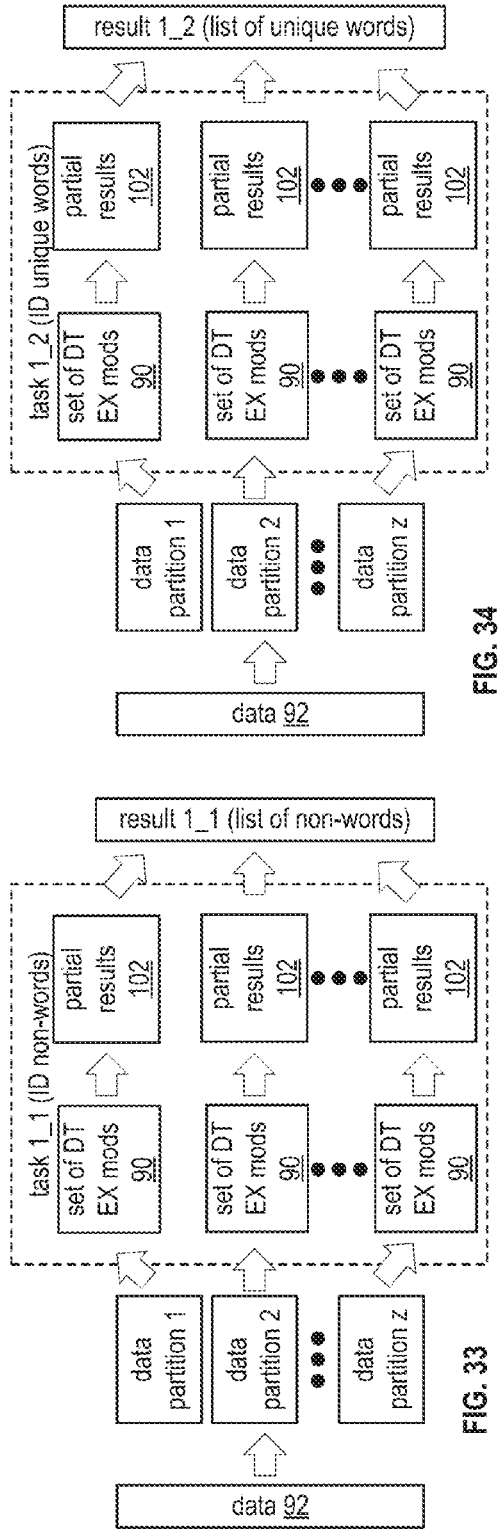

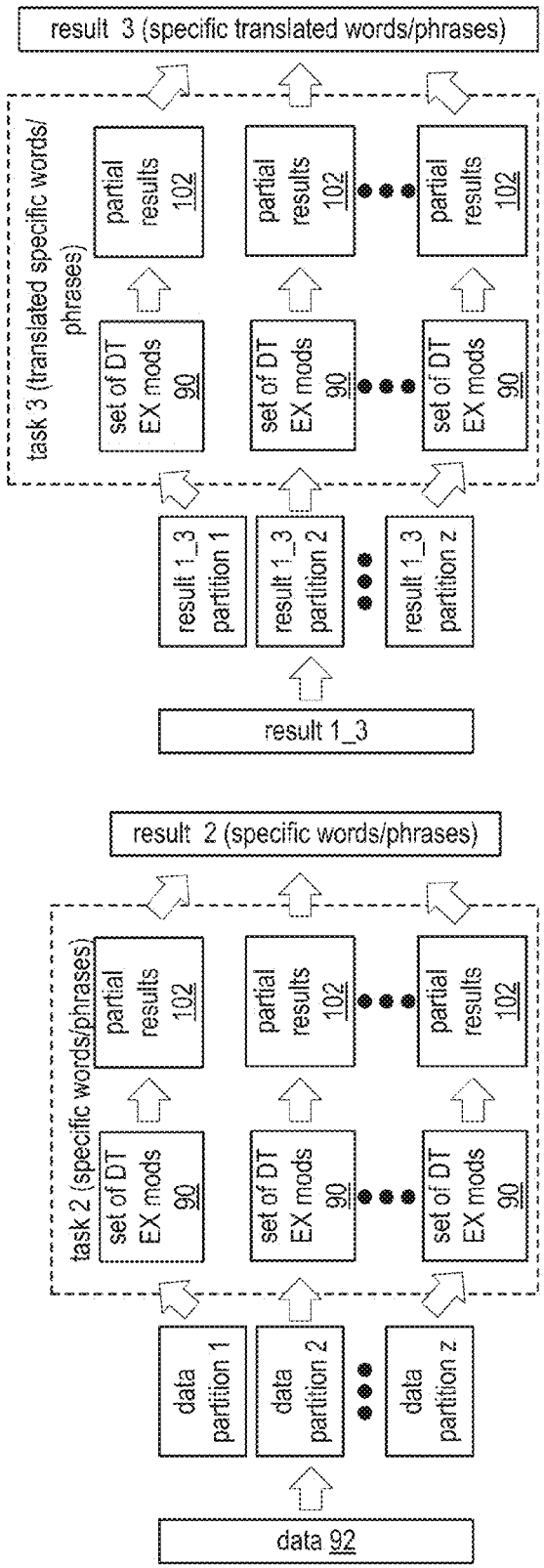
FIG. 38
FIG. 37
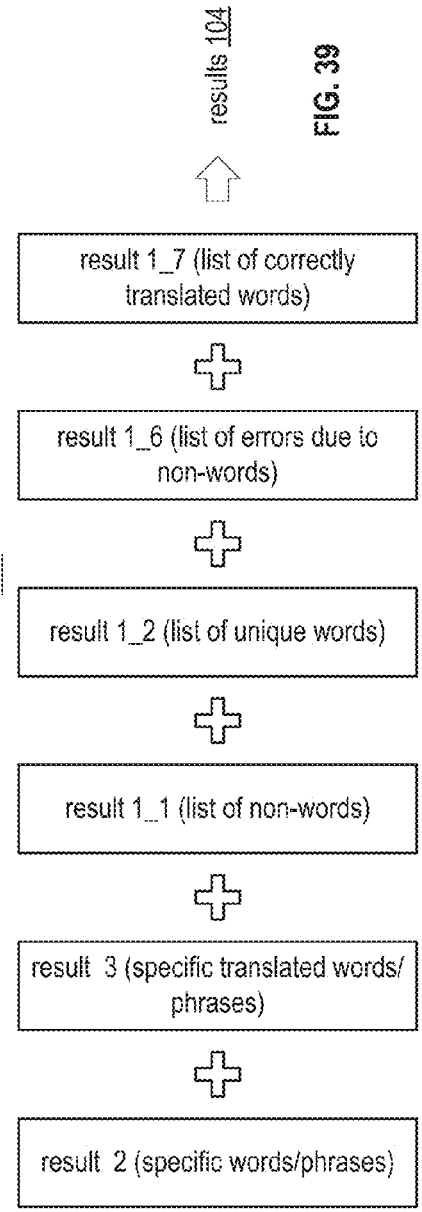
FIG. 39

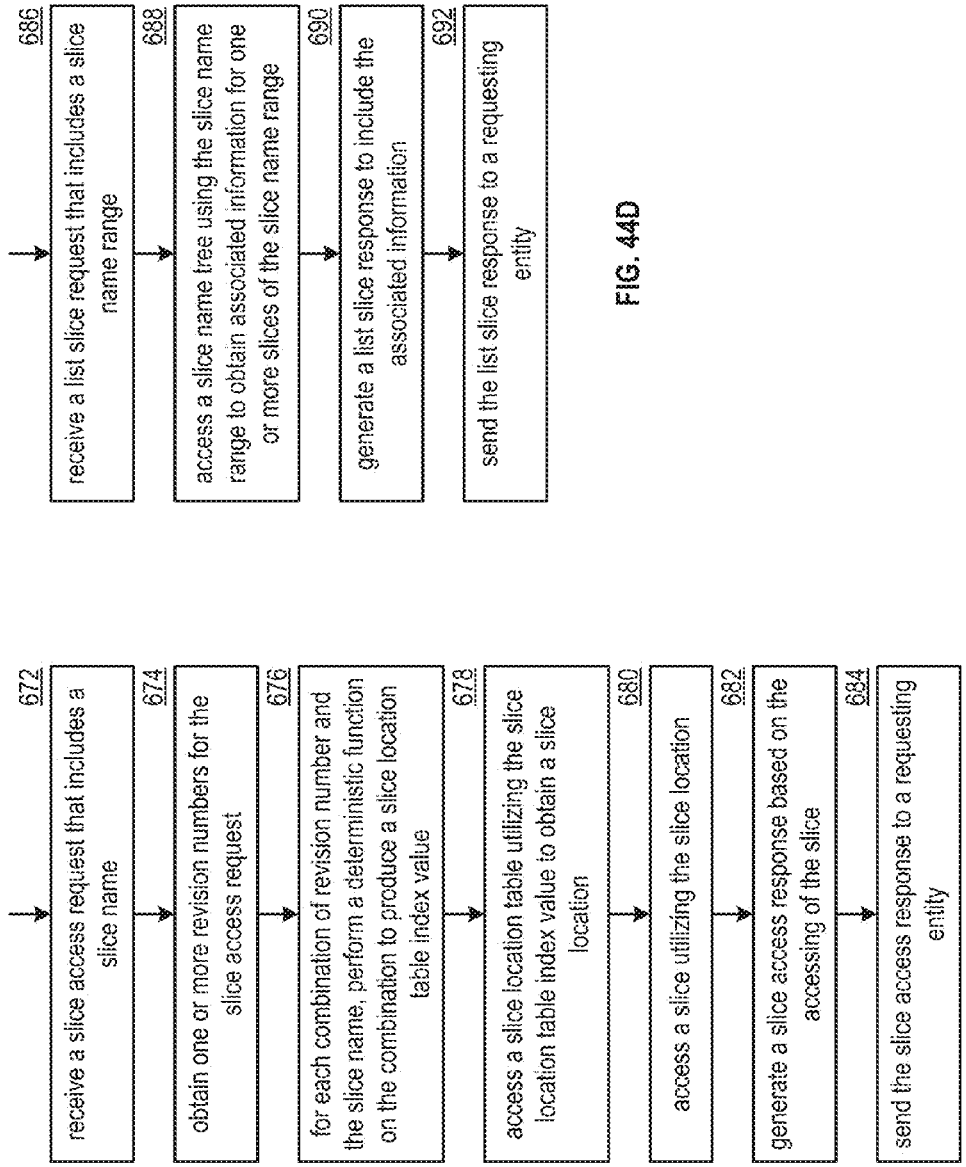

ADJUSTING EXECUTION OF TASKS IN A DISPERSED STORAGE NETWORK

CROSS REFERENCE TO RELATED PATENTS

The present U.S. Utility Patent Application claims priority pursuant to 35 U.S.C. §119(e) to U.S. Provisional Application No. 61/886,452, entitled "ACCESSING A VAULT OF A DISPERSED STORAGE NETWORK", filed Oct. 3, 2013, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 44C is a flowchart illustrating an example of accessing encoded data slices in accordance with the present invention;

FIG. 44D is a flowchart illustrating an example of listing encoded data slices in accordance with the present invention;

Figure 46A:
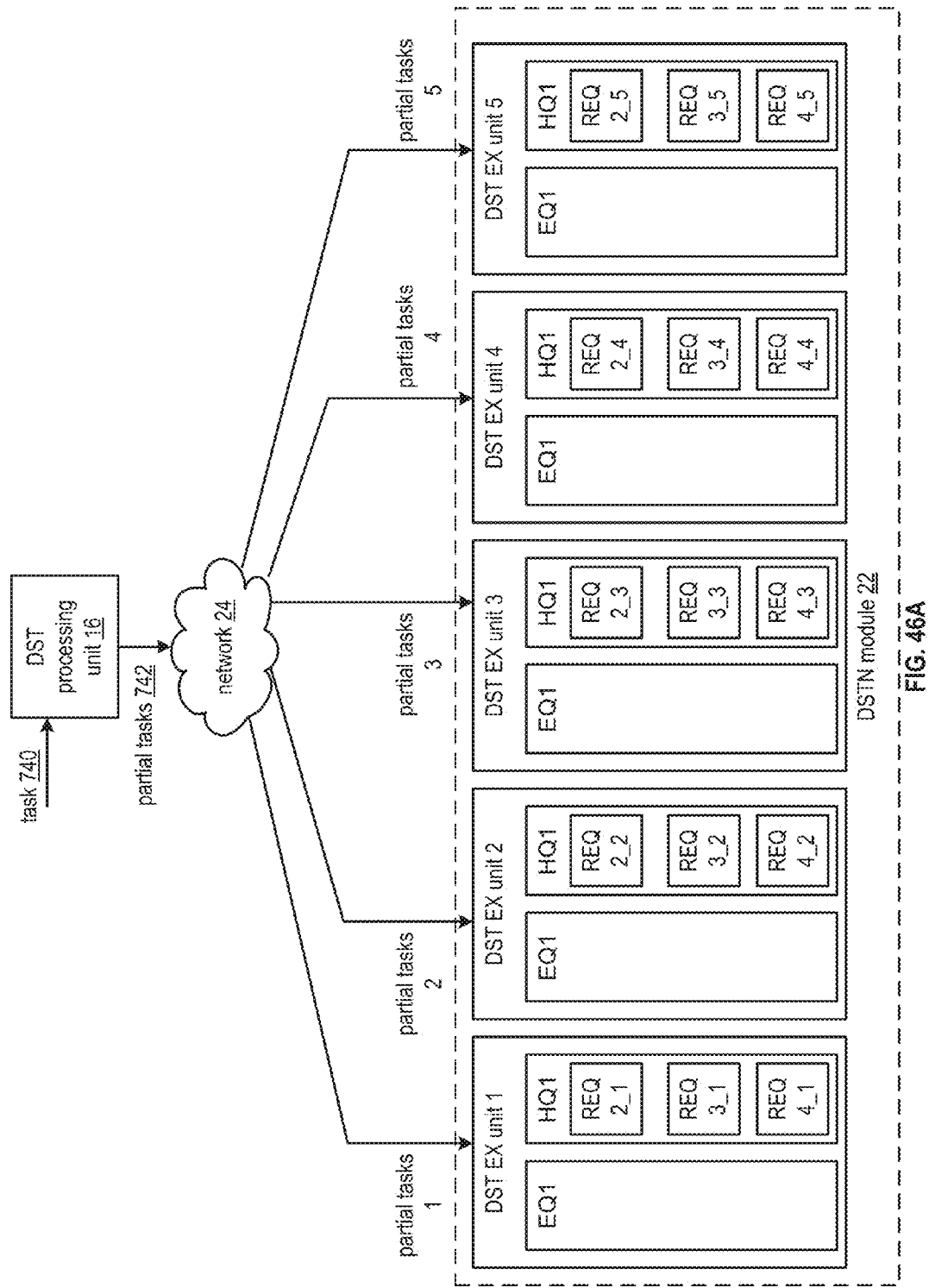
Figure 46B:
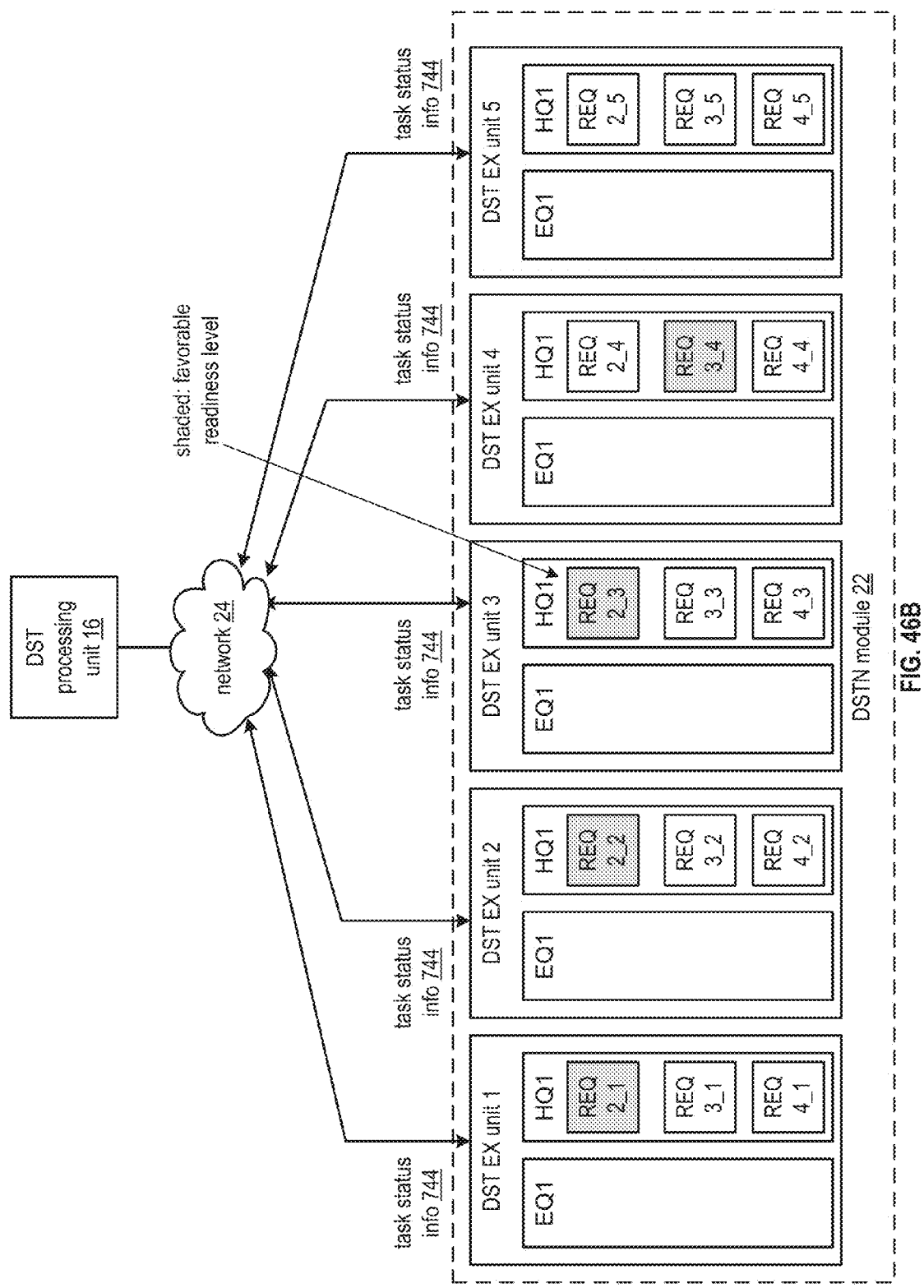
Figure 46C:
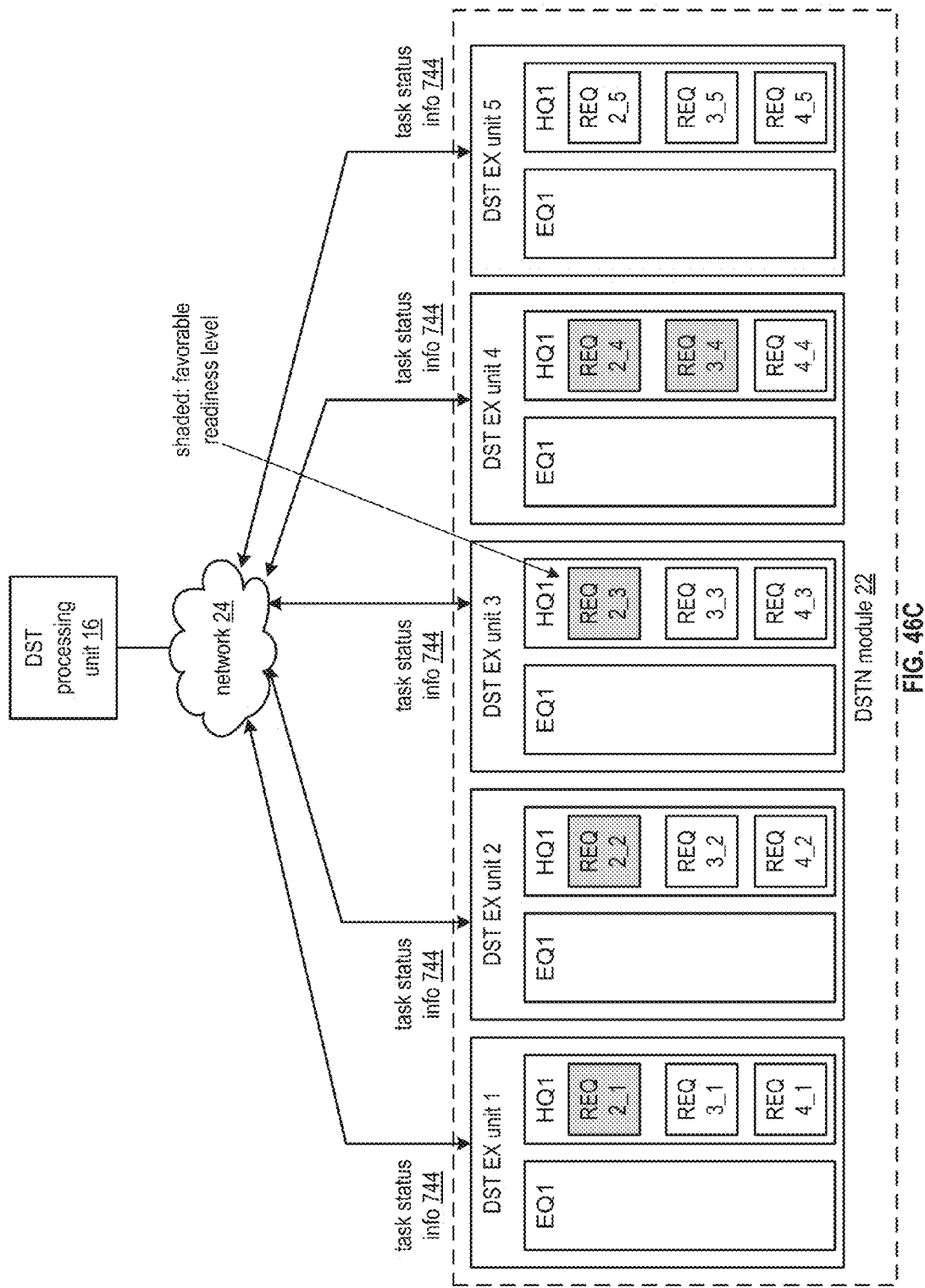
Figure 46D:
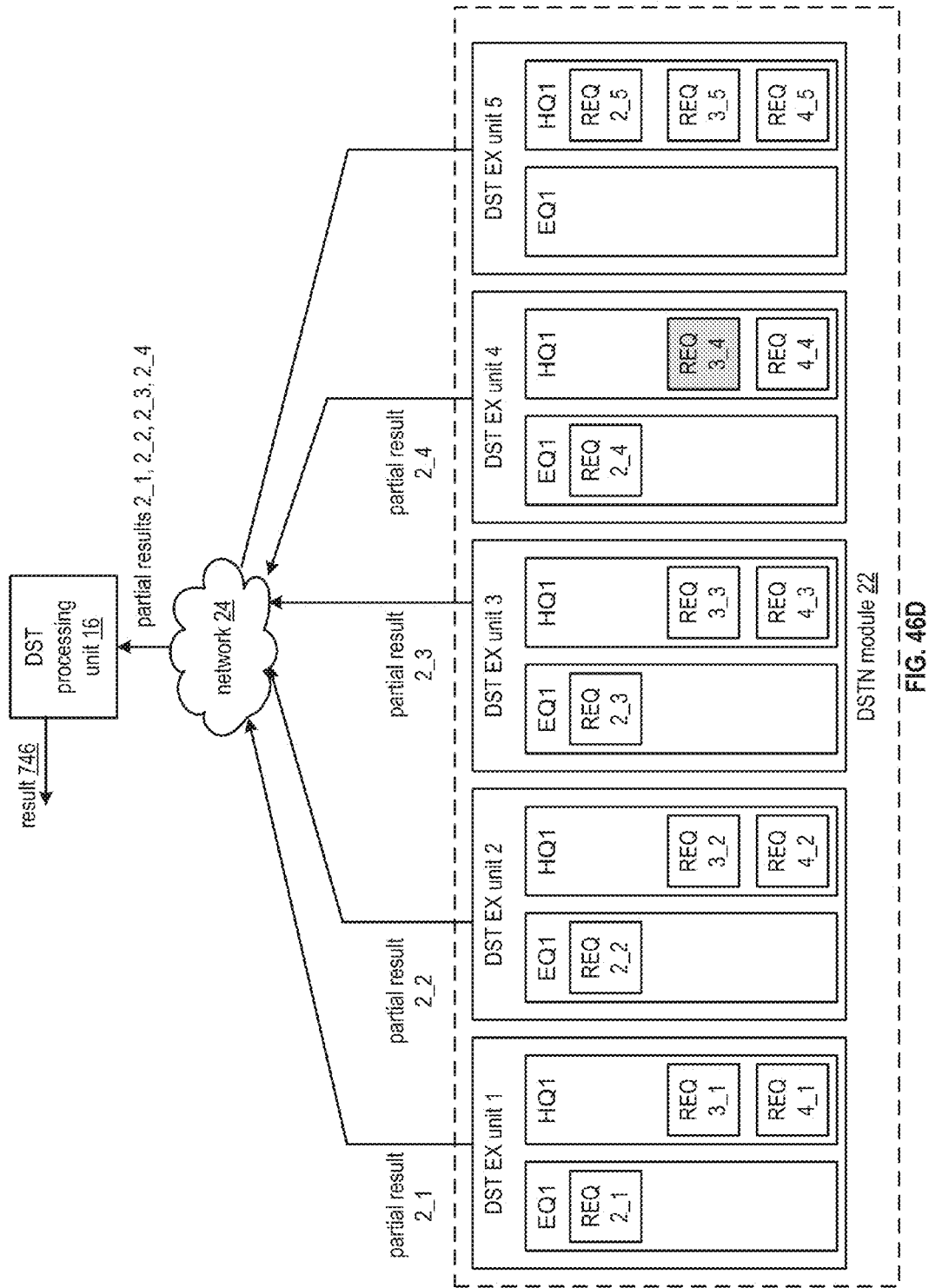
Figure 46E:
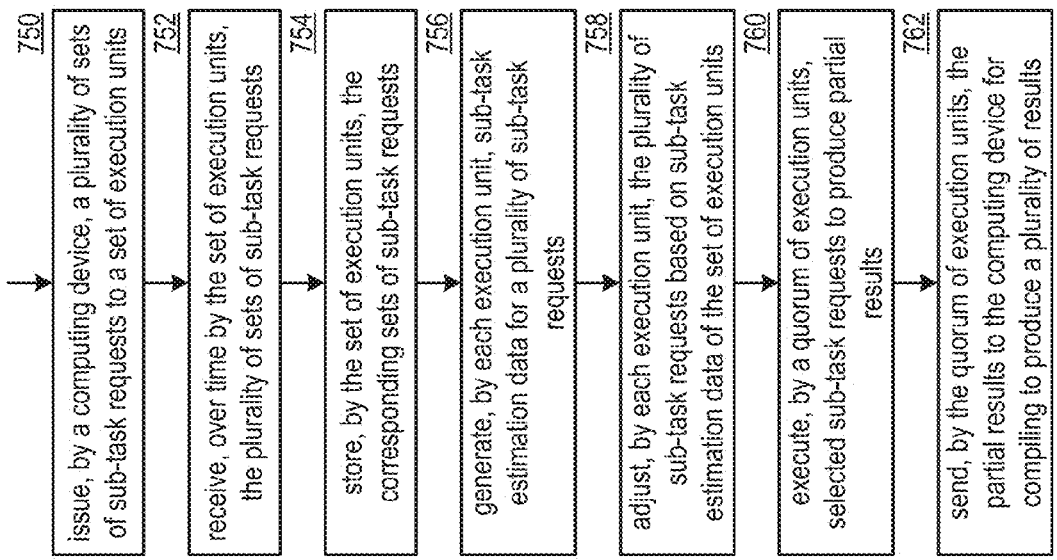
Figure 47A:
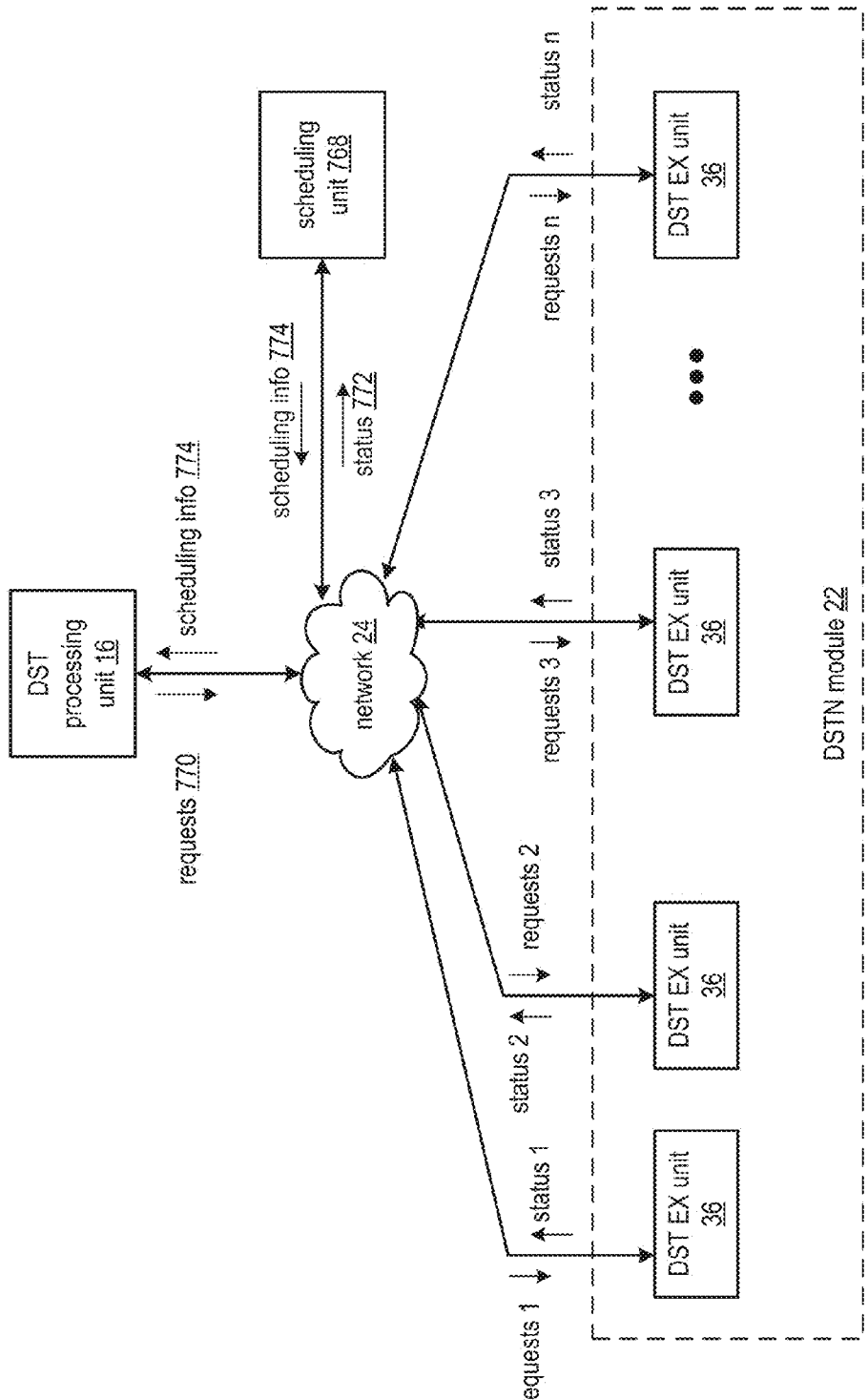
Figure 47B:
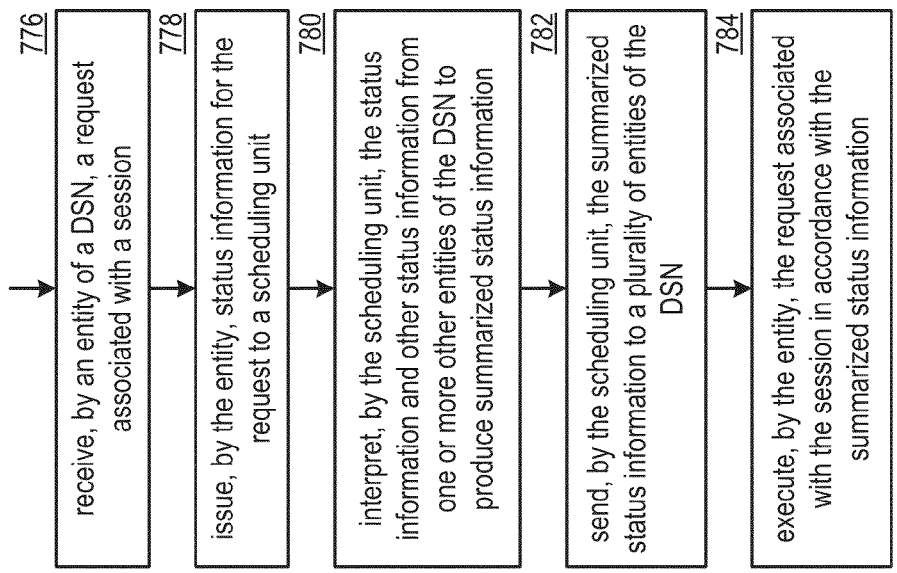
Figure 48A:
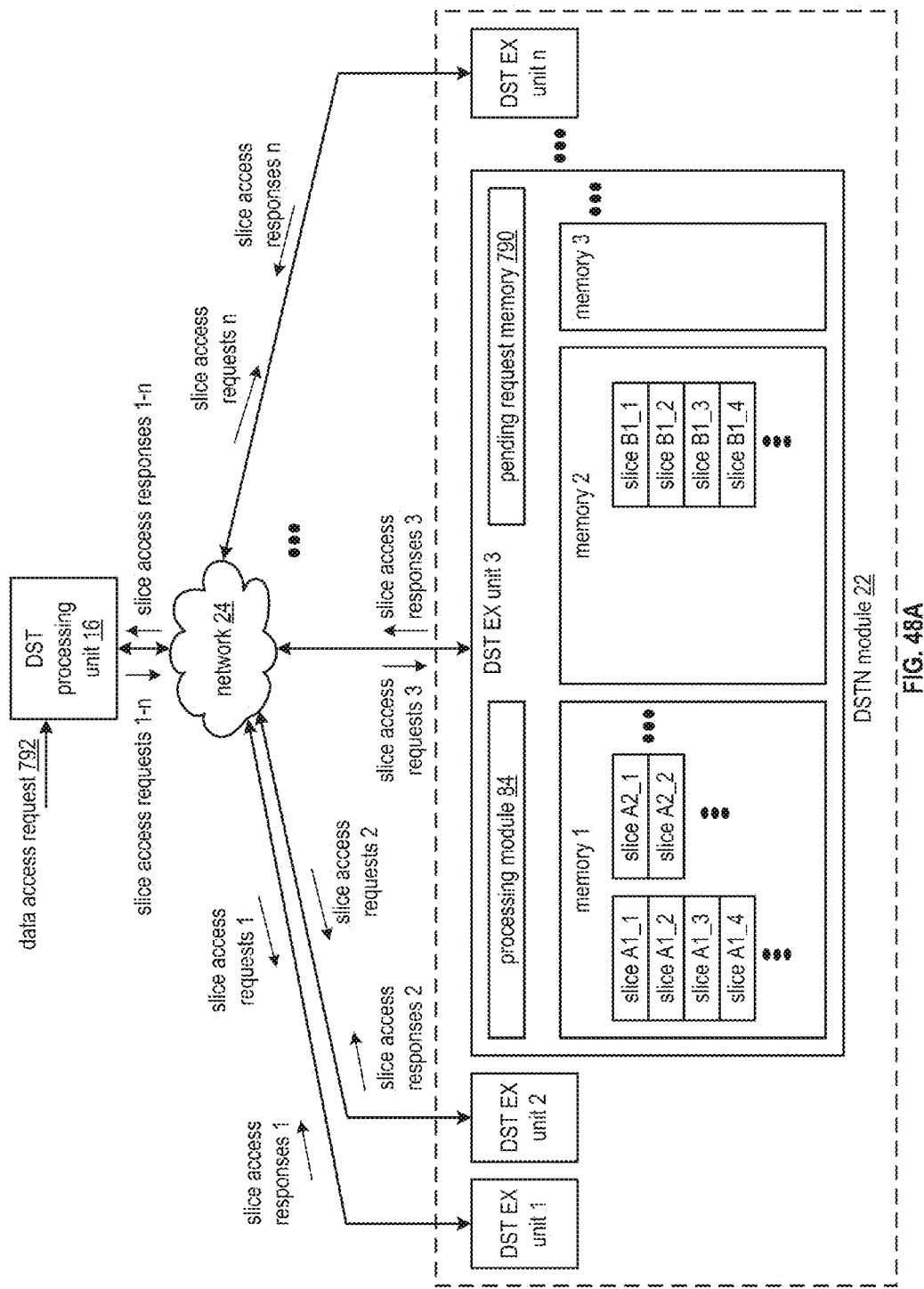
Figure 48B:
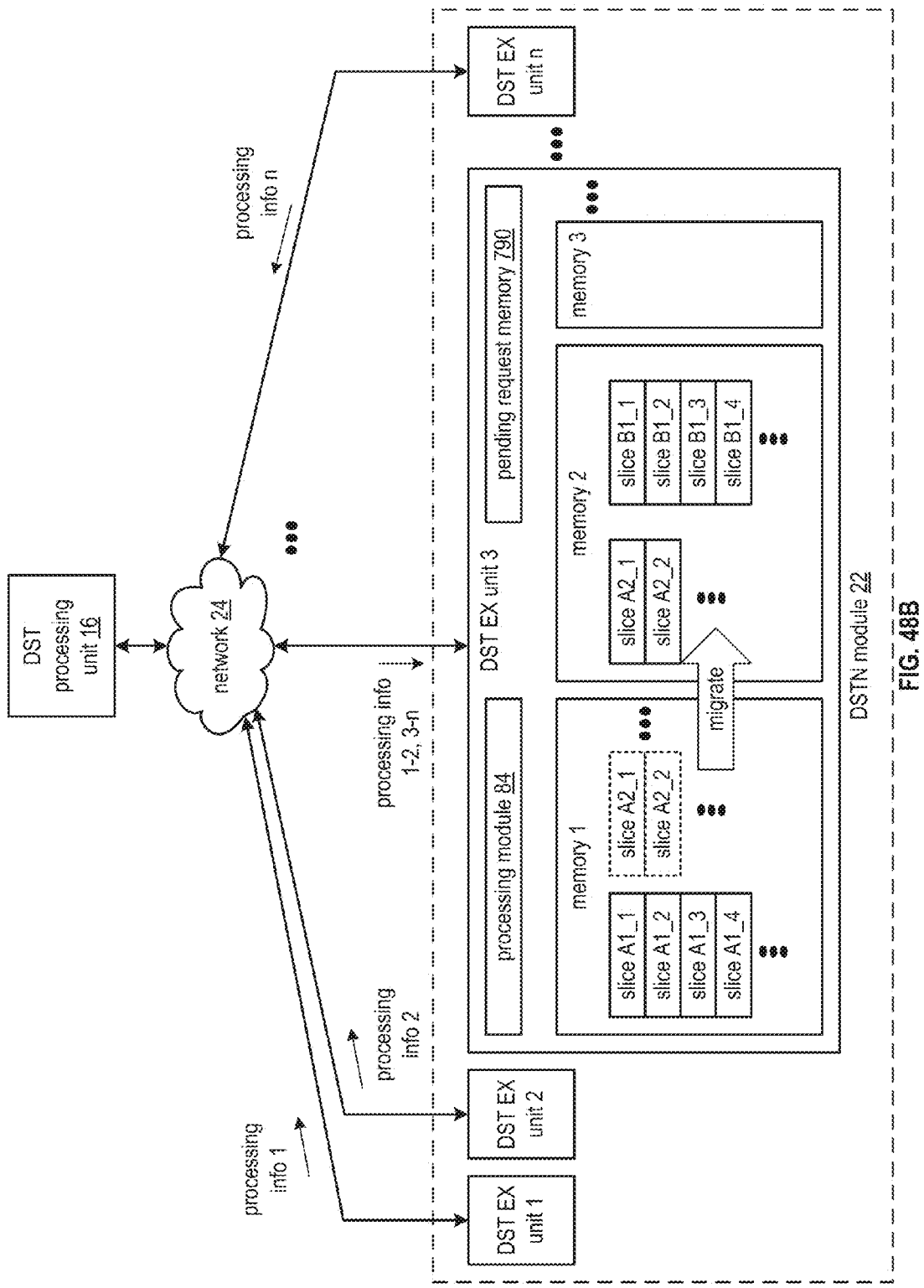
Figure 48C:
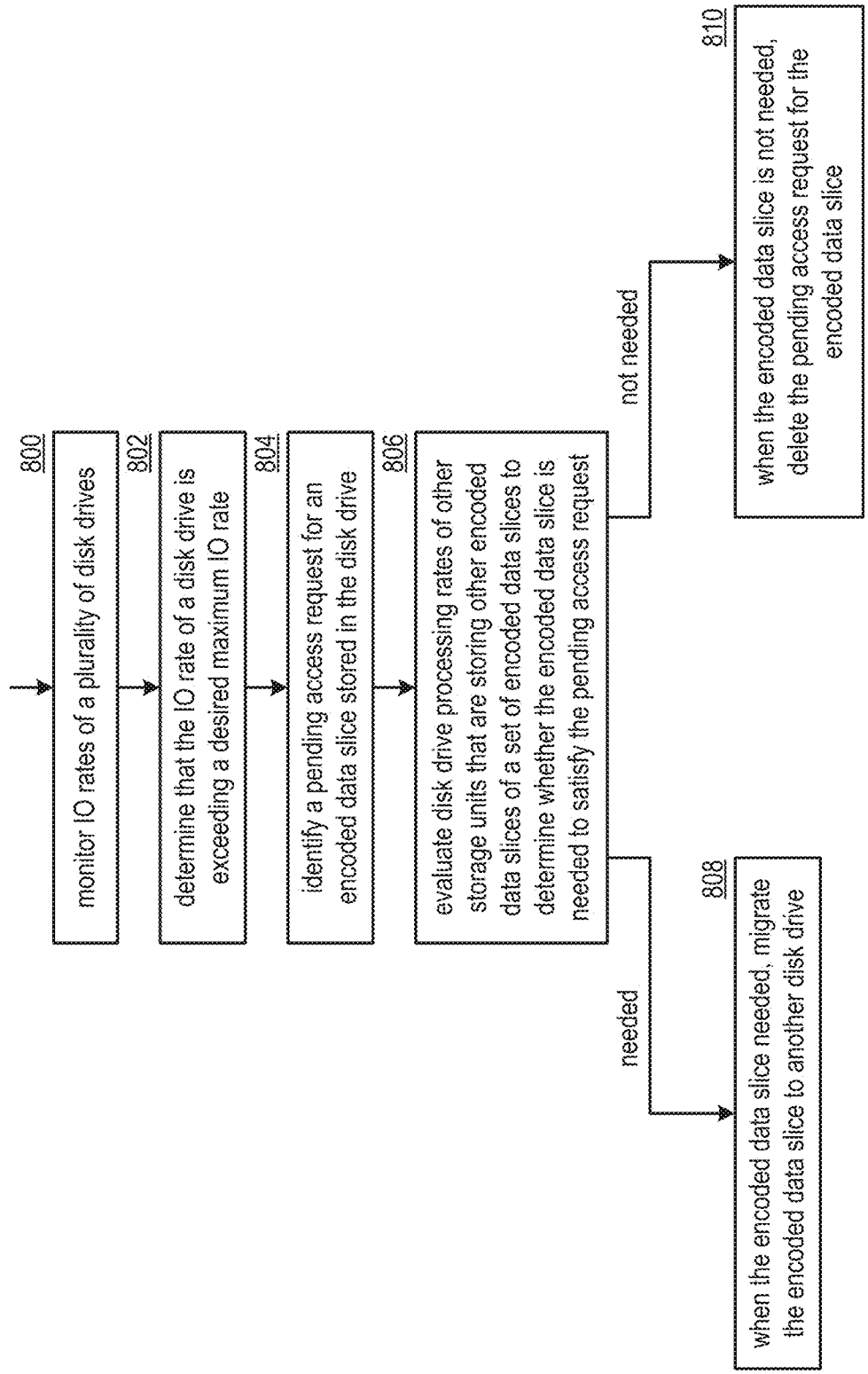

FIGS. 46A-D are schematic block diagrams of another embodiment of a dispersed storage network (DSN) in accordance with the present invention;

FIG. 46E is a flowchart illustrating an example of adjusting execution of tasks in accordance with the present invention;

FIG. 47A is a schematic block diagram of another embodiment of a dispersed storage network (DSN) in accordance with the present invention;

FIG. 47B is a flowchart illustrating an example of processing a request in accordance with the present invention;

FIGS. 48A-B are schematic block diagrams of another embodiment of a dispersed storage network (DSN) in accordance with the present invention; and FIG. 48C is a flowchart illustrating an example of migrating encoded data slices in accordance with the present invention.

DETAILED DESCRIPTION OF THE INVENTION

Figure 1:
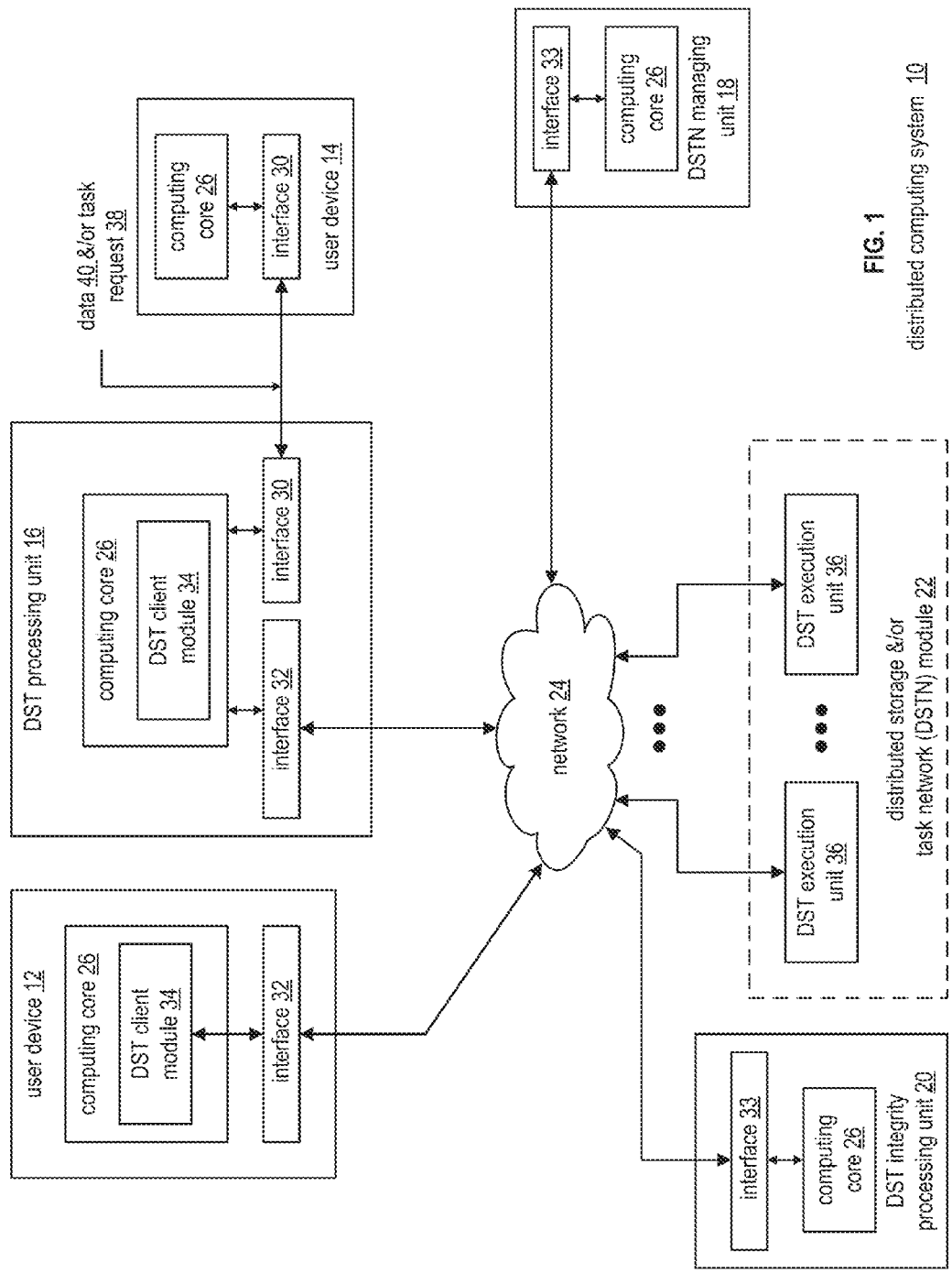
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
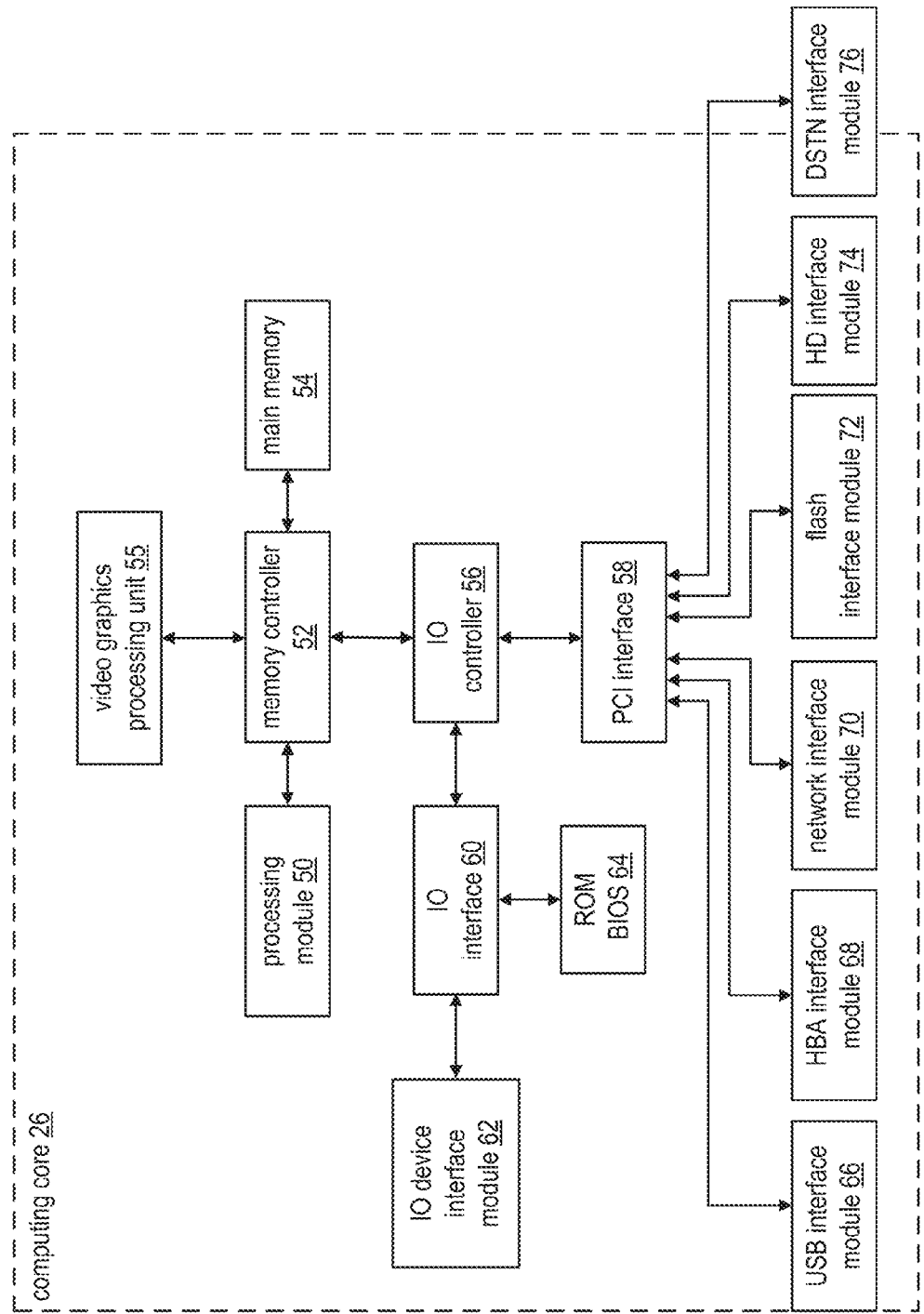
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as 10 ports.

Figure 3:
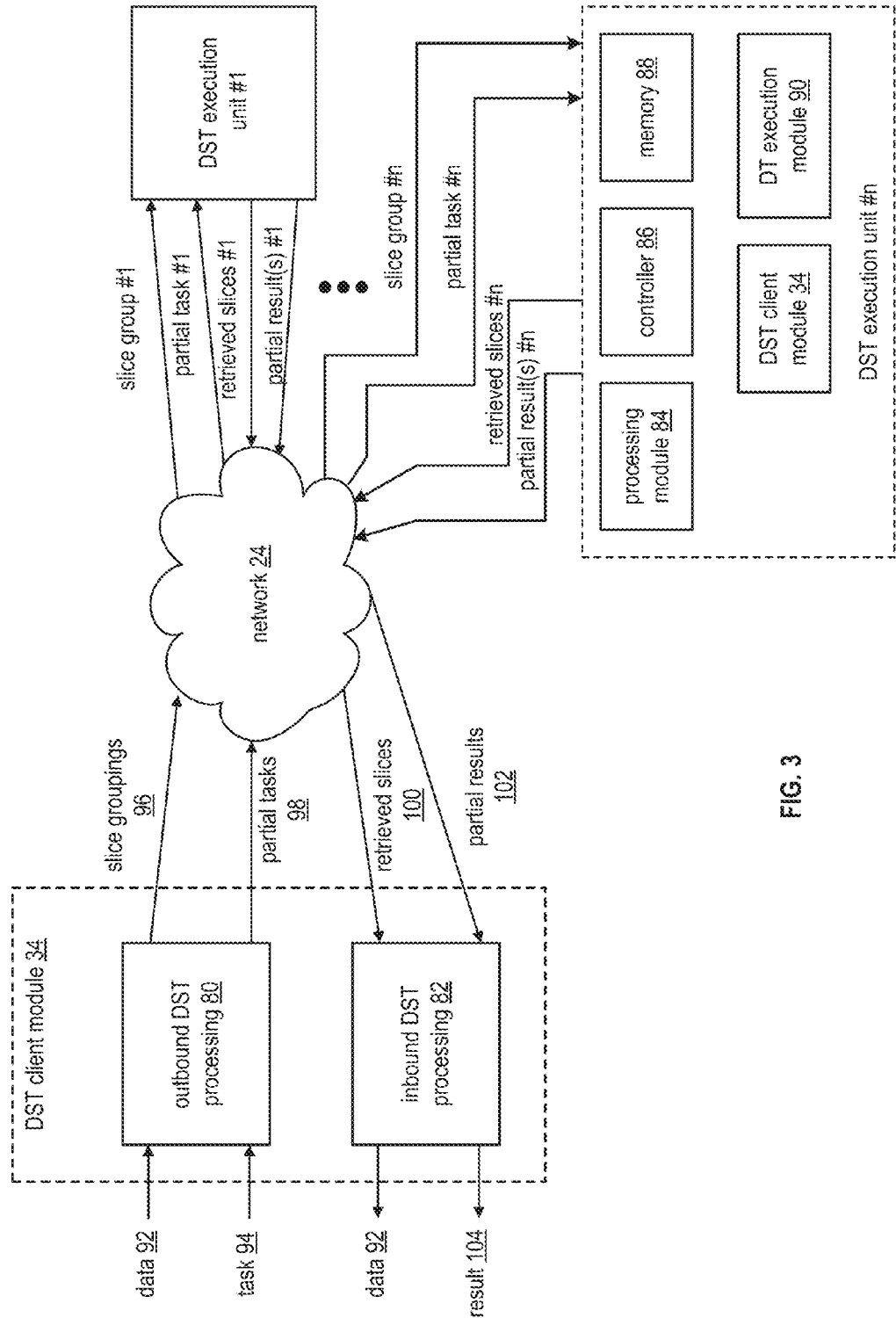
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
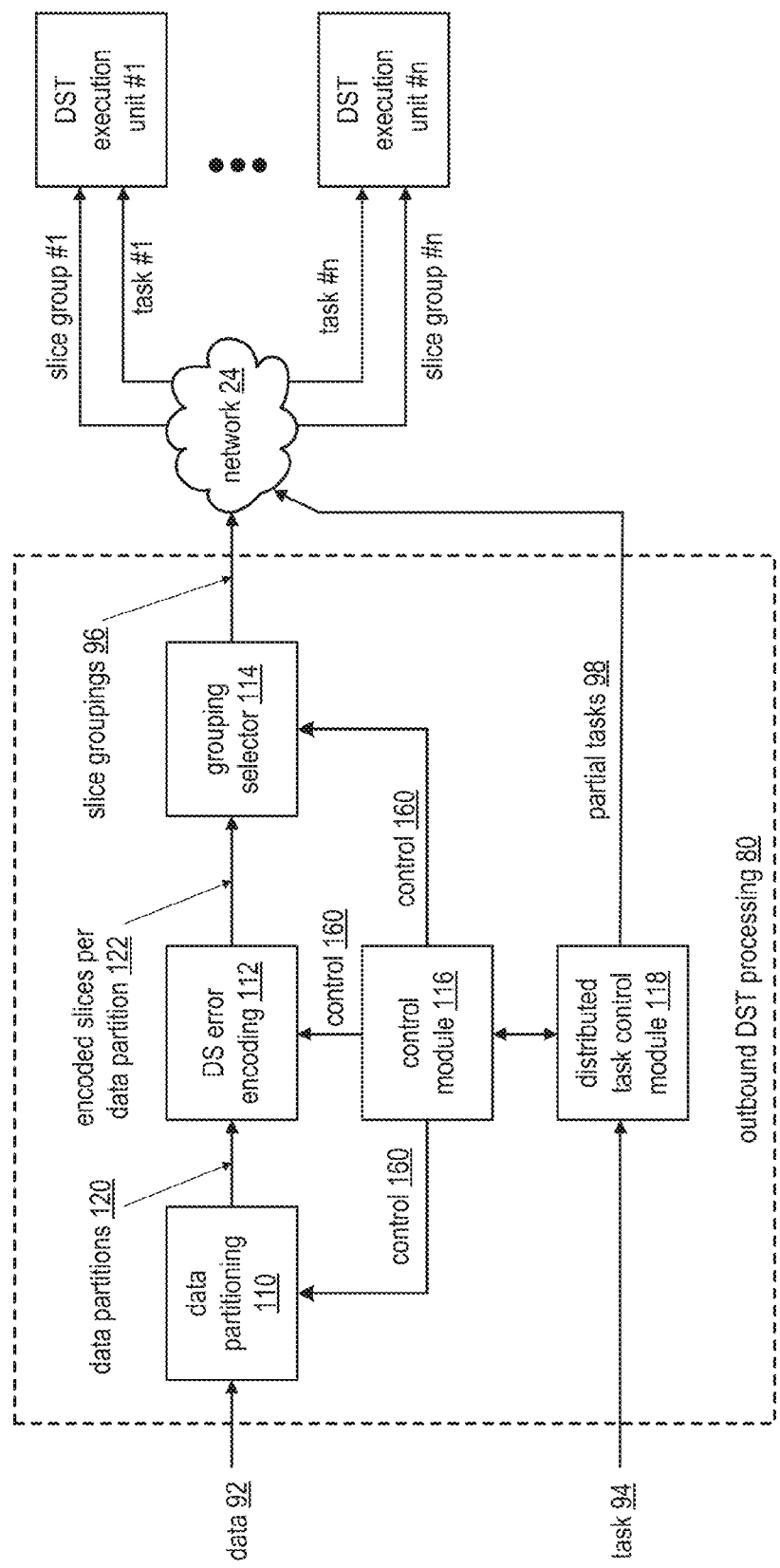
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
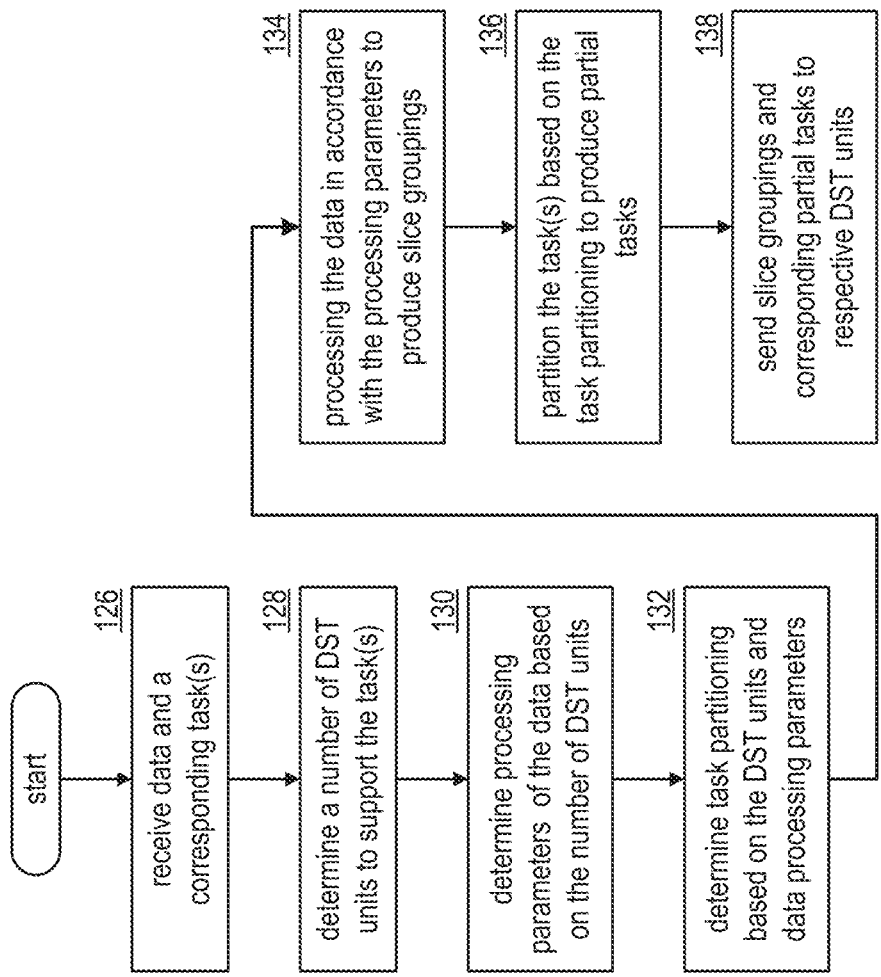
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
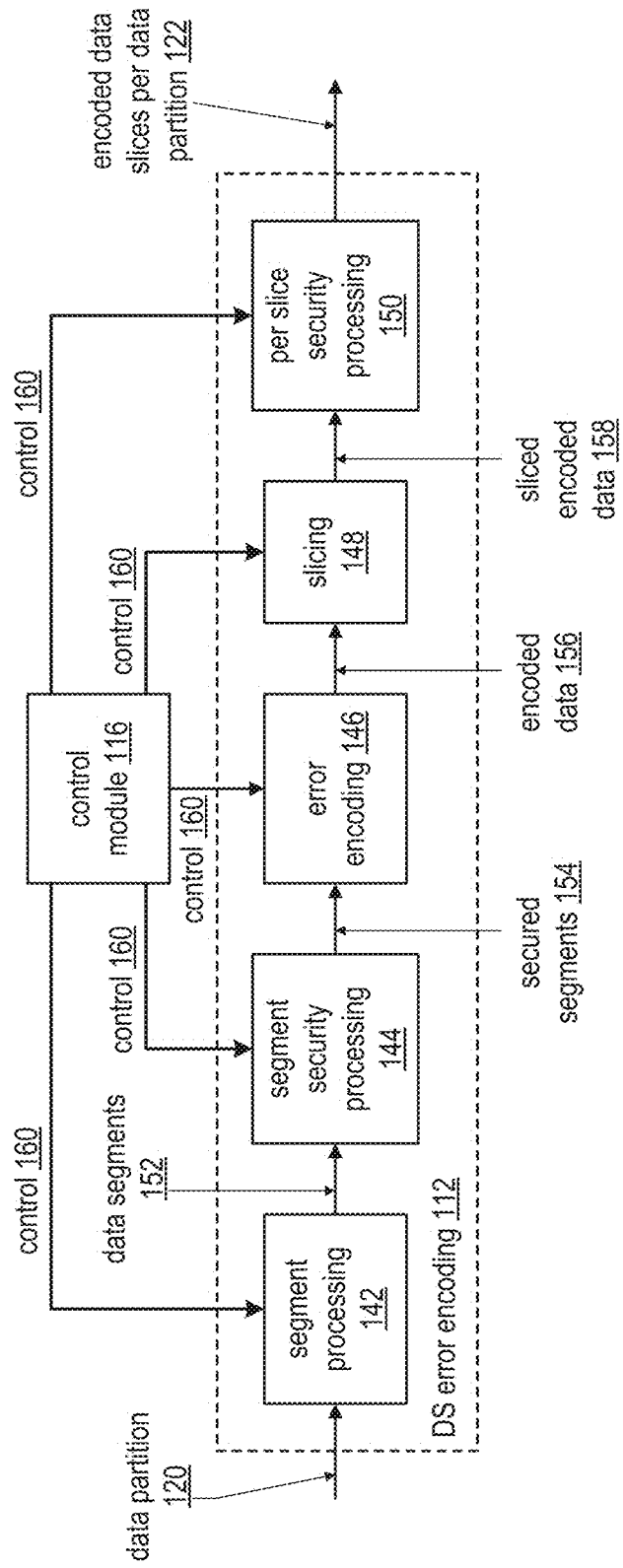
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
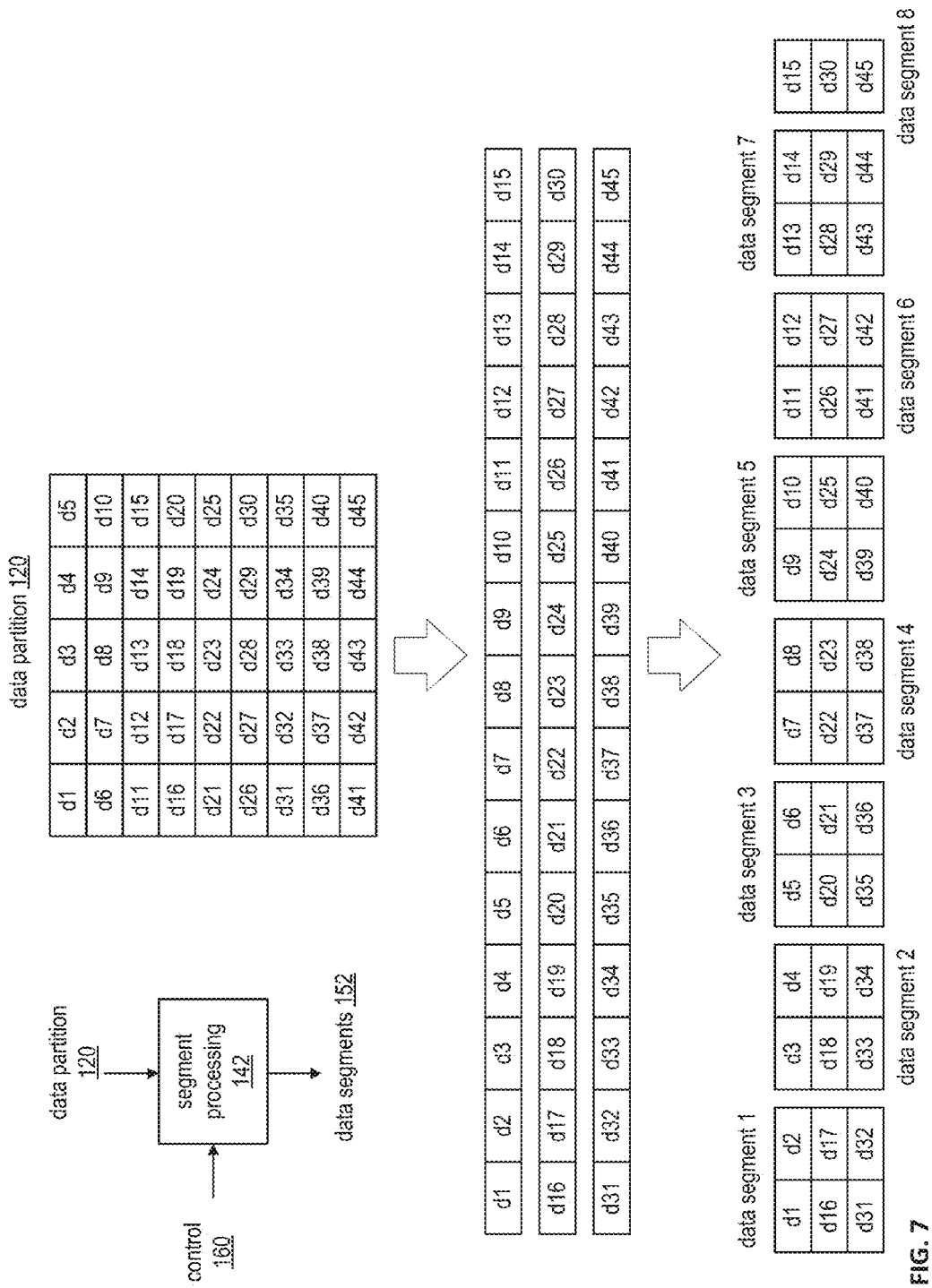
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
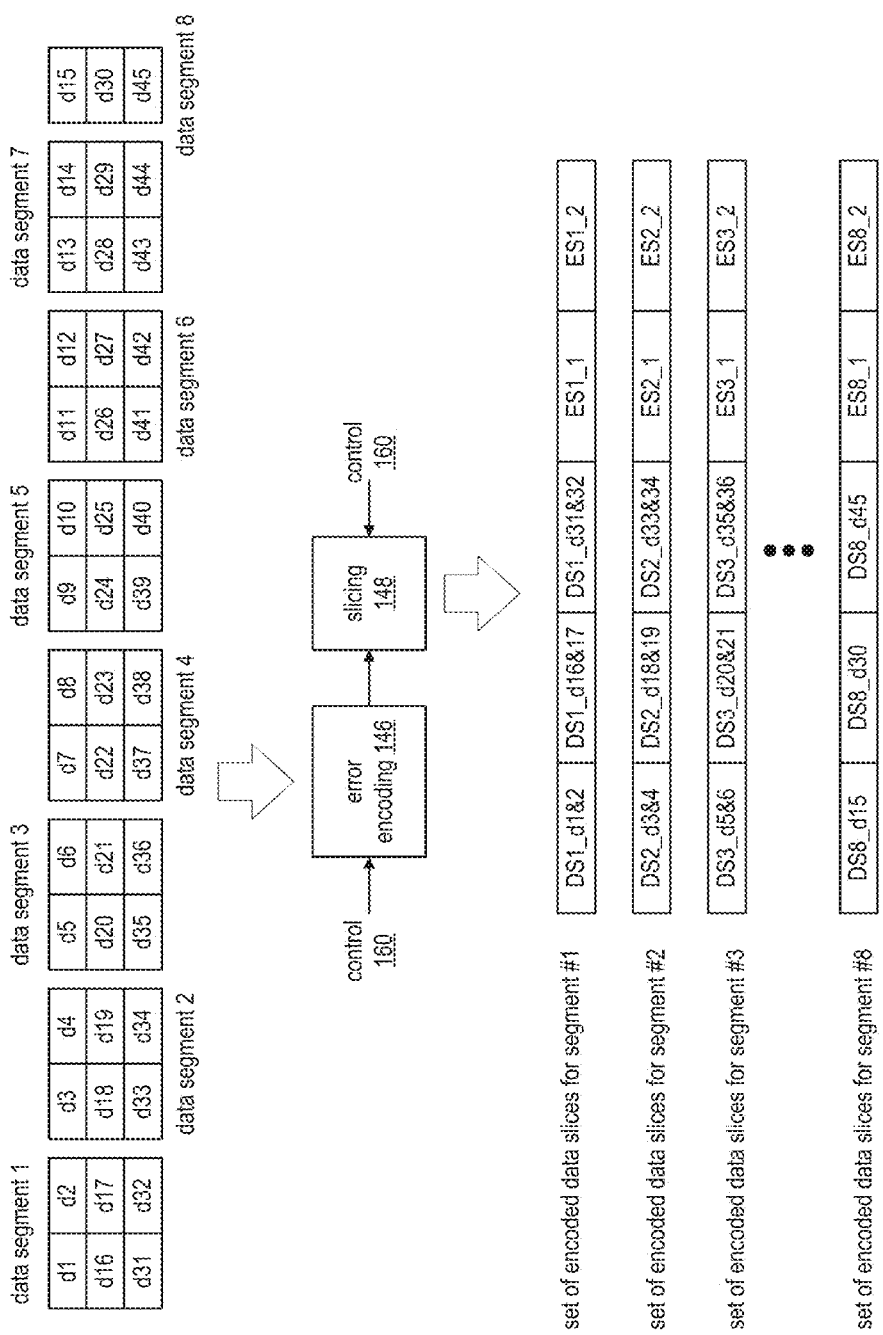
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 &d2); the content of the second encoded data slice (DS1_d16&17) of the first set of encoded data slices is substantially similar to content of the second word (e.g., d16 &d17); and the content of the third encoded data slice (DS1_d31&32) of the first set of encoded data slices is substantially similar to content of the third word (e.g., d31 &d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 &d4); the content of the second encoded data slice (DS2_d18&19) of the second set of encoded data slices is substantially similar to content of the second word (e.g., d18 &d19); and the content of the third encoded data slice (DS2_d33&34) of the second set of encoded data slices is substantially similar to content of the third word (e.g., d33 &d34). The content of the fourth and fifth encoded data slices (e.g., ES1_1 and ES1_2) of the second set of encoded data slices includes error correction data based on the first-third words of the second data segment.

Figure 9:
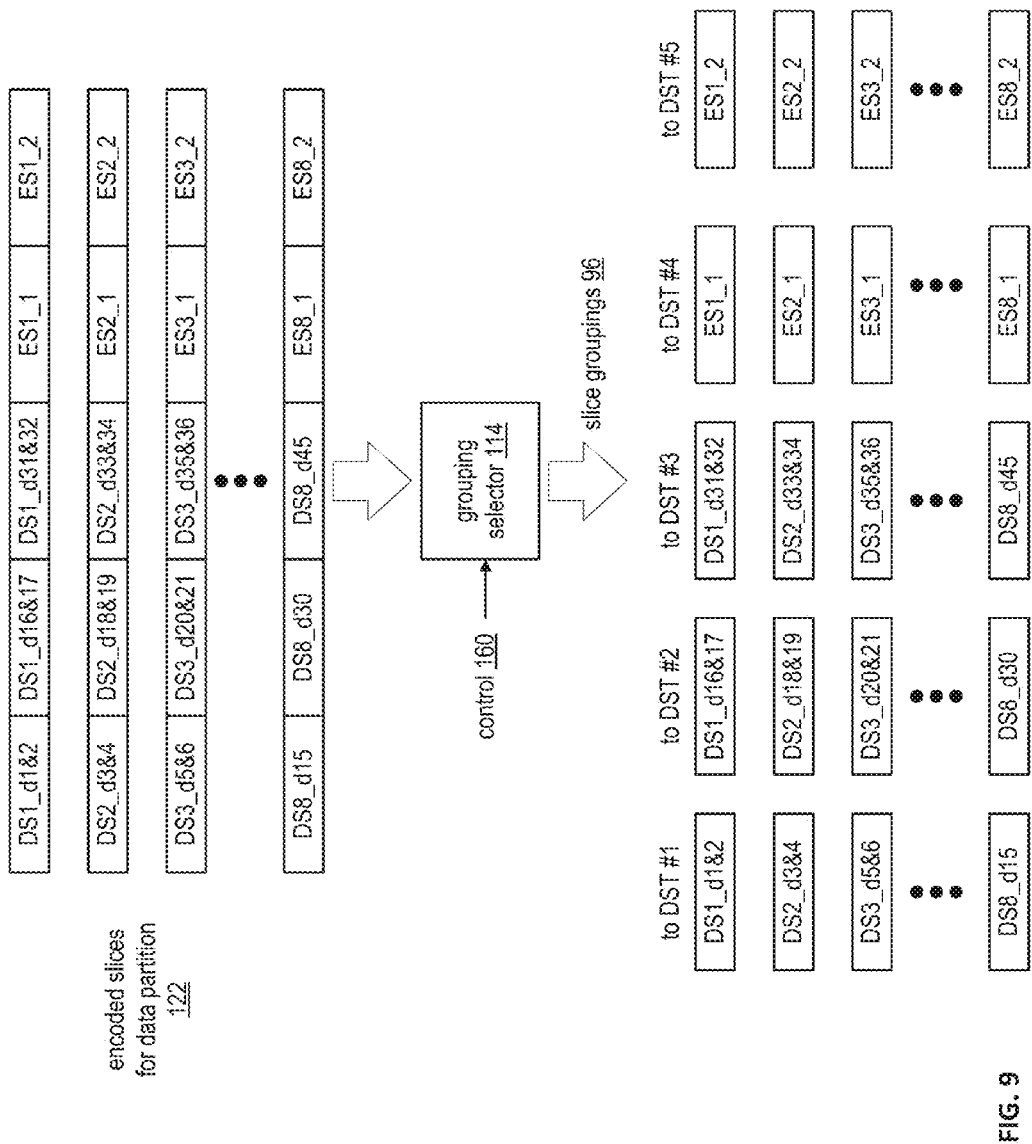
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
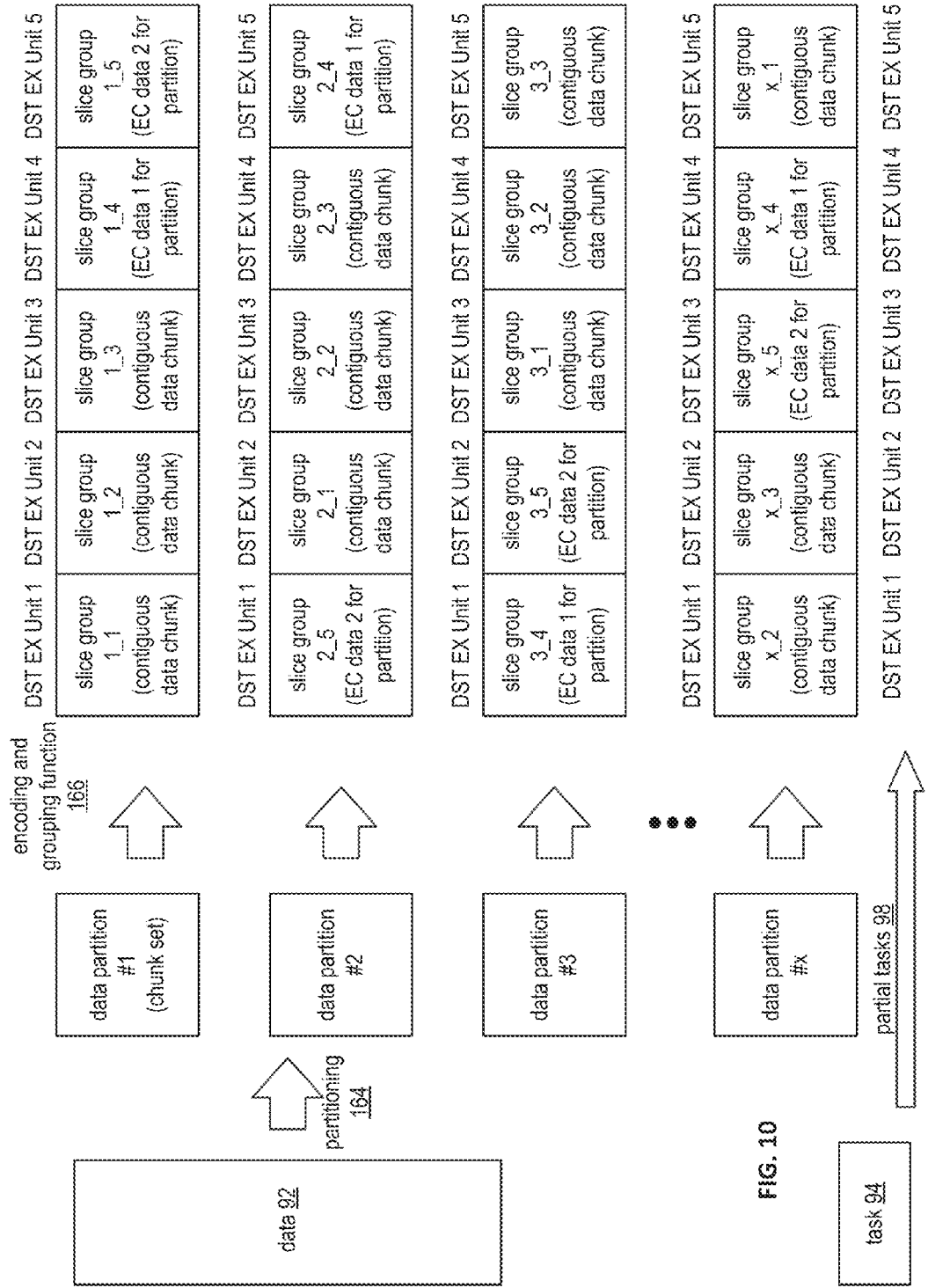
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
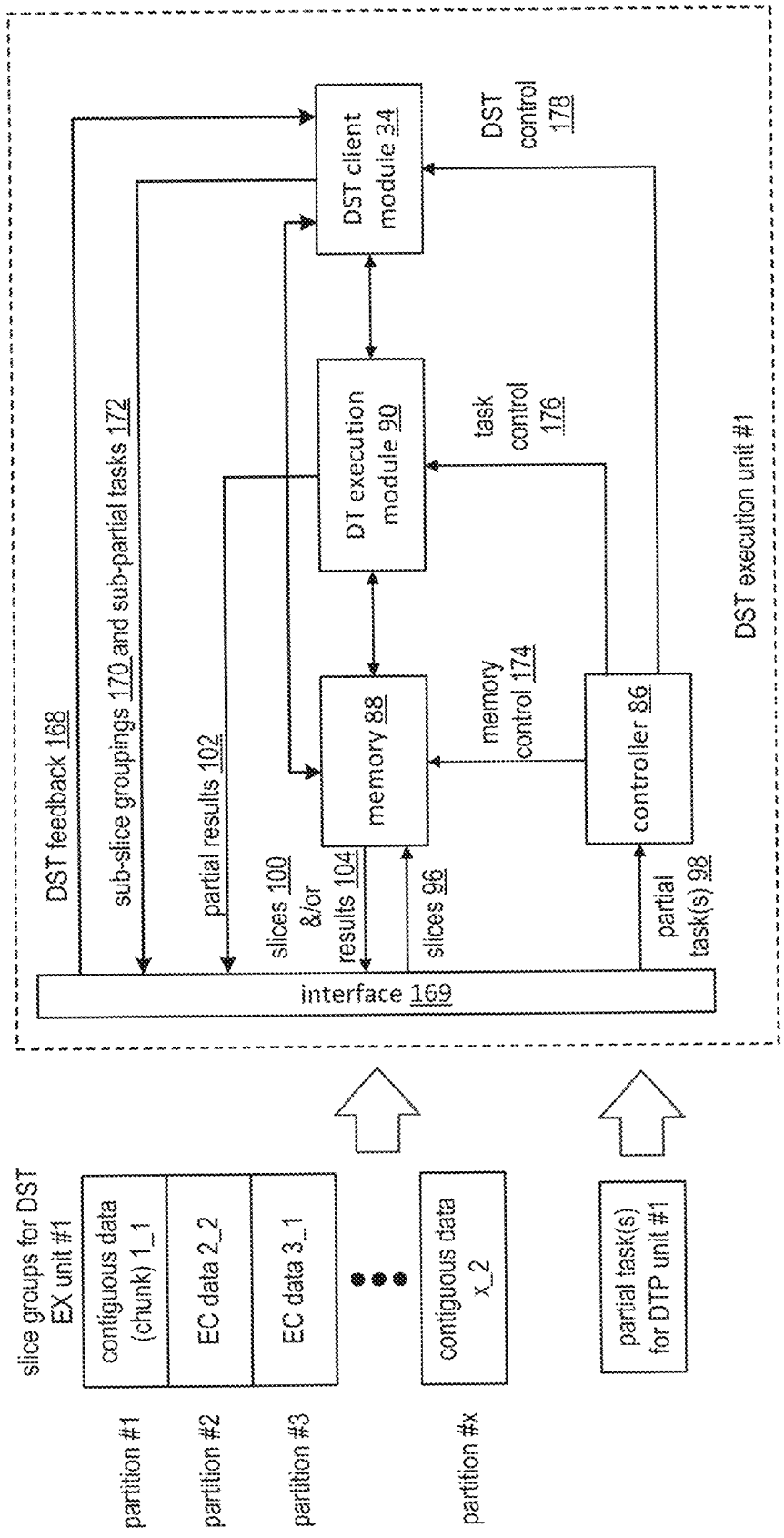
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
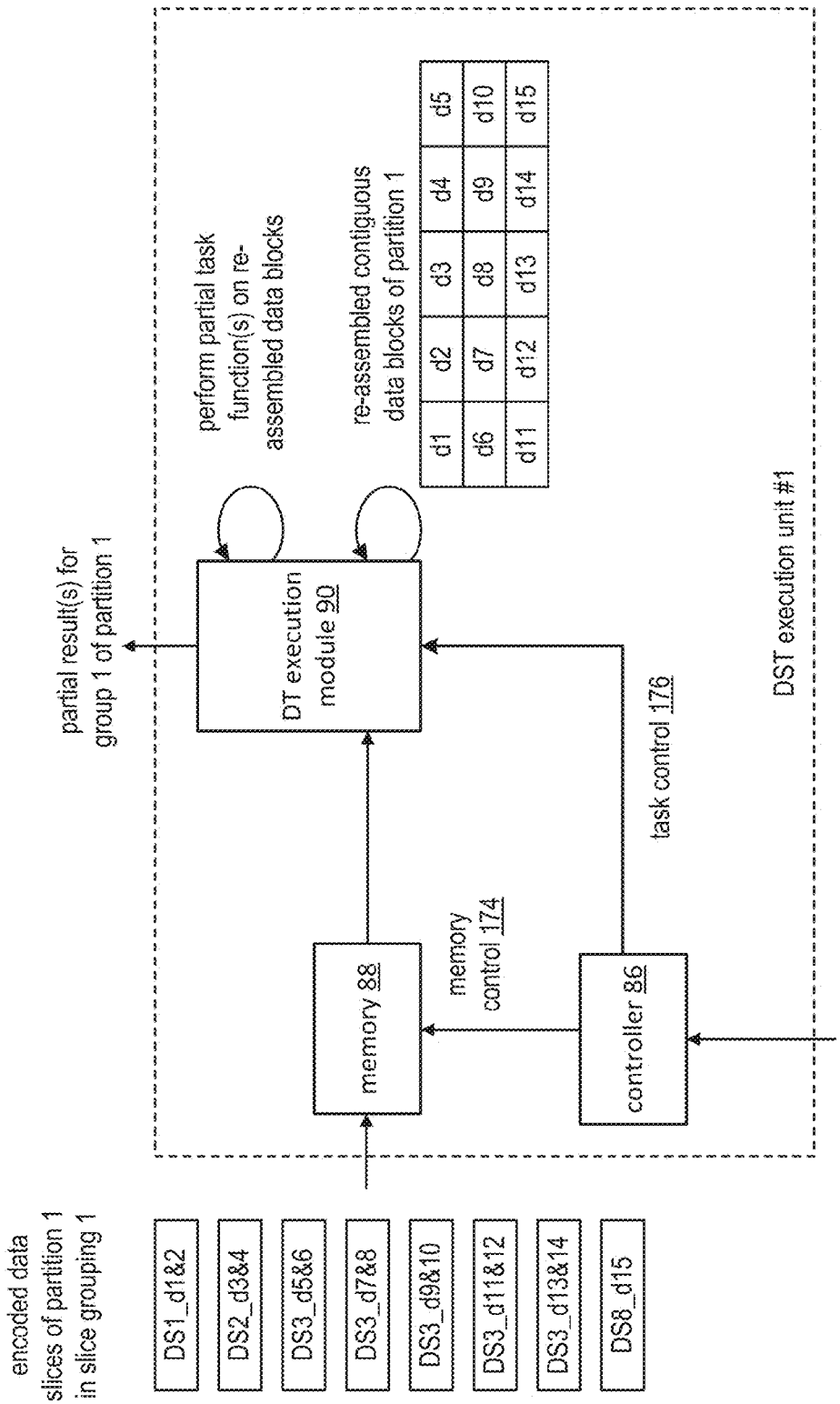
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
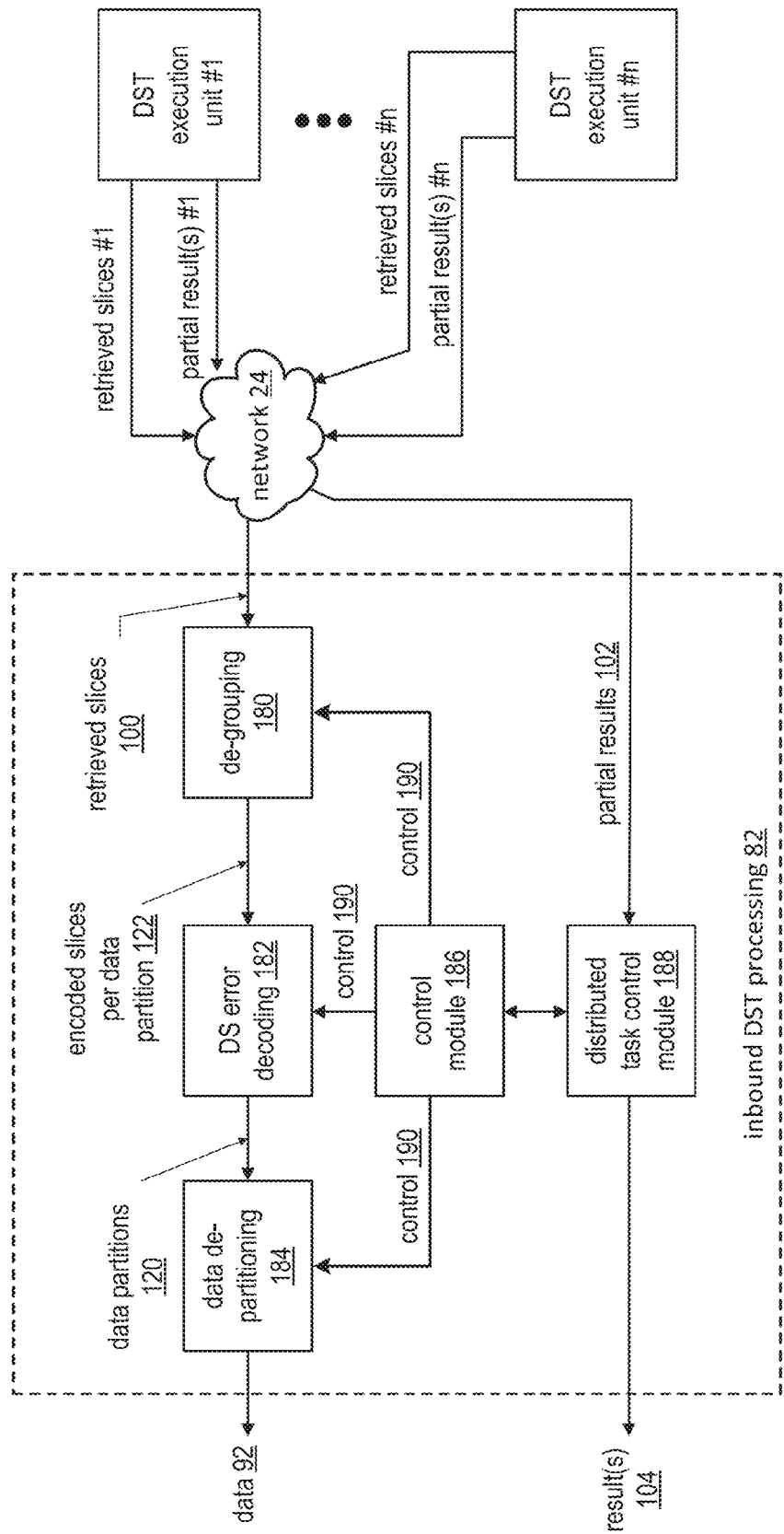
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
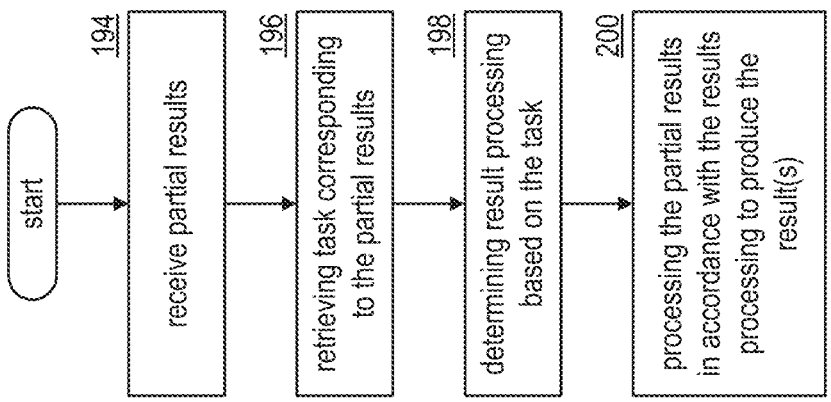
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
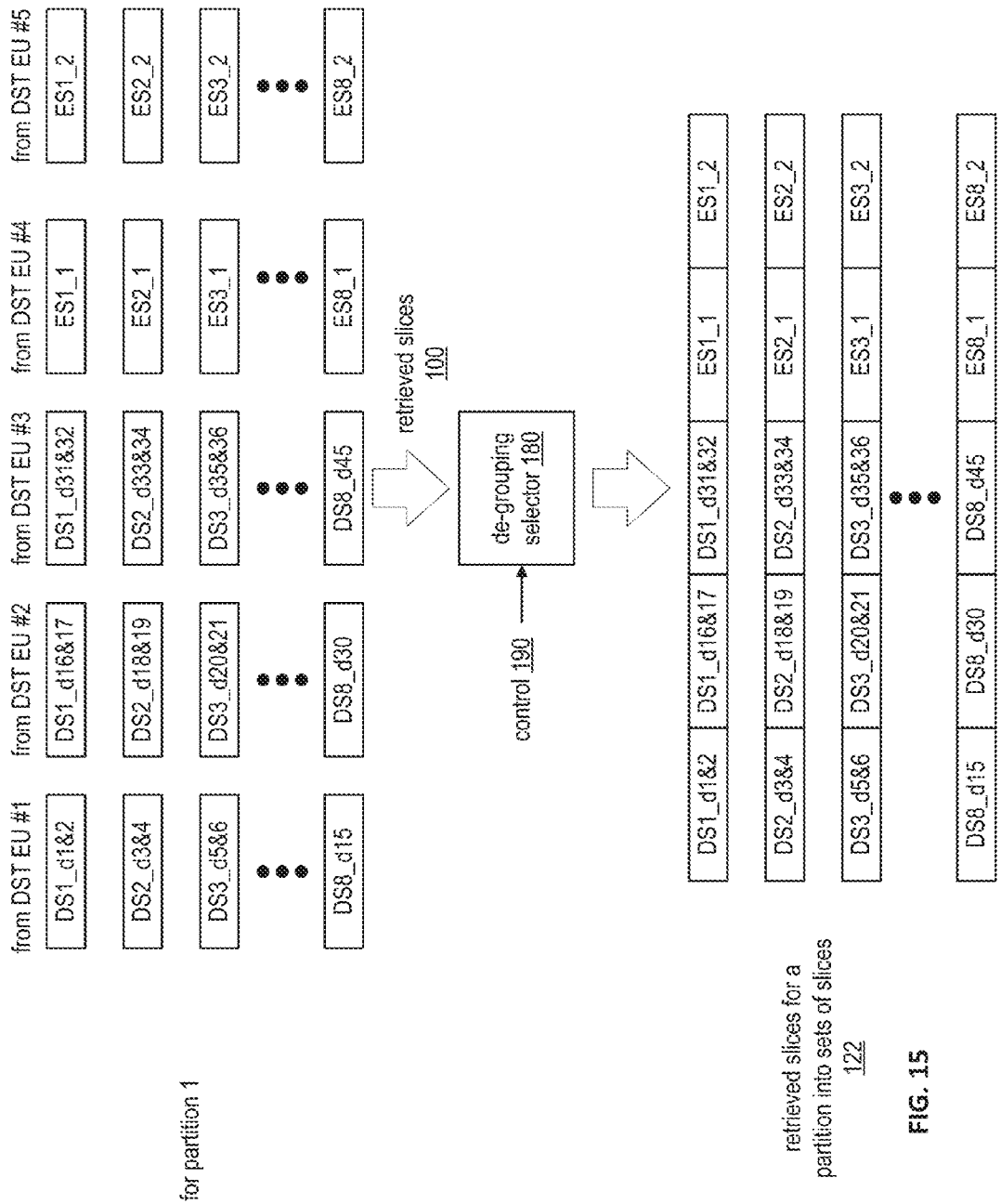
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
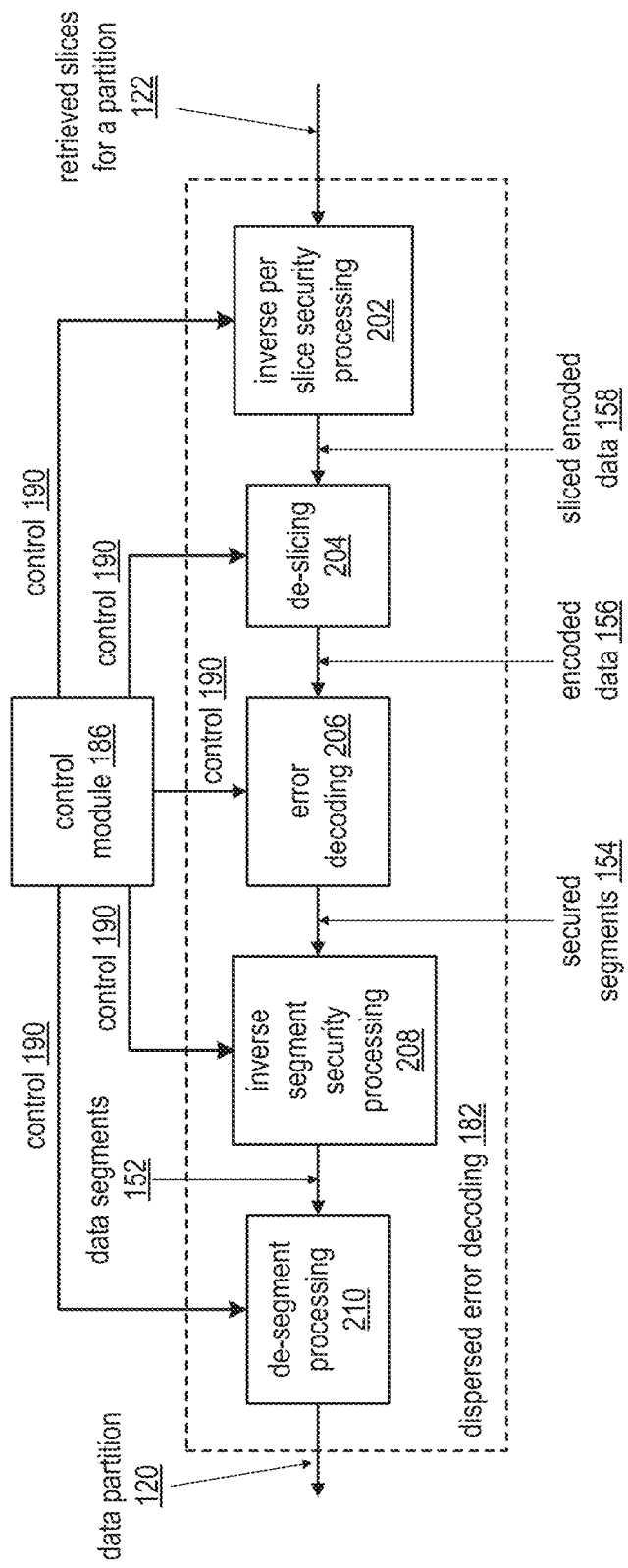
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
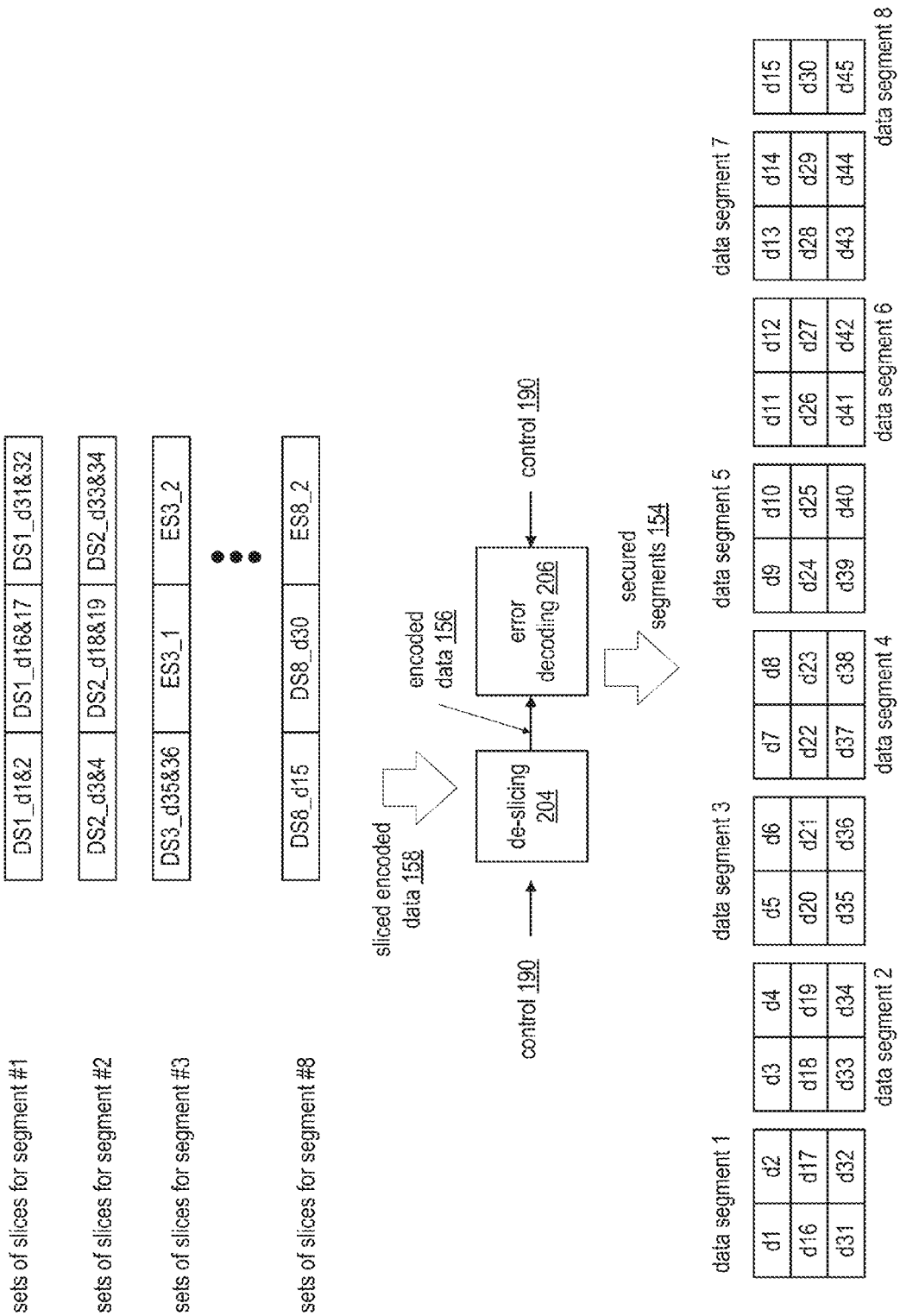
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
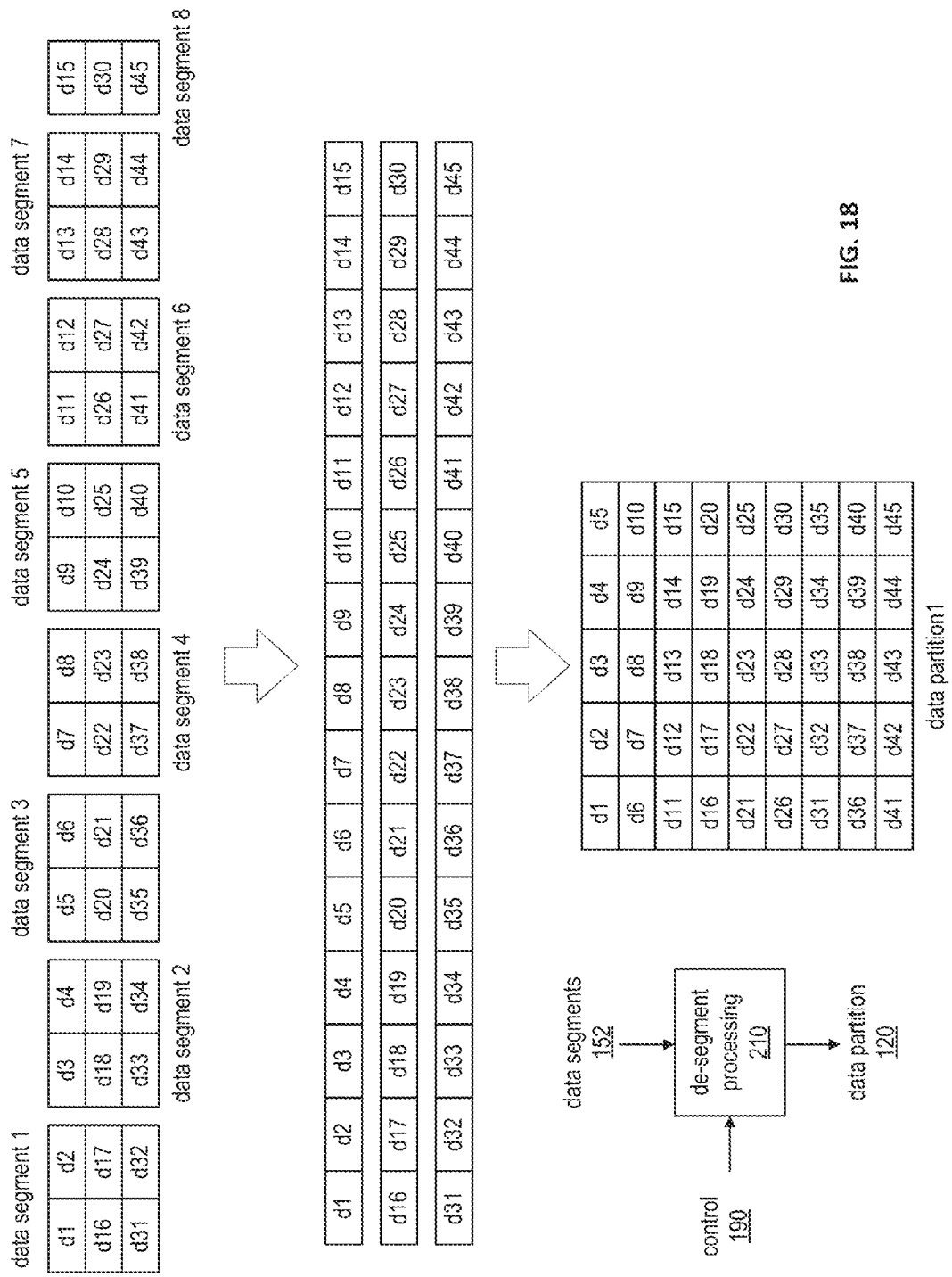
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
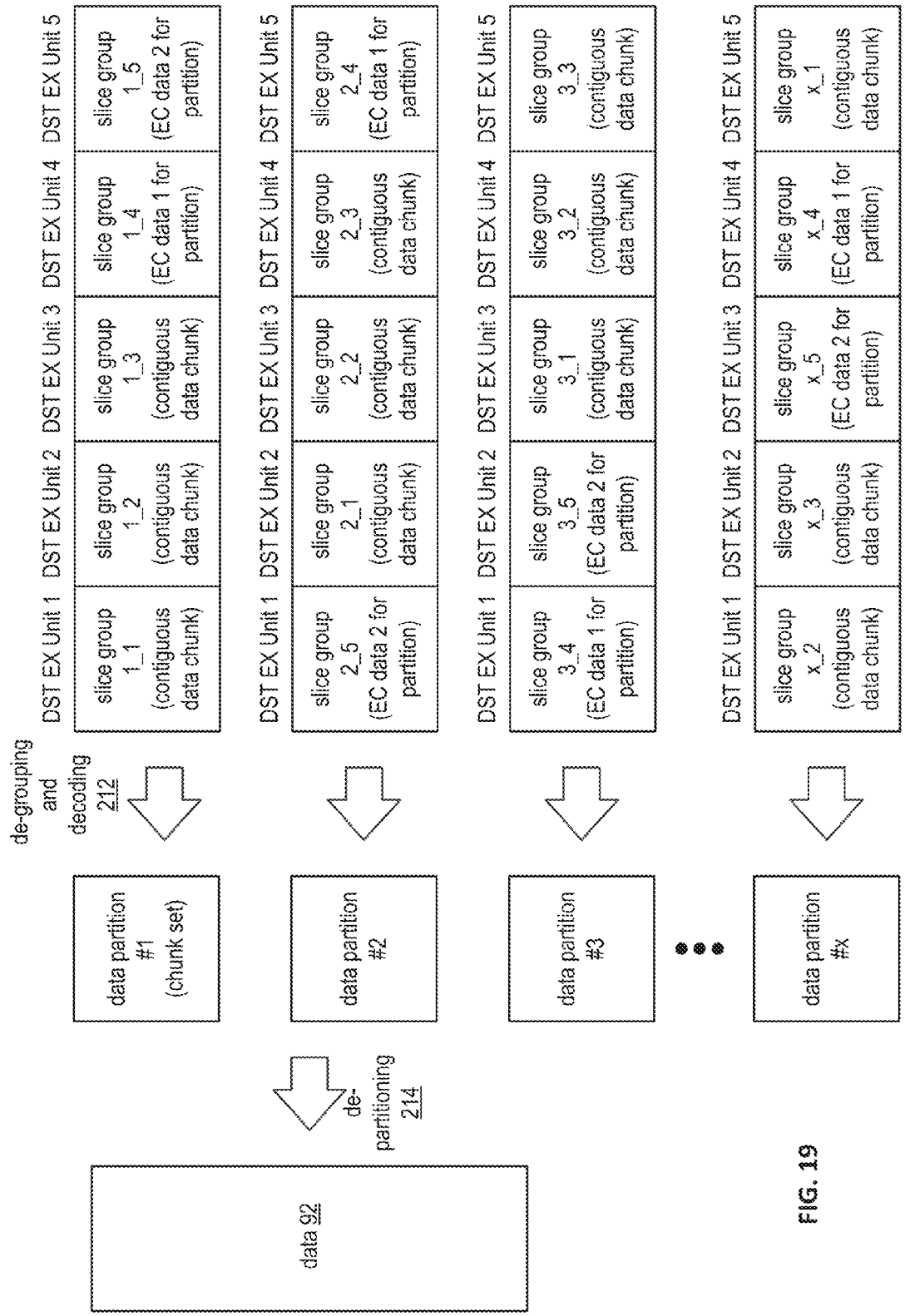
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
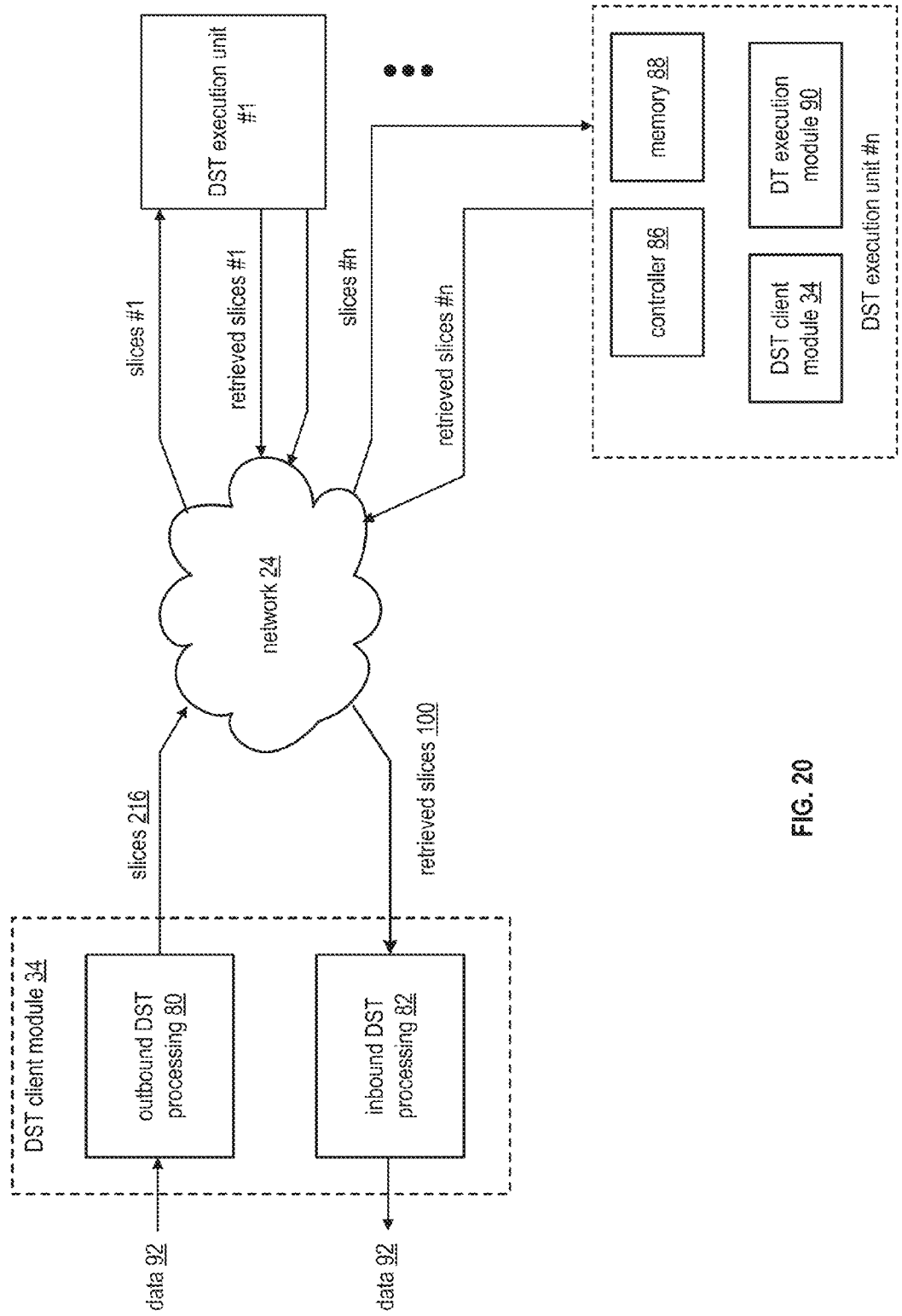
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
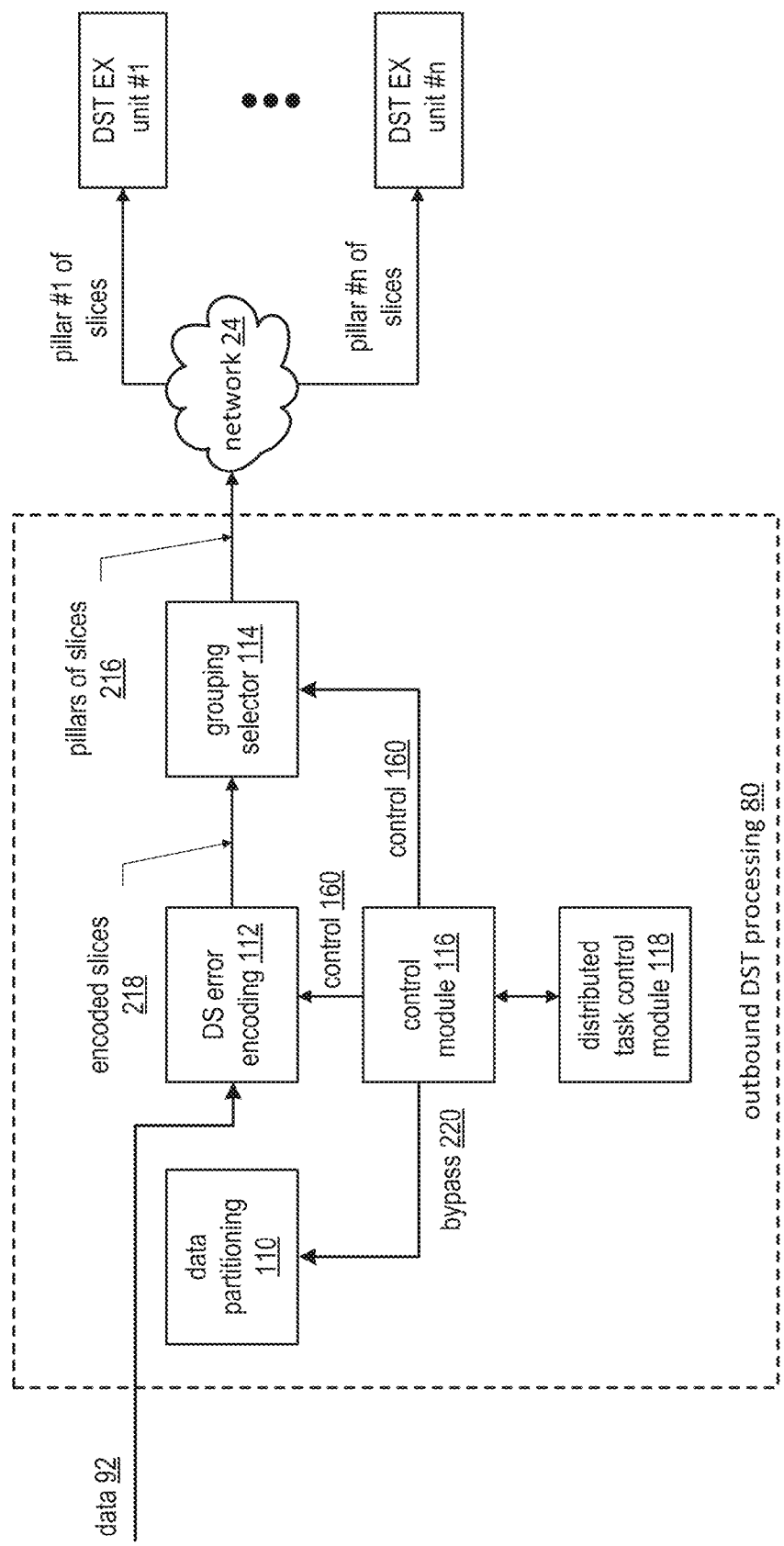
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
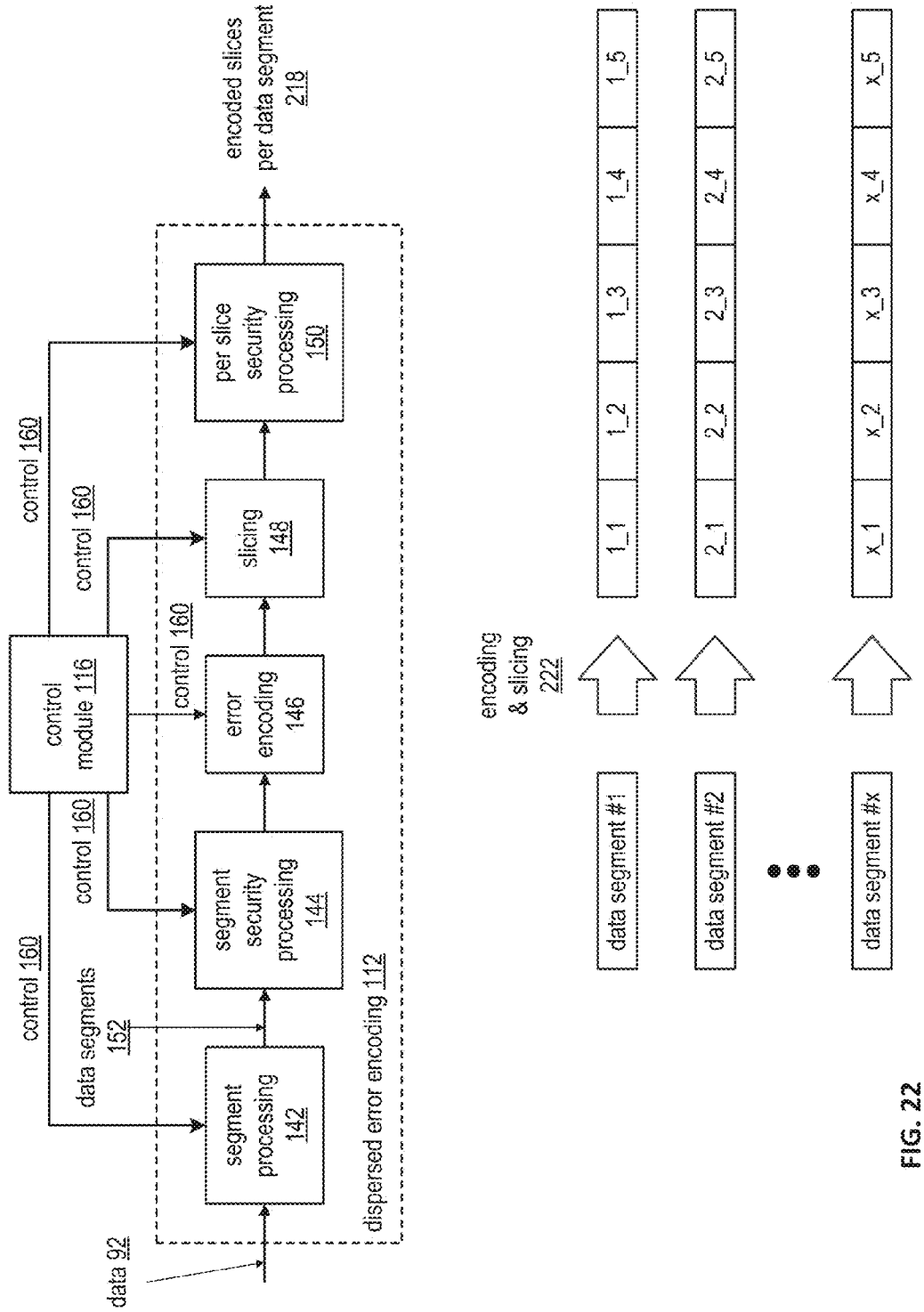
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
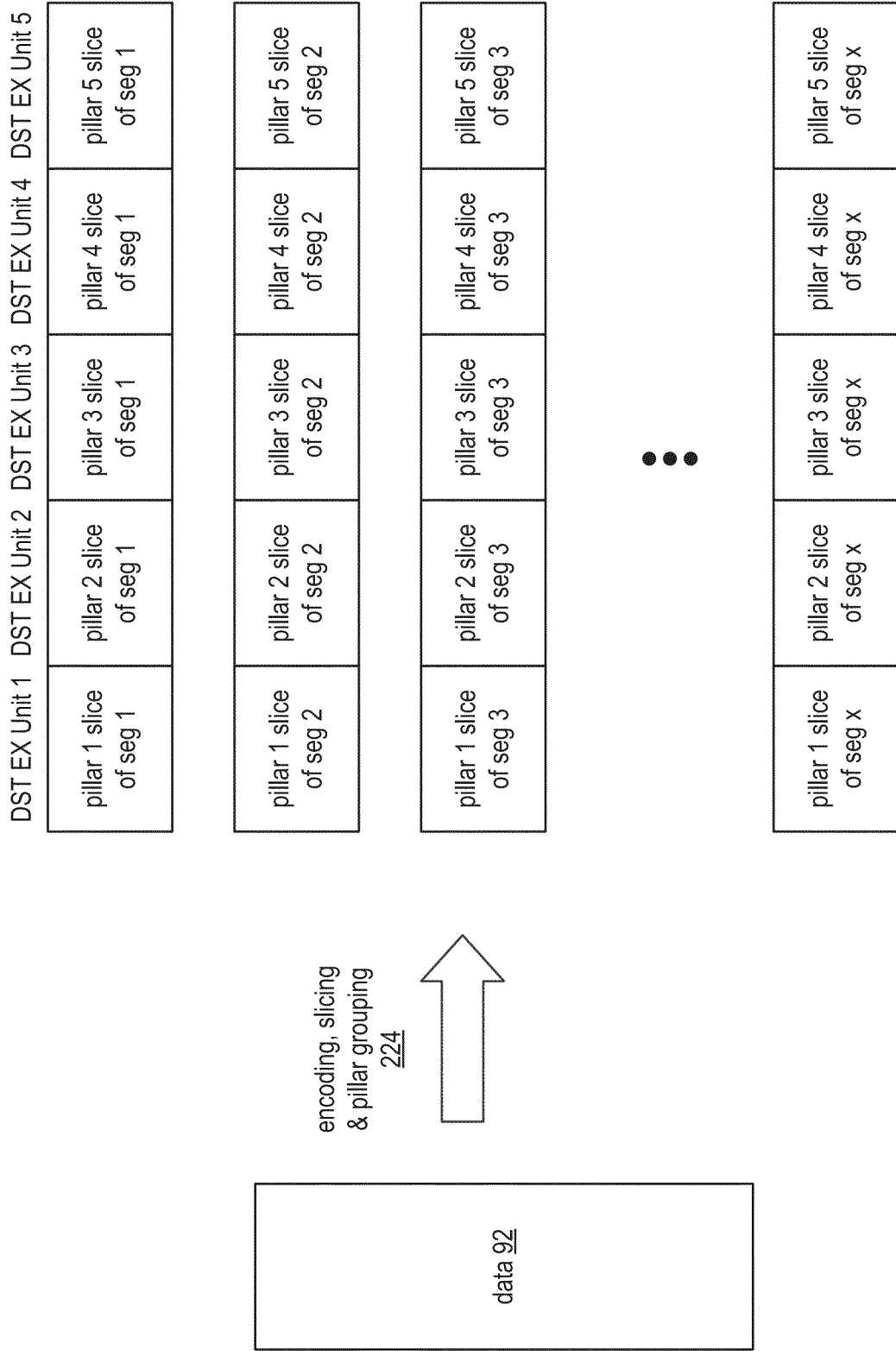
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
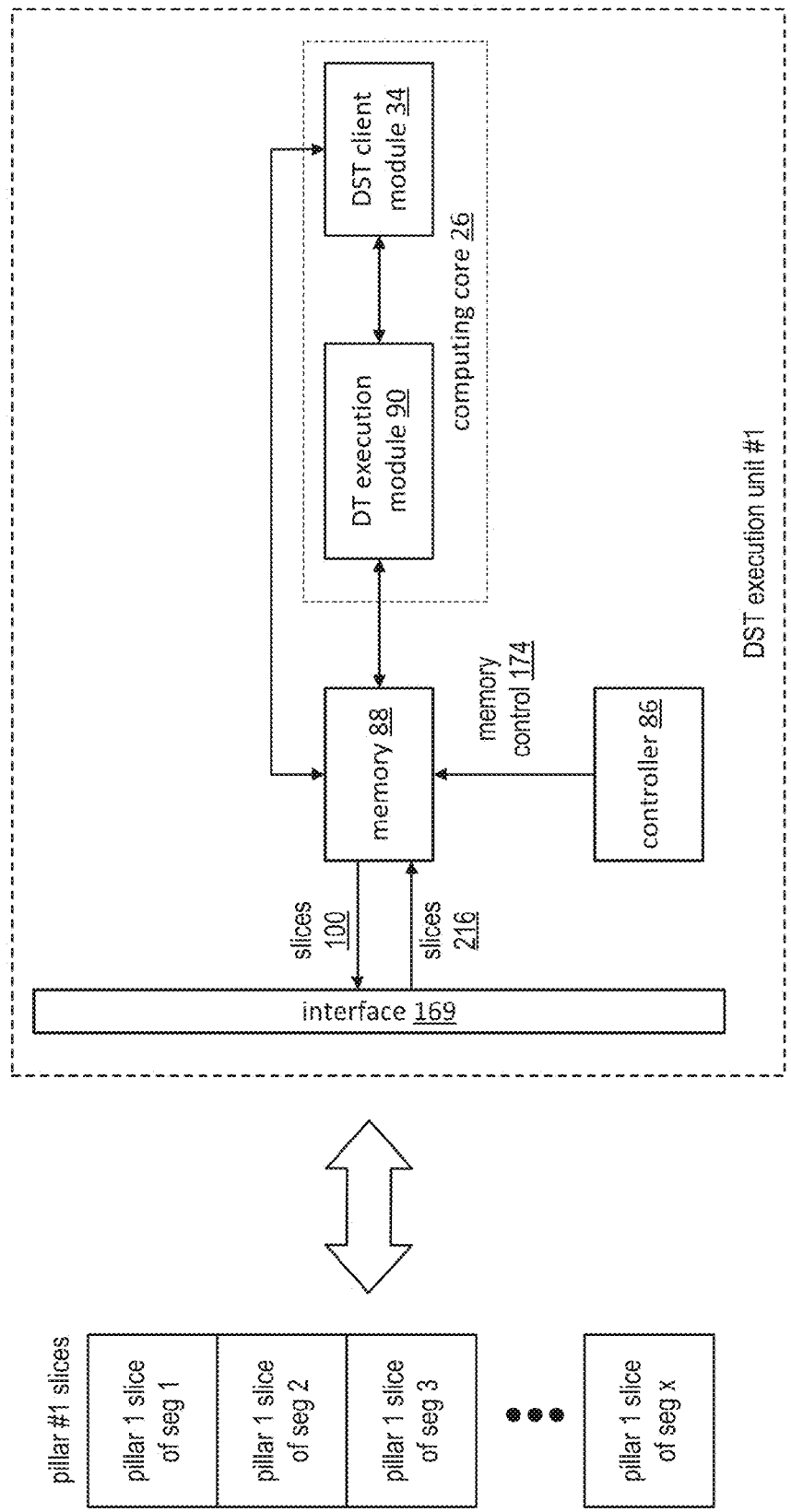
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
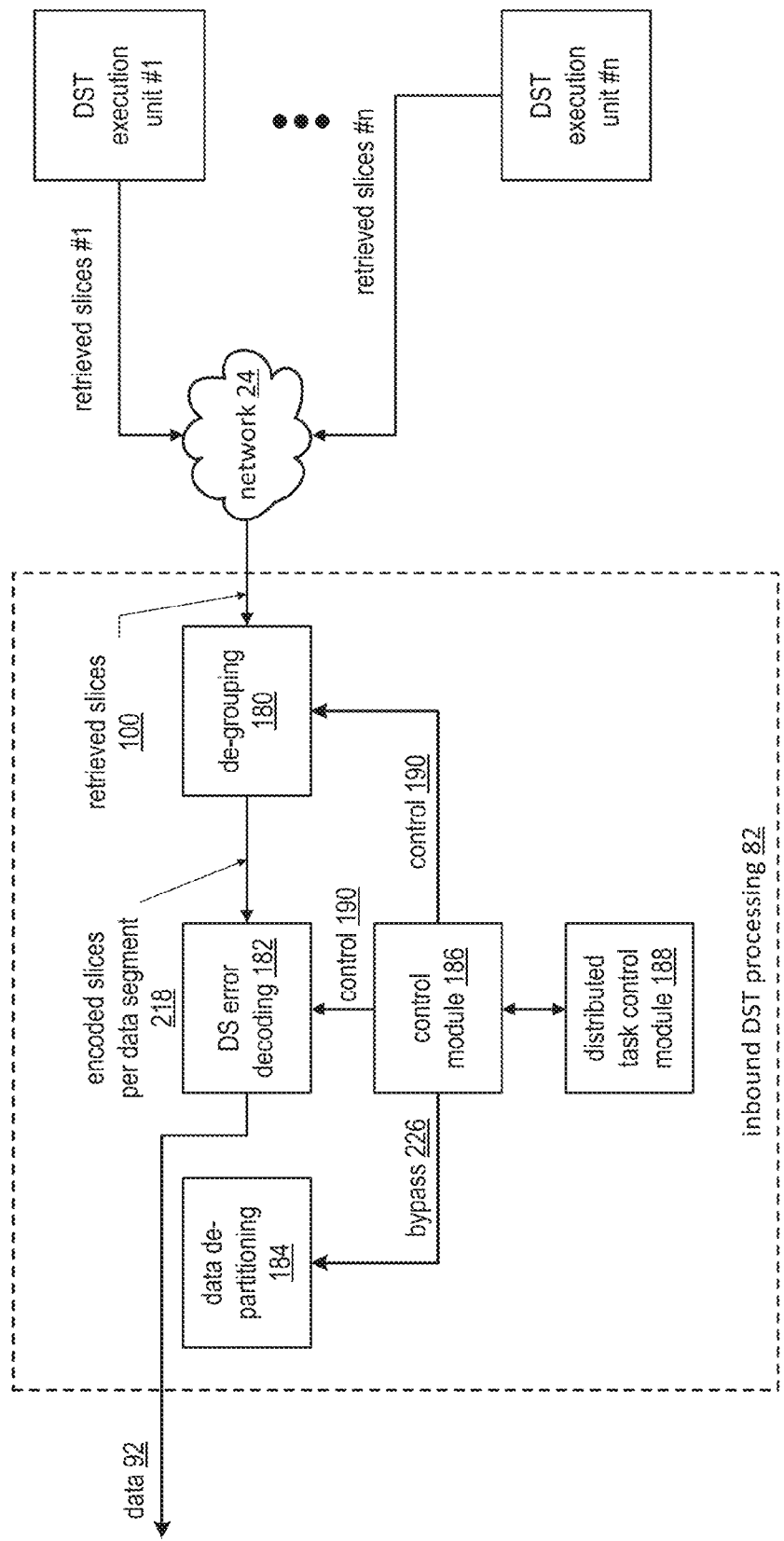
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
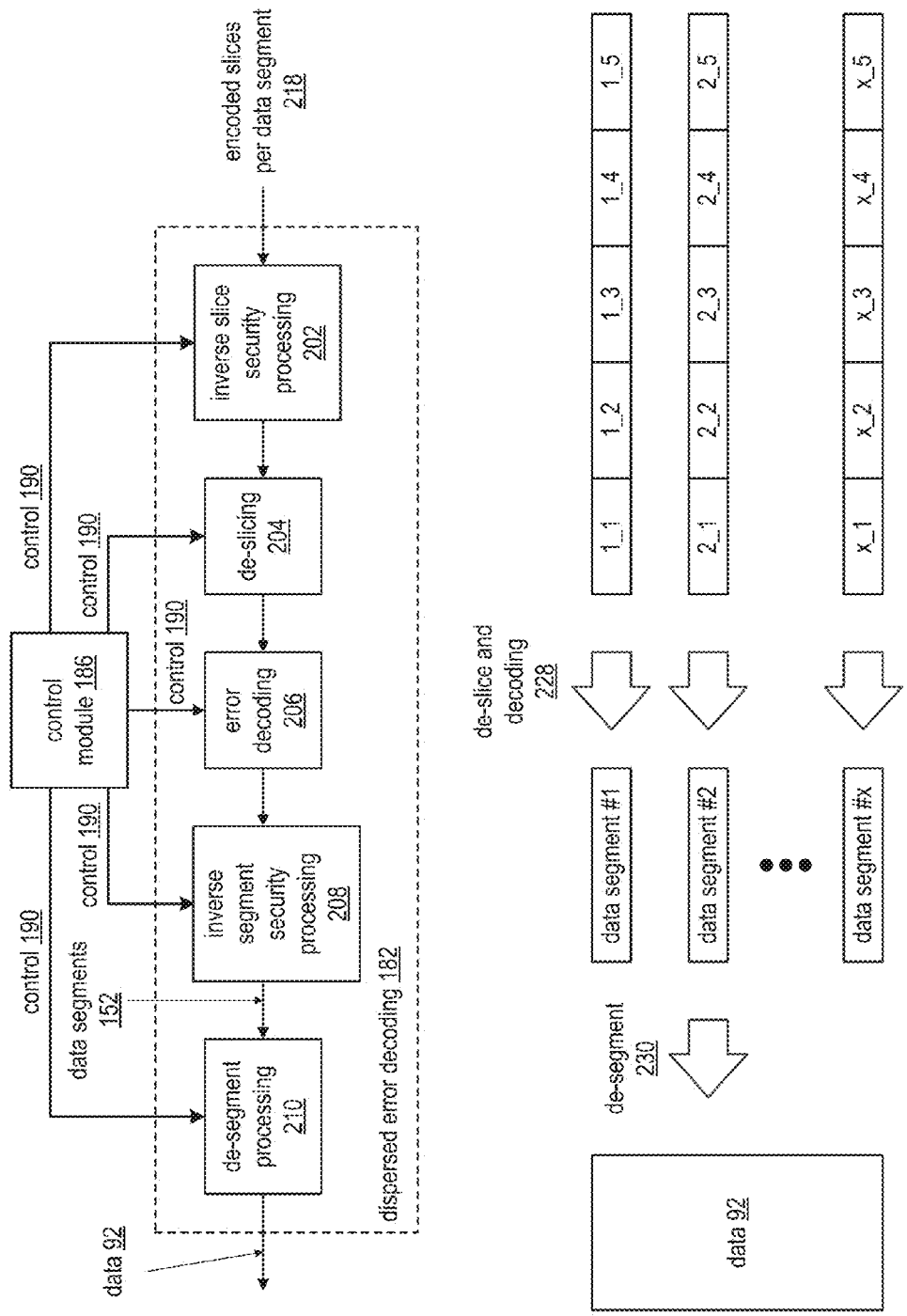
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3). The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
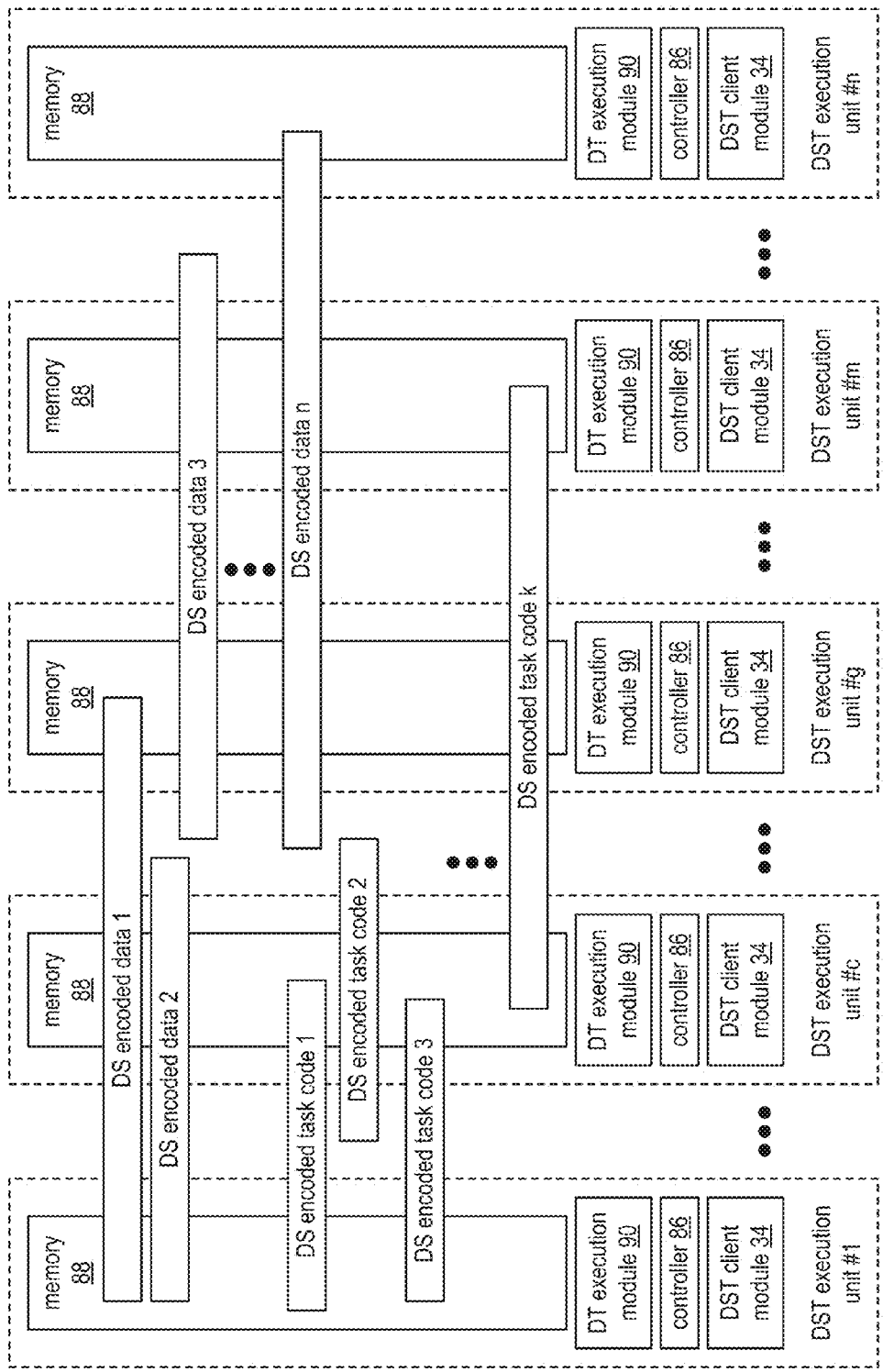
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
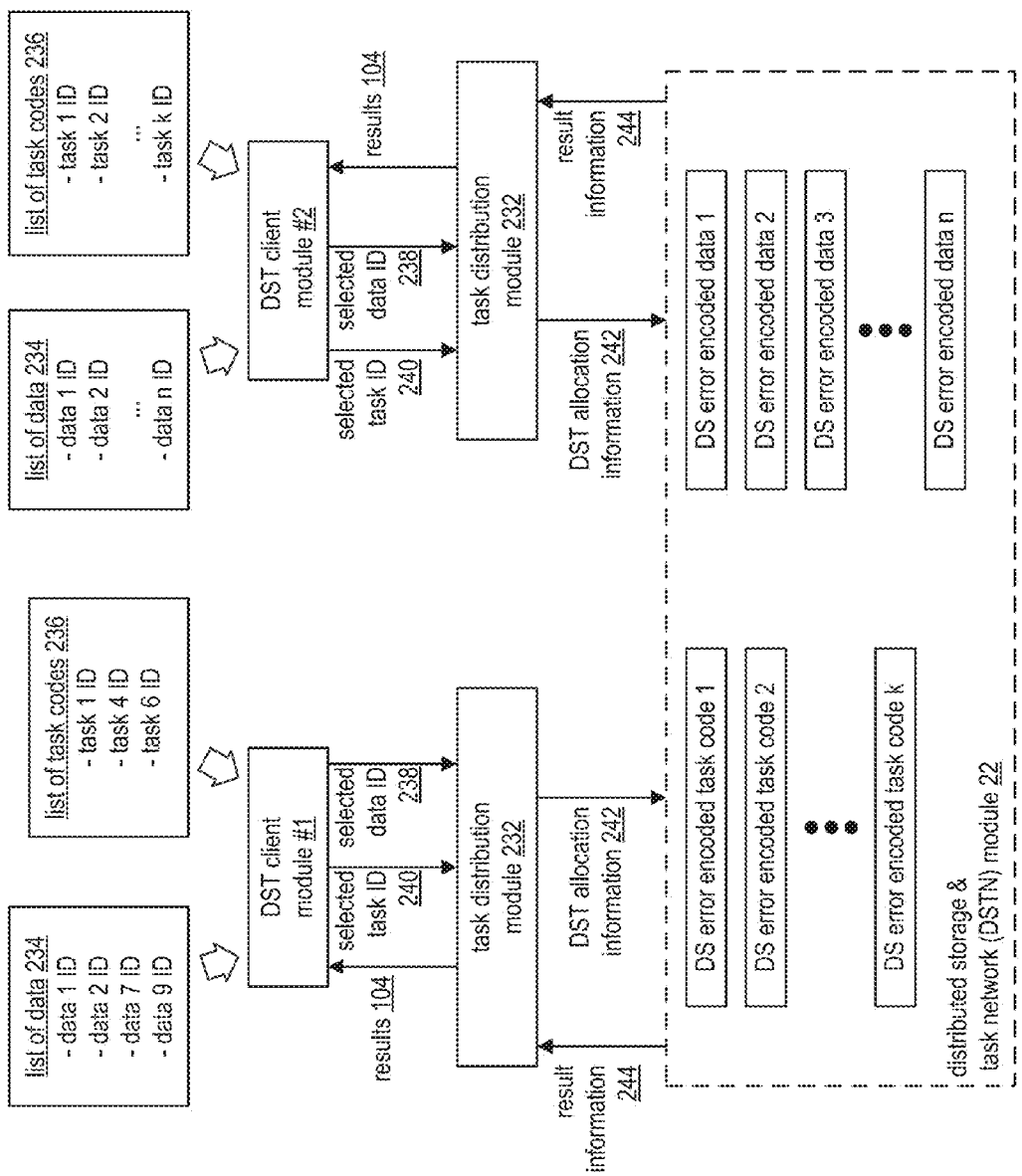
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
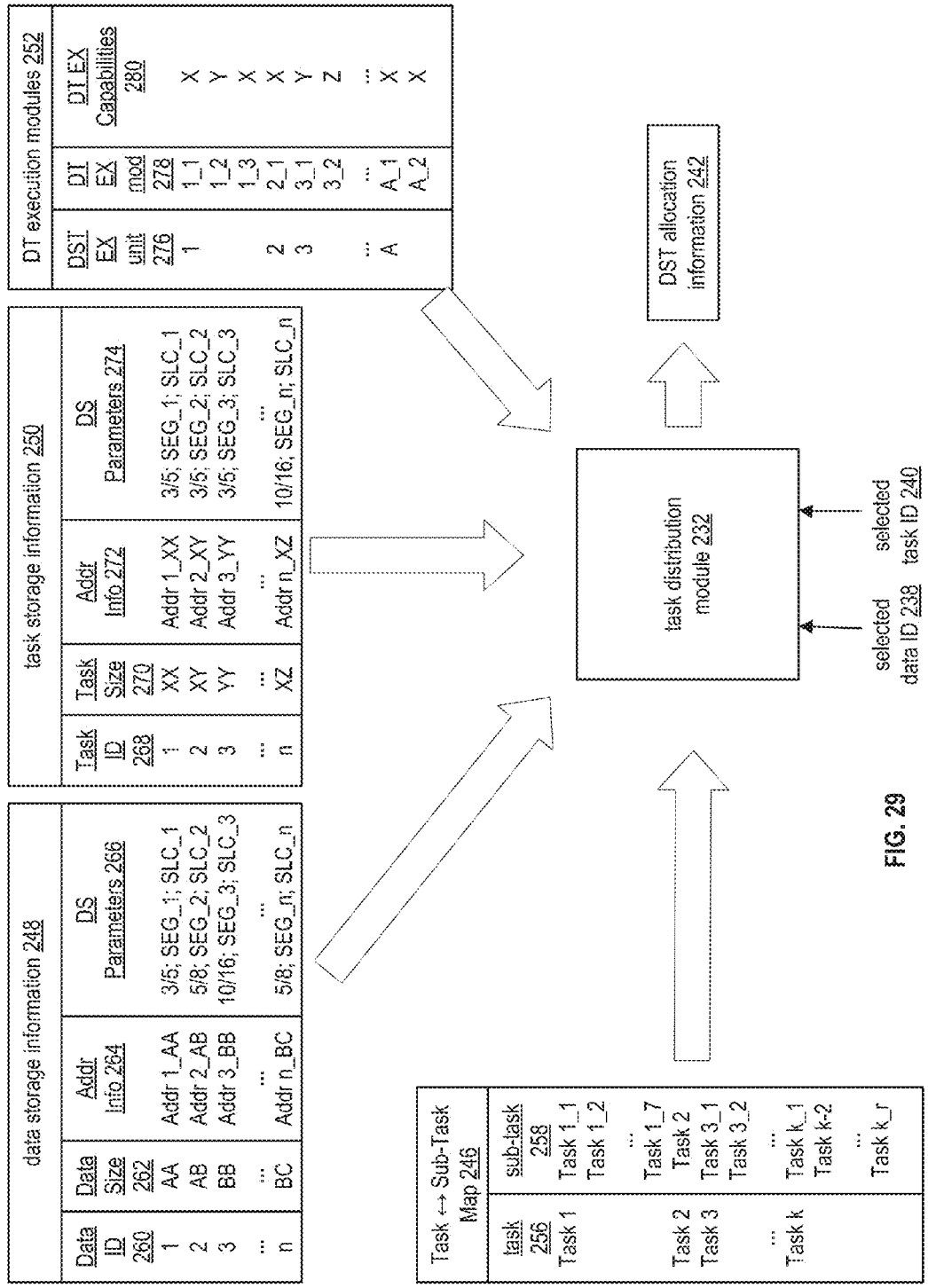
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
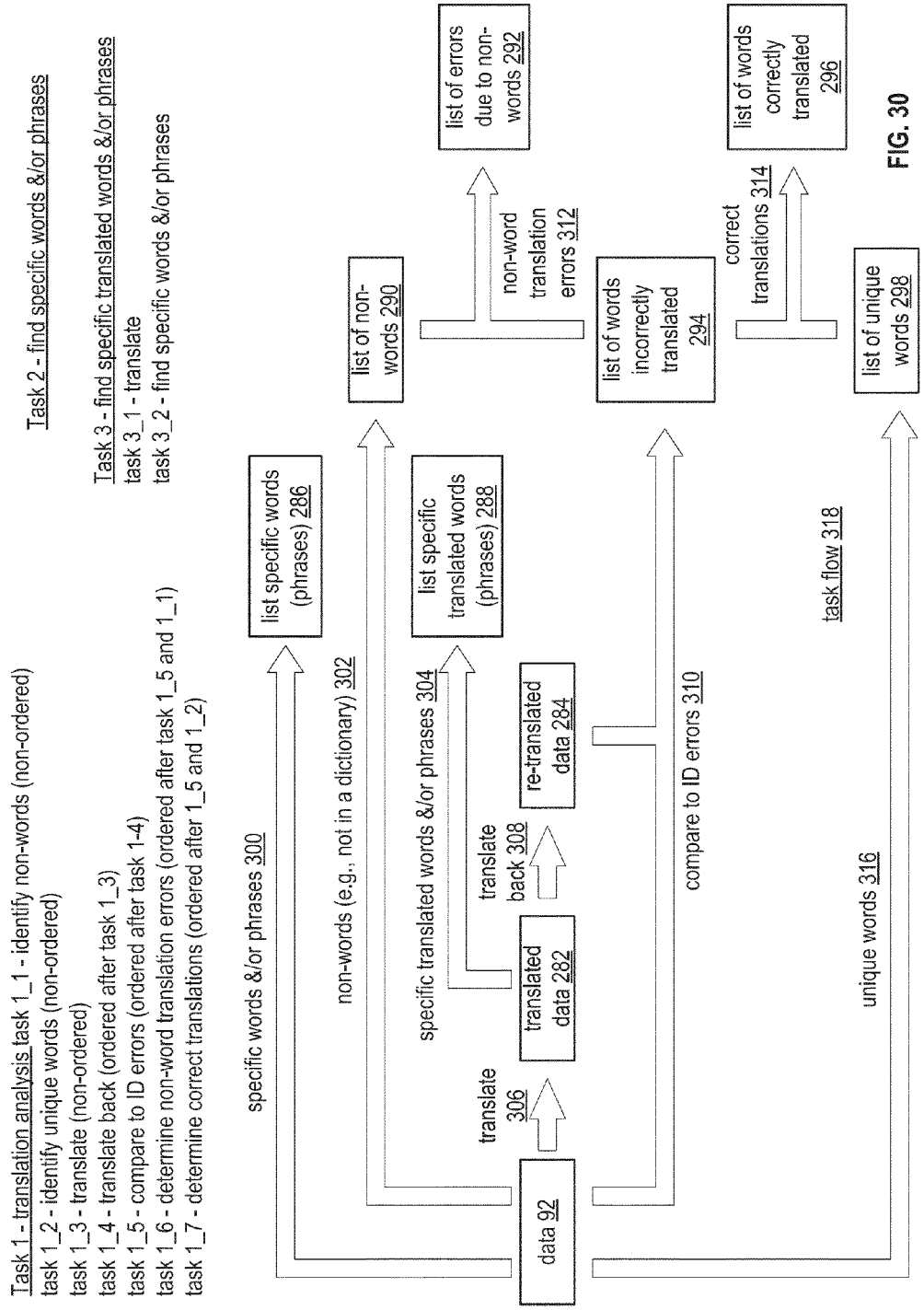
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5-compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
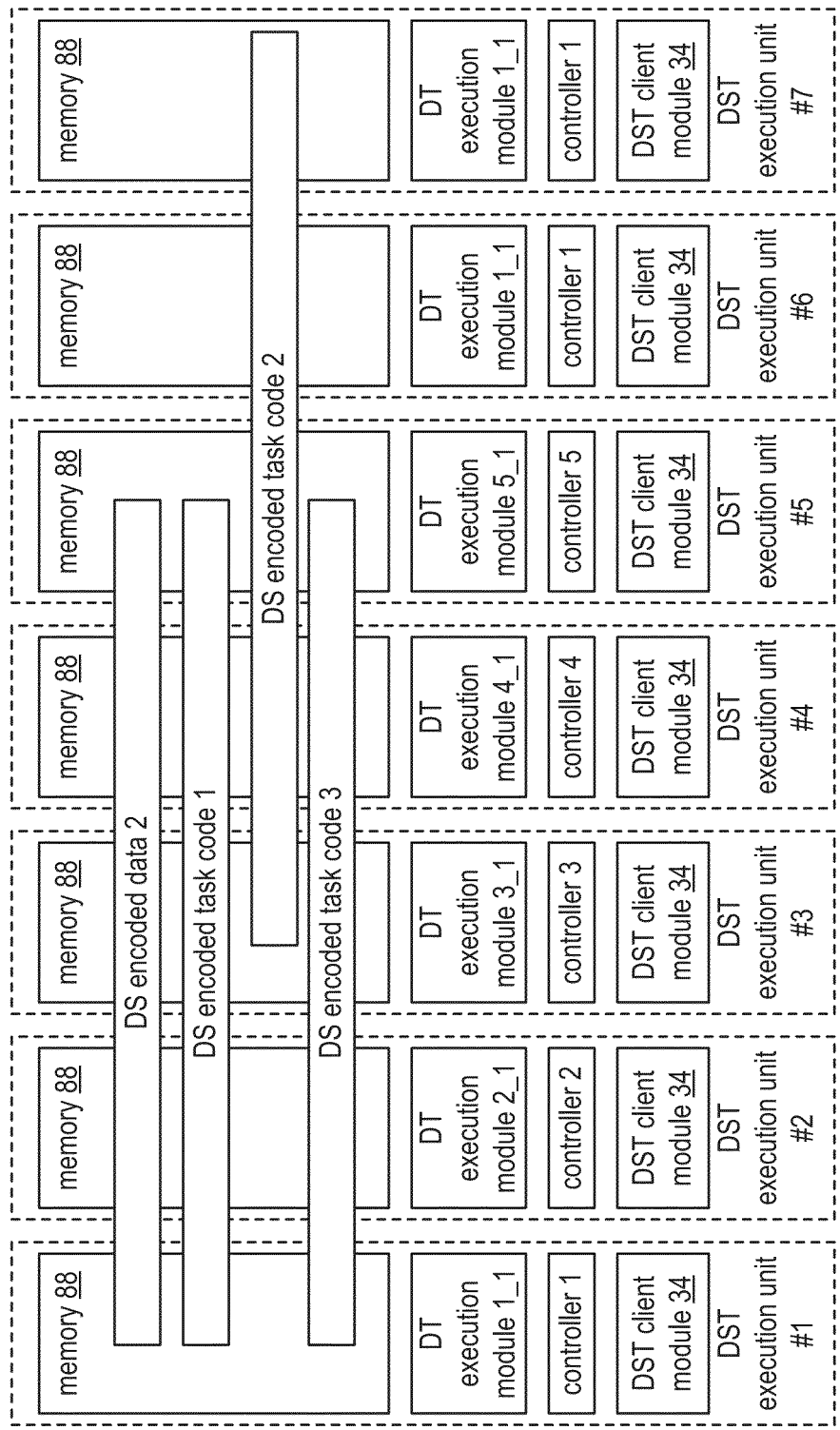
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words).

Task 1_2 (e.g., identify unique words) has similar task execution information as task 1_1 to produce task 1_2 intermediate results (R1-2, which is the list of unique words). Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
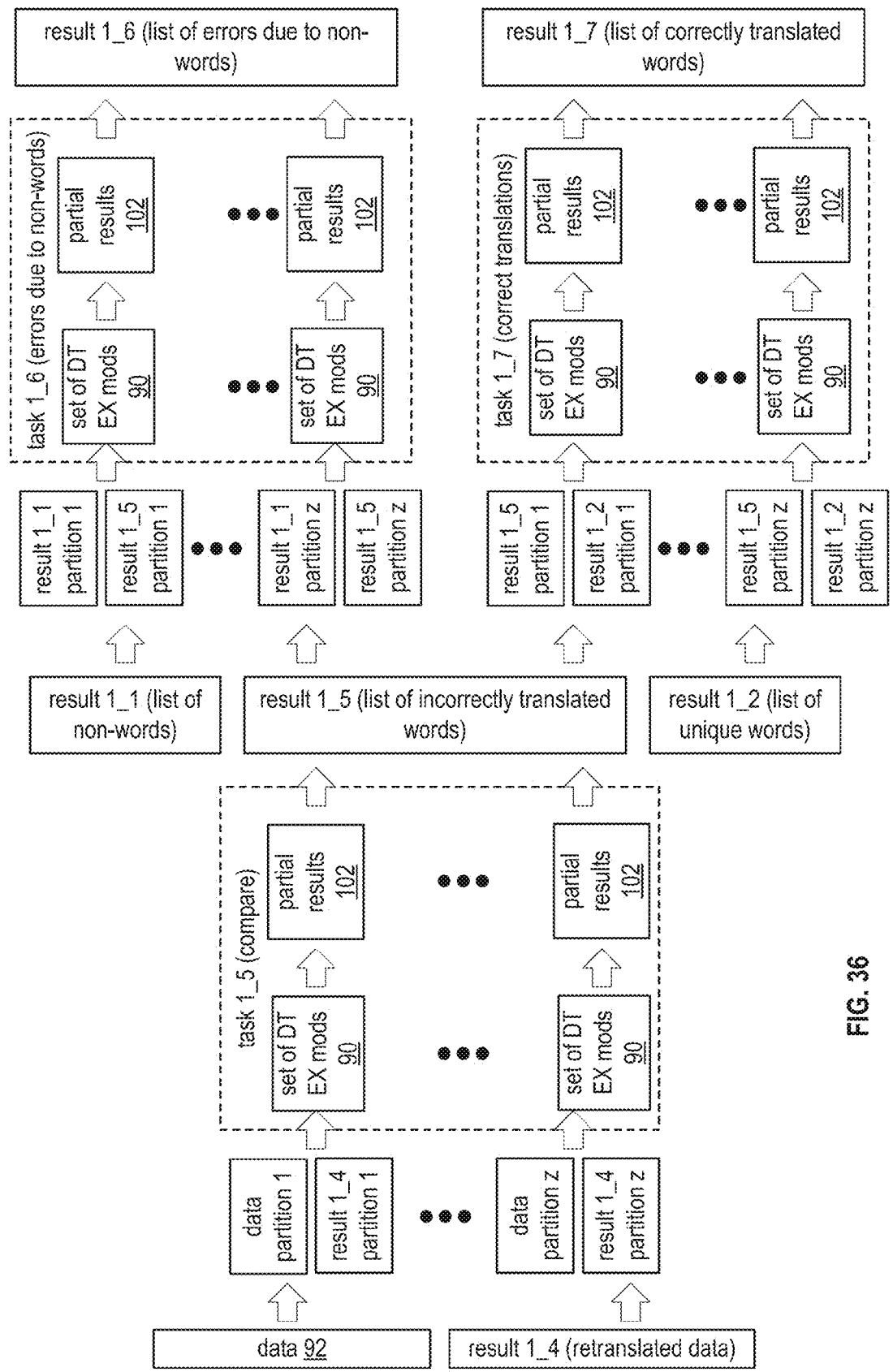

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
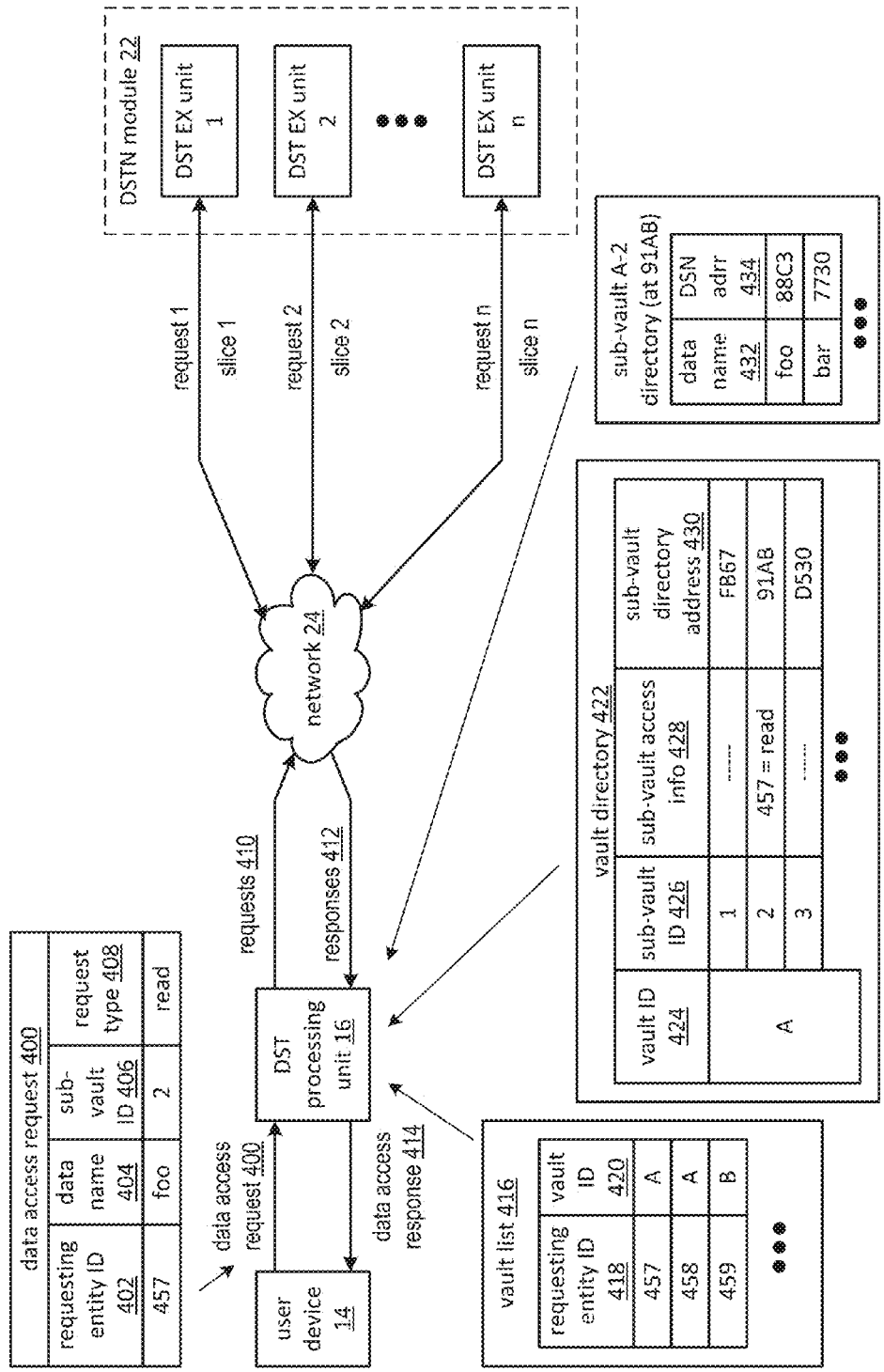
FIG. 40A is a schematic block diagram of an embodiment of a dispersed storage network (DSN) in accordance with the present invention.

FIG. 40A is a schematic block diagram of an embodiment of a dispersed storage network (DSN) that includes the user device 14, the distributed storage and task (DST) processing unit 16, the network 24, and the distributed storage and task network (DSTN) module 22 of FIG. 1. The DSTN module 22 includes a set of DST execution units 1-n. The set of DST execution units 1-n includes the DST execution units 36 of FIG. 1.

In an embodiment, the dispersed storage and task (DST) processing unit 16 includes at least one module, such as DST client module 34, when operable within a computing device, that causes the computing device to perform the following method steps: receiving a data access request for at least one data segment stored in the DSN; identifying a vault associated with the data access request and one of a plurality of sub-vaults associated with the vault; retrieving access information corresponding to the one of the plurality of sub-vaults to determine whether the data access request is allowed; and when the data access request is allowed, retrieving a sub-vault directory associated with the one of the plurality of sub-vaults to identify a DSN address corresponding to the data access request, and fulfilling the data access request based on with the DSN address.

In an embodiment, the data access request includes a requesting entity identifier (ID) and the vault is identified based on the requesting entity ID. The one of the plurality of sub-vaults can be identified based on an identification of the vault and based on a sub-vault ID included in the data access request. Retrieving the access information corresponding to the one of the plurality of sub-vaults can include retrieving a vault directory corresponding to the vault associated with the data access request. The vault directory can indicate an address for each of the plurality of sub-vaults associated with the vault. Determining whether the data access request is allowed can include determining a request type associated with the data access request and allowing the data access request when the access information indicates the request type is allowed. The data access request can indicate the request type as one of: a read request, or a write request.

The method described above in conjunction with the DST processing unit 16 can alternatively be performed by other modules of a dispersed storage network, of a dispersed storage and tracking network or by other devices. In addition, at least one memory section that stores operational instructions can, when executed by one or more processing modules of one or more computing devices of a dispersed storage network (DSN), cause the one or more computing devices to perform any or all of the method steps described above.

In an example of operation shown, the DST processing unit 16 receives a data access request 400 from the user device 14. The data access request 400 includes one or more of a requesting entity identifier (ID) field 402, a data name field 404, a sub-vault ID field 406, a request type field 408, and a data object when the data access request corresponds to a write request. The requesting entity ID field 402 includes a requesting entity ID entry corresponding to at least one of the user device 14 and a user of the user device 14. As a specific example, the requesting entity ID is 457 corresponding to the user of the user device 14. The data name field 404 includes a data name entry corresponding to the data object associated with the data access request, where the data name is in accordance with a data naming convention associated with the user device 14. As a specific example, the data name entry is "foo" corresponding to the filename of the data object. The sub-vault ID field includes a sub-vault ID entry 406 corresponding to a sub-vault associated with the user, where a vault associated with the user includes one or more sub-vaults that include the sub-vault. A vault includes a virtual storage entity associated with one or more users. Alternatively, or in addition to, the data access request includes a sub-vault name (e.g., "John's sub-vault") associated with the sub-vault ID 406. The request type field 408 includes a request type entry corresponding to a type of data access request (e.g., write, read, list, delete, etc.) associated with the data object. As a specific example, the request type entry includes a read access type.

Having received the data access request 400, the DST processing unit 16 identifies a vault associated with the data access request 400. The identifying includes obtaining a vault list 416 and extracting a vault ID 420 corresponding to the requesting entity ID entry 418. As a specific example, the DST processing unit 16 issues requests (e.g., requests 1-n) to the set of DST execution units to retrieve at least one set of vault list slices, receives at least a decode threshold number of vault list slices in responses from the set of DST execution units, decodes the decode threshold number of vault list slices to produce the vault list, accesses the vault list 416 using the requesting entity ID entry 418 to extract the vault ID 420.

Having identified the vault ID 420, the DST processing unit 16 determines whether the data access request 400 is allowed based on sub-vault access information 428 of a vault directory 422. The vault directory 422 includes a vault ID field 424, a sub-vault ID field 426, a sub-vault access information field 428, and a sub-vault directory address field 430. The vault ID field 424 includes a vault ID entry. The sub-vault ID field 426 includes a sub-vault ID entry. The sub-vault access information field 428 includes one or more sub-vault access information entries. Each sub-vault access information entry indicates one or more access rights (e.g., allowed request types for all or individual data names associated with one or more sub-vaults of a vault for at least one user and/or user device. As a specific example of determining whether the data access request 400 is allowed, the DST processing unit 16 obtains a vault directory 422 for the vault ID 424 (e.g., issues requests 410 to the set of DST execution units, receives responses 412, decodes vault directory slices to reproduce the vault directory) extracts the sub-vault access information 428 from the vault directory 422 based on the sub-vault ID 426, and compares the requesting entity ID 402 and request type 408 to the sub-vault access information 428 to determine whether the data access request 400 is allowed. As a specific example, the DST processing unit 16 indicates that the data access request 400 is allowed when the sub-vault access information 428 indicates that user 457 is allowed to read sub-vault 2.

When the DST processing unit 16 determines that the data access request 428 is not allowed, the DST processing unit 16 issues a data access response 414 to the user device 14 indicating that the data access request 400 is not allowed. When the DST processing unit 16 determines that the data access request 400 is allowed, the DST processing unit 16 accesses a sub-vault directory to identify a DSN address 434 for the data access request 400. As a specific example, the DST processing unit 16 extracts a sub-vault directory address 430 from the vault directory 422, accesses the DSTN module 22 utilizing the sub-vault directory address 430 to recover the sub-vault directory, and extracts the DSN address 434 from the sub-vault directory utilizing the data name 432. For instance, the DST processing unit 16 extracts sub-vault directory address 91AB from the vault directory 422, accesses the DSTN module 22 at DSN address 91AB to recover sub-vault A-2 directory, and extracts DSN address 88C3 corresponding to the data name "foo." Having identified the DSN address 434 for the data access request 400, the DST processing unit 16 accesses the DSTN module 22 utilizing the DSN address 434 to process the data access request 400. The DST processing unit 16 issues a data access response 414 to the user device 14, where the data access response 414 is based on accessing the DSN address.

Figure 40B:
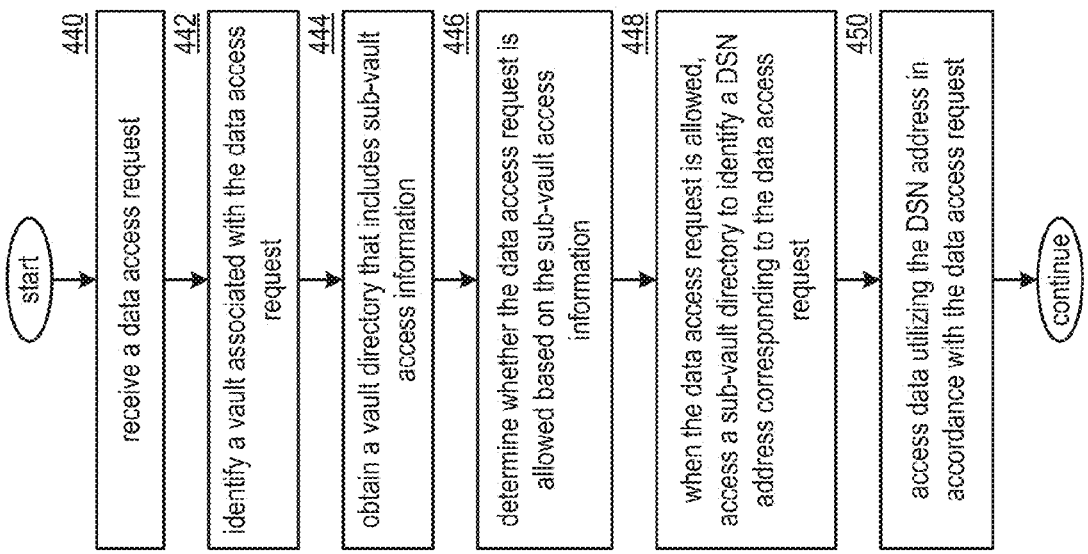
FIG. 40B is a flowchart illustrating an example of accessing a dispersed storage network (DSN) sub-vault in accordance with the present invention.

FIG. 40B is a flowchart illustrating an example of accessing a dispersed storage network (DSN) sub-vault. The method includes step 440 where a processing module (e.g., of a distributed storage and task (DST) client module) receives a data access request. The data access request includes one or more of requesting entity identifier (ID), a data name, a sub-vault ID, a sub-vault name, and a request type. The method continues at step 442 where the processing module identifies a vault associated with the data access request. As a specific example, the processing module obtains a vault list and performs a vault ID look up using the requesting entity ID to identify the vault ID.

The method continues at step 444 where the processing module obtains a vault directory that includes sub-vault access information. As a specific example, the processing module obtains (e.g., retrieves slices, decode slices) a vault directory that corresponds to the vault ID. The method continues at step 446 where the processing module determines whether the data access request is allowed based on the sub-vault access information. As a specific example, the processing module determines whether the request type of the data access request is allowed for the requesting entity based on the sub-vault access information.

When the data access request is allowed, the method continues at step 448 where the processing module accesses a sub-vault directory to identify a DSN address corresponding to the data access request. As a specific example, the processing module obtains a sub-vault directory address from the vault directory, retrieves the sub-vault directory using the sub-vault directory address (e.g., retrieved slices, decode slices), and extracts the DSN address corresponding to the data access request from the sub-vault directory.

Having identified the DSN address, the method continues at step 450 where the processing module accesses data utilizing the DSN address in accordance with the data access request. As a specific example, the processing module issues one or more sets of read slice requests using the DSN address to retrieve slices when the data access request includes a read request. As another specific example, the processing module issues one or more sets of write slice requests using the DSN address, where the write slice requests includes encoded data slices encoded from data of the data access request when the data access request includes a write request.

Figure 41A:
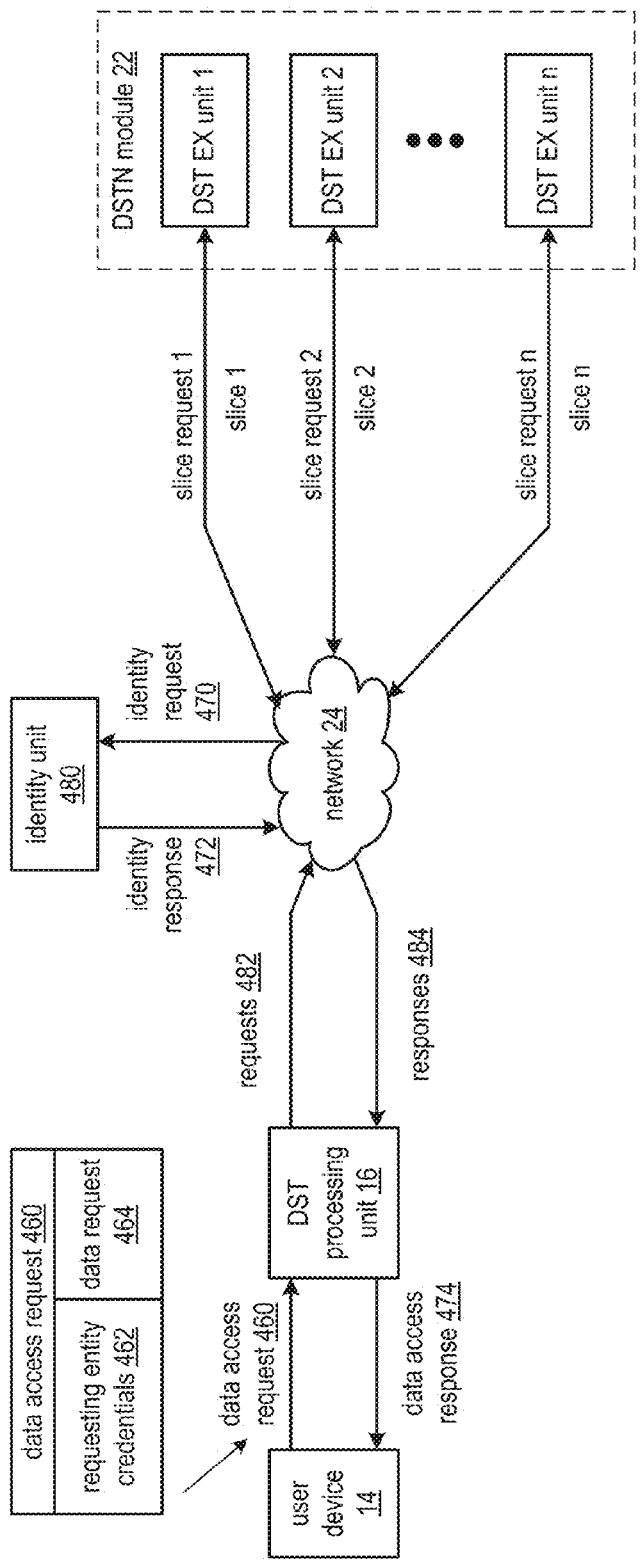
FIG. 41A is a schematic block diagram of another embodiment of a dispersed storage network (DSN) in accordance with the present invention.

FIG. 41A is a schematic block diagram of another embodiment of a dispersed storage network (DSN) that includes at least one identity unit 480, the user device 14, the distributed storage and task (DST) processing unit 16, the network 24, and the distributed storage and task network (DSTN) module 22 of FIG. 1. The DSTN module 22 includes a set of DST execution units 1-n. The set of DST execution units 1-n includes the DST execution units 36 of FIG. 1.

In an embodiment, the dispersed storage and task (DST) processing unit 16 includes at least one module, such as DST client module 34, when operable within a computing device, that causes the computing device to perform the following method steps: receiving a data access request for at least one data segment stored in the DSN; selecting one of a plurality of identity units based on the data access request; determining, via the selected one of the plurality of identity units, whether to allow the data access request; and processing the data access request, when the data access request is allowed via the selected one of the plurality of identity units.

In an embodiment, the data access request includes requesting entity credentials and indicates a request type. The one of the plurality of identity units can be selected based on at least one of: the requesting entity credentials, or the request type. Determining whether to allow the data access request can include reviewing the requesting entity credentials via the selected one of the plurality of identity units. When the data access request is allowed, processing the data access request can be further conditioned on whether the requesting entity is authorized to perform the request type. When the data access request is allowed, the data access request can be denied when the requesting entity is not authorized to perform the request type. The method can further include denying the data access request, when the data access request is not allowed via the selected one of the plurality of identity units.

The method described above in conjunction with the DST processing unit 16 can alternatively be performed by other modules of a dispersed storage network, of a dispersed storage and tracking network or by other devices. In addition, at least one memory section that stores operational instructions can, when executed by one or more processing modules of one or more computing devices of a dispersed storage network (DSN), cause the one or more computing devices to perform any or all of the method steps described above.

In an example of operation shown, the DST processing unit 16 receives a data access request 460 from the user device 14. The data access request 460 includes a requesting entity credentials field 462 and a data request field 464. The requesting entity credentials field 462 includes one or more requesting entity credential entries (e.g., a requesting entity identifier (ID), a requesting entity name, a password, and a signed certificate). The data request field 464 includes one or more data request entries (e.g., a request type, a data name, data).

Having received the data access request 460, the DST processing unit 16 selects an identity unit 480 based on one or more of the requesting entity credentials 462 and a request type 464 of the data access request 460. As a specific example, the DST processing unit 16 selects a first identity unit associated with the requesting entity identifier. As another specific example, the DST processing unit selects a second identity unit associated with a write request type of the data request. Having identified the identity unit 480, the DST processing unit 16 issues an identity request 470 to the selected identity unit 480, where the identity request 470 includes the requesting entity credentials 462. The identity unit 480 receives the identity request 470, where the identity request 470 is associated with at least one of the data access request 460 and a slice access request. The identity unit 480 determines whether the requesting entity credentials 462 are valid (e.g., valid when a password matches a requesting entity ID, valid when a signed certificate includes a valid signature by a valid authorizing signing entity). The identity unit 480 issues an identity response 472 to the DST processing unit 16 indicating whether the requesting entity has been authenticated or not authenticated. The identity unit 480 indicates that the requesting entity has been authenticated when the requesting entity credentials 462 are valid.

The DST processing unit 16 receives the identity response 472 from the selected identity unit 480. Having received the identity response 472, the DST processing unit 16 determines whether the identity response 472 is favorable (e.g., authenticated). When the identity response 472 is favorable, the DST processing unit 16 processes the data access request 460. The processing of the data access request 460 may further include authorizing a request type of the data request 464 based on the requesting entity identifier and access control information that indicates whether the requesting entity is authorized to perform the request type. The processing of the data access request further includes issuing requests 482 (e.g., slice requests 1-n) to the set of DST execution units 1-n, processing responses 484 (e.g., slices 1-n) from the DST execution units, and issuing a data access response 474 to the user device 14 based on the processing of the responses (e.g., a status when the data request includes a write data access request, a data object when the data request includes a re-data access request).

Figure 41B:
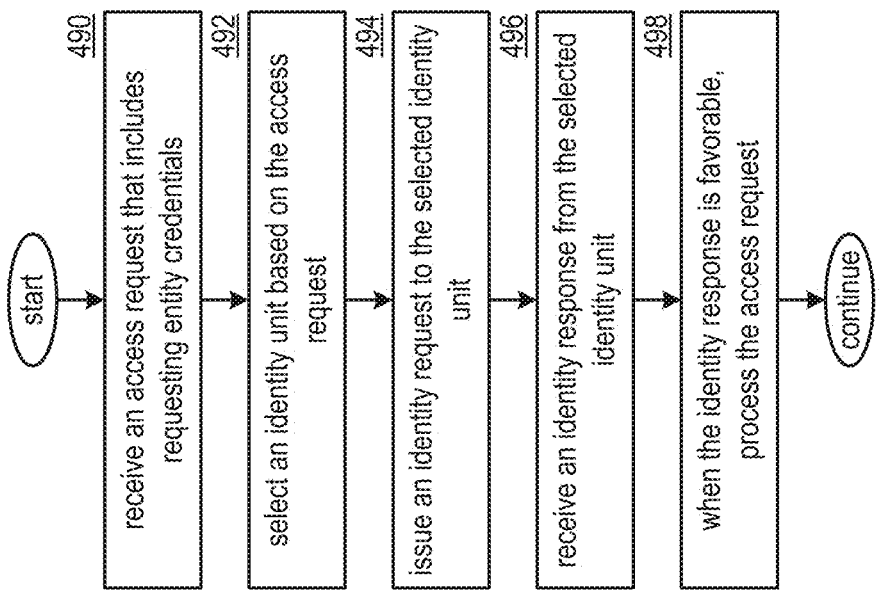
FIG. 41B is a flowchart illustrating an example of authenticating a requesting entity in accordance with the present invention.

FIG. 41B is a flowchart illustrating an example of authenticating a requesting entity. The method includes step 490 where a processing module (e.g., of a distributed storage and task (DST) client module) receives an access request (e.g., a data access request, a slice access request) that includes requesting entity credentials. The method continues at step 492 where the processing module selects an identity unit based on the access request. As a specific example, the processing module selects the identity unit based on a requesting entity ID and a mapping of requesting entity identifiers to various identity units. As another specific example, the processing module selects the identity unit based on a request type of the access request.

The method continues at step 494 where the processing module issues an identity request to the selected identity unit. The issuing includes generating the identity request to include the requesting entity credentials and sending the identity request to the selected identity unit. The method continues at step 496 where the processing module receives an identity response from the selected identity unit. When the identity response is favorable (e.g., the requesting entity is authenticated), the method continues at step 498 where the processing module processes the access request (e.g., write, read, delete, list, etc.). The processing may further include authorizing the access request based on the requesting entity ID and access control information.

Figure 42A:
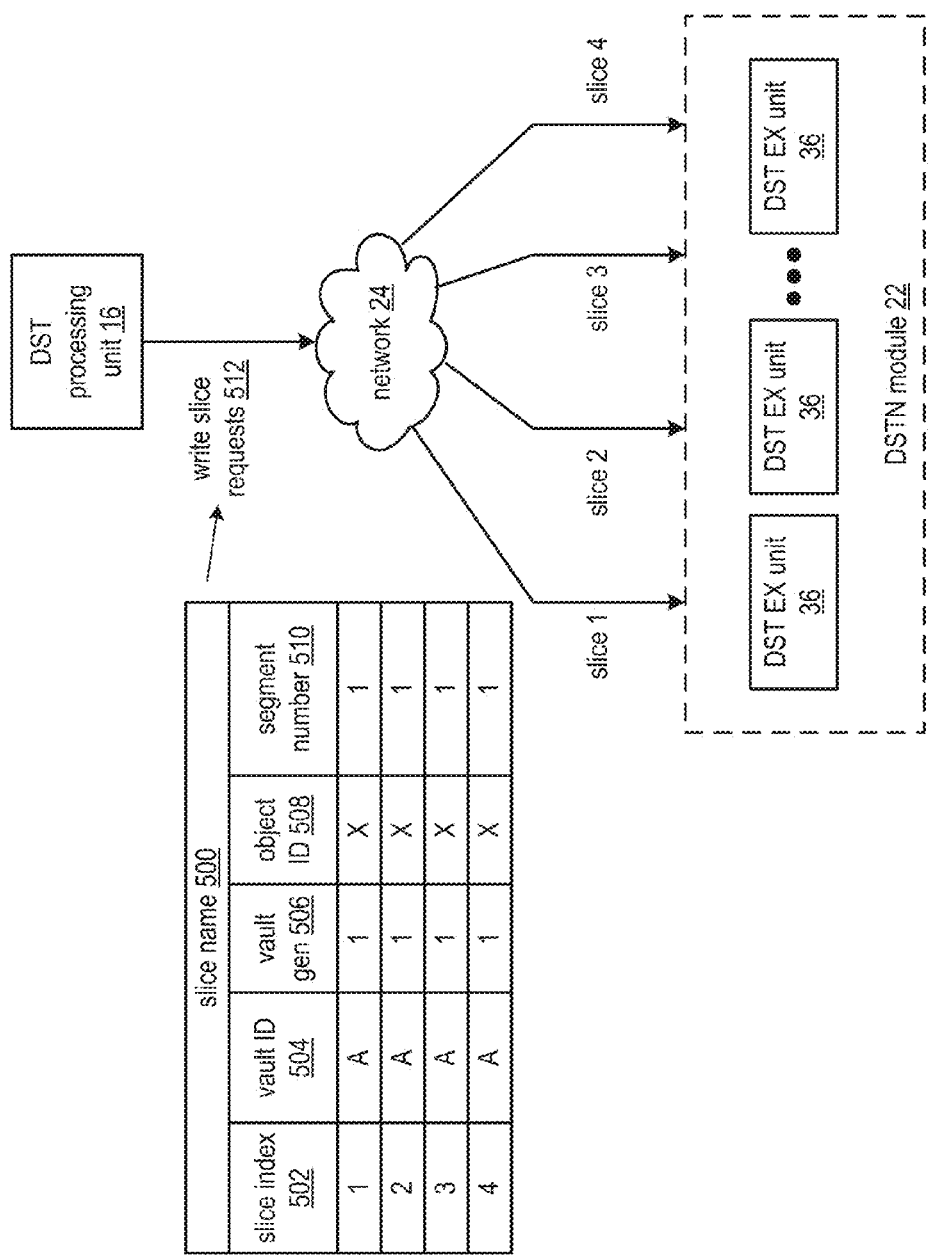
FIG. 42A is a schematic block diagram of another embodiment of a dispersed storage network (DSN) in accordance with the present invention.

FIG. 42A is a schematic block diagram of another embodiment of a dispersed storage network (DSN) that includes the distributed storage and task (DST) processing unit 16, the network 24, and the distributed storage and task network (DSTN) module 22 of FIG. 1. The DSTN module 22 includes a plurality of DST execution units 36 of FIG. 1.

In an embodiment, the dispersed storage and task (DST) processing unit 16 includes at least one module, such as DST client module 34, when operable within a computing device, that causes the computing device to perform the following method steps: storing a set of encoded data slices in an original plurality of storage units of the DSN associated as a current generation of a storage vault; determining whether utilization of the original plurality of storage units is greater than a utilization threshold; when the utilization of the original plurality of storage units is greater than the utilization threshold, updating the original plurality of storage units to include at least one additional storage unit and a proper subset of the original plurality of storage units associated as the current generation of a storage vault to generate an updated plurality of storage units associated as a next generation of the storage vault; and storing the set of encoded data slices in the updated plurality of storage units of the DSN associated as the next generation of the storage vault.

In an embodiment, the original plurality of storage units includes N storage units wherein N is an integer greater than 2 and wherein N−1 of the original plurality of storage units are included in the updated plurality of storage units. The value of N can be based on or correspond to a write threshold number of encoded data slices for a data segment stored in the DSN in at least one of the set of encoded data slices. The original plurality of storage units can be associated as the current generation of the storage vault, via a table. Determining whether utilization of the original plurality of storage units is greater than the utilization threshold can include determining whether utilization of any one of the original plurality of storage units is greater than the utilization threshold. The proper subset of the original plurality of storage units can be determined by including ones of the original plurality of storage units having utilization that is less than the utilization threshold. The set of encoded data slices can be stored in the updated plurality of storage units, such that no one encoded data slice of the set of encoded data slices is stored in a storage unit of the updated plurality of storage units used to store the one encoded data slice of the set of encoded data slices in the original plurality of storage units.

The method described above in conjunction with the DST processing unit 16 can alternatively be performed by other modules of a dispersed storage network, of a dispersed storage and tracking network or by other devices. In addition, at least one memory section that stores operational instructions can, when executed by one or more processing modules of one or more computing devices of a dispersed storage network (DSN), cause the one or more computing devices to perform any or all of the method steps described above.

In an example of operation shown, the DST processing unit 16 encodes a data object using a dispersed storage error coding function to produce a plurality of sets of encoded data slices. The DST processing unit 16 generates a plurality of sets of slice names 500 corresponding to the plurality of sets of encoded data slices. Each slice name 500 includes one or more of a slice index field 502, a vault identifier (ID) field 504, a vault generation field 506, and an object ID field 508, and a segment number field 510. The slice index field 502 includes a slice index entry (e.g., a pillar number of dispersal parameters associated with the dispersed storage error coding function) corresponding to a corresponding encoded data slice of each set of encoded data slices. As a specific example, the slice index entry includes at least one of 1-4 when a pillar width dispersal parameter of the dispersed storage error coding function is 4 and each set of encoded data slices includes four encoded data slices. The vault ID field 504 includes a vault ID entry, where the vault ID entry corresponds to at least one of the data object and/or a requesting entity requesting storage of the data object.

The vault generation field 506 includes a vault generation entry, where the vault generation entry designates a generation of one or more generations associated with a common vault. As a specific example, the DST processing unit 16 generates encoded data slices associated with a first generation of vault A until which time the first generation is considered full. Subsequent to the filling of the first generation, the DST processing unit 16 generates encoded data slices associated with a second-generation of vault A. The object ID field 508 includes an object ID entry that is uniquely associated with the data object. As a specific example, the DST processing unit 16 generates the object ID entry by generating a random number. As another specific example, the DST processing unit 16 generates the object ID entry by performing a deterministic function on an identifier associated with the data object. The segment number field includes a segment number entry, where each segment number entry is associated with a set of the plurality of sets of encoded data slices. As a specific example, a segment number entry of 1 corresponds to a first set of encoded data slices and a segment number entry of 2 corresponds to a second set of encoded data slices, etc.

Having generated the plurality of sets of encoded data slices and the plurality of sets of corresponding slice names, the DST processing unit 16 issues one or more sets of write slice requests 512 to DST execution units 36. As a specific example, the DST processing unit 16 issues 4 write slice requests 512 to the DSTN module 22, where a first write slice request includes encoded data slices and slice names corresponding to slice index 1, a second write slice request includes encoded data slices and slice names corresponding to slice index 2, etc.

When utilization of storage capacity of the DST execution units 36 utilized to store encoded data slices associated with the first vault generation is greater than a maximum utilization threshold level, the DST processing unit 16 commissions one or more new DST execution units 36 and establishes another vault generation for storage of further sets of encoded data slices associated with the common vault ID of A. As a specific example, the DST processing unit 16 commissions a width number (e.g., 4) of DST execution units 36, where each of the four new DST execution units 36 is associated with one of the slice indexes 1-4 for the second vault generation. As another specific example, the DST processing unit 16 commissions one new DST execution unit 36, where three of an original four DST execution units 36 and the one new DST execution unit 36 are associated with encoded data slices of slice indexes 1-4 for the second-generation vault. The commissioning of new DST execution units 36 and assignment of another vault generation is discussed in greater detail with reference to FIGS. 42B-C.

Figure 42B:
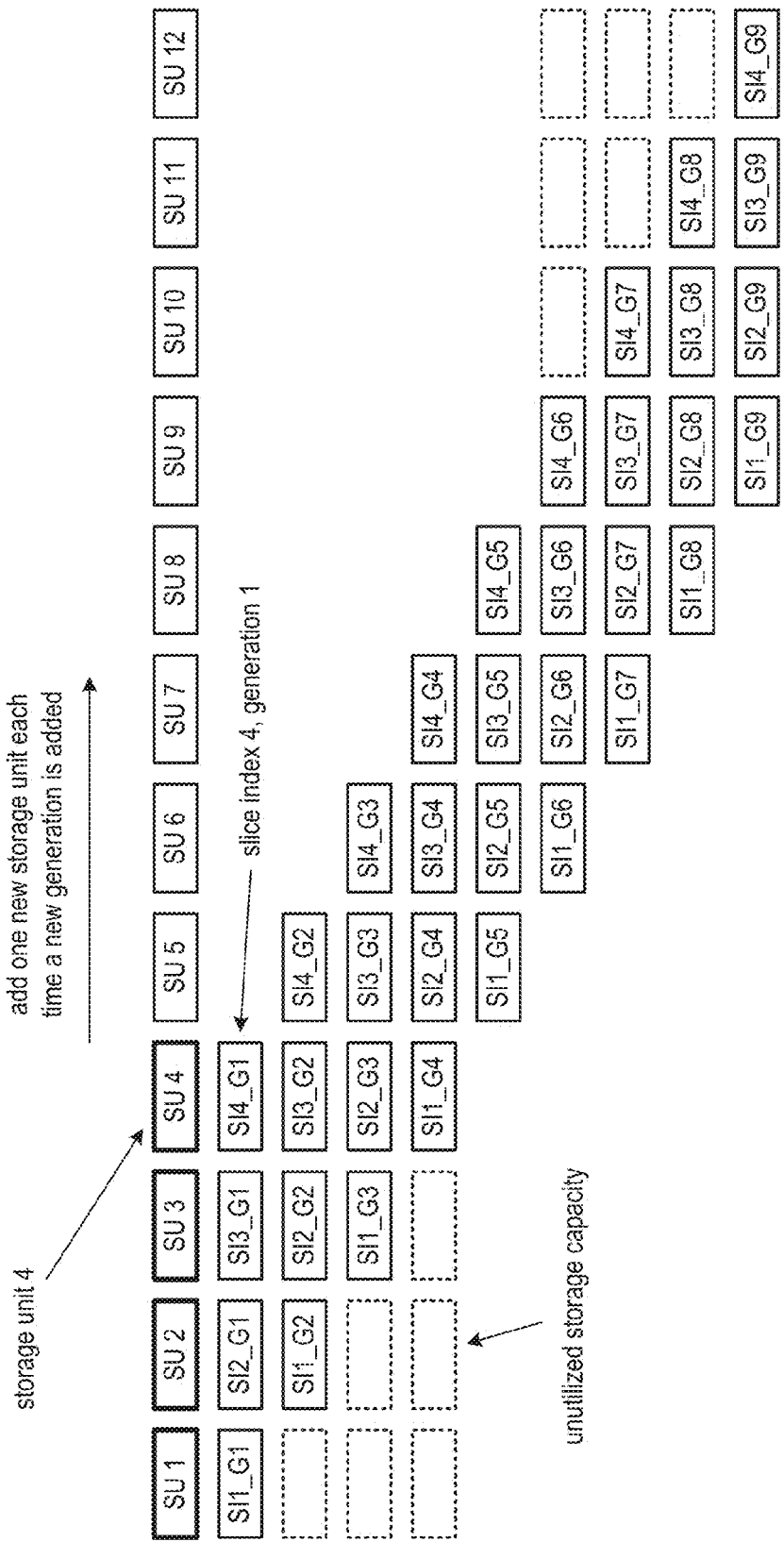
FIG. 42B is a diagram illustrating an example of generation mapping to storage units in accordance with the present invention.

FIG. 42B is a diagram illustrating an example of generation mapping to storage units that includes four original storage units (SU) 1-4 and subsequently added storage units 5-12. The four original storage units 1-4 are mapped to encoded data slices of slice names including slice indexes 1-4 for a first generation of a common vault when a width dispersal parameter of a dispersed storage error encoding function is 4. As more sets of encoded data slices associated with the first generation are stored to the original storage units 1-4, a utilization level is compared to a utilization level threshold. When the utilization level of storage capacity for the first generation is greater than the utilization level threshold, an additional storage unit (e.g., SU5) is commissioned and a first (e.g., SU1) of the original for storage units is omitted from a mapping of a second-generation of the vault to storage units such that SU2 is mapped to slice index 1, SU3 is mapped to slice index 2, SU4 is mapped to slice index 3, and SU5 is mapped to slice index 4 of the second-generation. When the utilization level of storage capacity for the second-generation is greater than another utilization level threshold, an additional storage unit (e.g., SU6) is commissioned and a third-generation of the vault is mapped to storage units 3-6.

With such a mapping, unutilized storage capacity occurs for a width-1 number of the original storage units and temporarily for a newest width-1 number of storage units. The process may continue indefinitely such that a minimum of one additional new storage unit is commissioned when a storage utilization level is greater than a storage utilization threshold level.

Figure 42C:
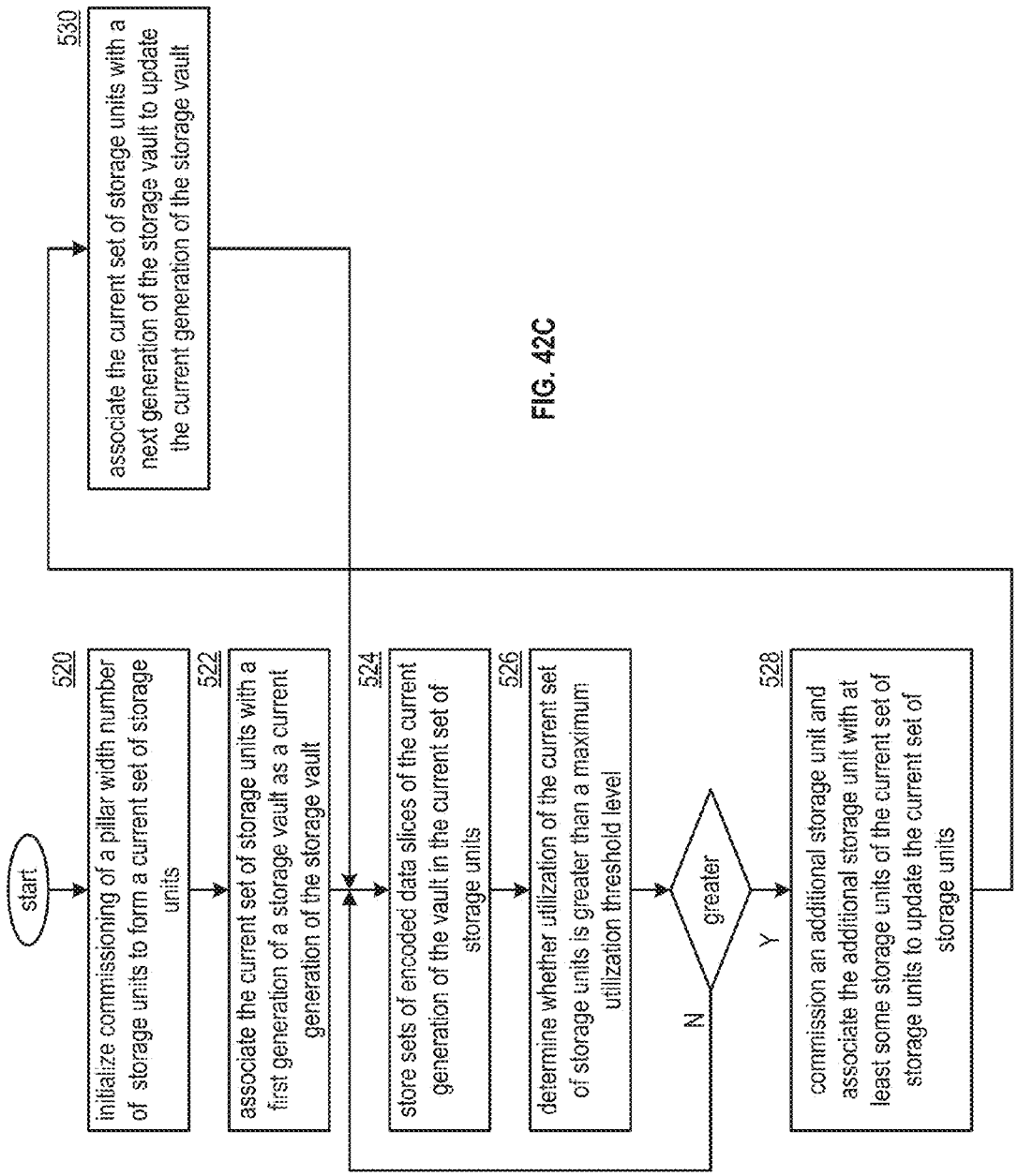
FIG. 42C is a flowchart illustrating an example of commissioning storage units in accordance with the present invention.

FIG. 42C is a flowchart illustrating an example of commissioning storage units. The method includes step 520 where a processing module (e.g., of a distributed storage and task (DST) client module) initializes commissioning of a pillar width number of storage units to form a current set of storage units. The commissioning includes at least one of selecting available storage units, receiving a storage unit assignment information, initiating a query, receiving system manager storage unit selection input, and activating the set of storage units (e.g., programming, configuring, activating for utilization within a dispersed storage network). The method continues at step 522 where the processing module associates the current set of storage units with a first generation of a storage vault as a current generation of the storage vault. As a specific example, the processing module updates a storage table to associate the current set of storage units with the first generation of the storage vault.

The method continues at step 524 where the processing module stores sets of encoded data slices of the current generation of the vault in the current set of storage units. As a specific example, the processing module encodes data objects using a dispersed storage error coding function to produce pluralities of sets of encoded data slices and generates sets of slice names corresponding to the sets of encoded data slices, where each slice name includes a common vault identifier and a first-generation identifier.

The method continues at step 526 where the processing module determines whether utilization of the current set of storage units is greater than a maximum utilization threshold level. As a specific example, the processing module initiates a query to obtain a current utilization level, compares the current utilization level to the maximum utilization threshold level, and indicates that the utilization of the current set of storage units is greater than the maximum utilization threshold level when the current utilization level is greater than the maximum utilization threshold level. The method branches to step 528 where the processing module commissions an additional storage unit when the utilization of the current set of storage units is greater than the maximum utilization threshold level. The method loops back to the step 524 where the processing module stores the sets of encoded data slices when the processing module determines that the utilization of the current set of storage units is not greater than the maximum utilization threshold level.

When the utilization of the current set of storage units is greater than the maximum utilization threshold level, the method continues at step 528 where the processing module commissions an additional storage unit and associates the additional storage unit with at least some storage units of the current set of storage units to update the current set of storage units. As a specific example, the processing module activates a dormant storage unit and associates the activated storage unit with a width minus one number of the current set of storage units to produce an updated current set of storage units.

The method continues at step 530 where the processing module associates the current set of storage units with a next generation of the storage vault to update the current generation of a storage vault. As a specific example, the processing module identifies the next generation as the current generation plus one and updates the storage table to associate the current set of storage units with a next generation. The method branches back to the step 524 where the processing module stores sets of encoded data slices.

Figure 43A:
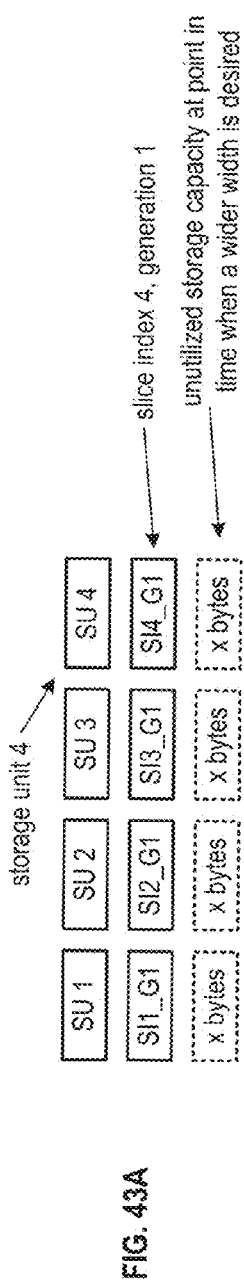
FIGS. 43A, 43B and 43C are diagrams illustrating further examples of generation mapping to storage units in accordance with the present invention.
Figure 43B:
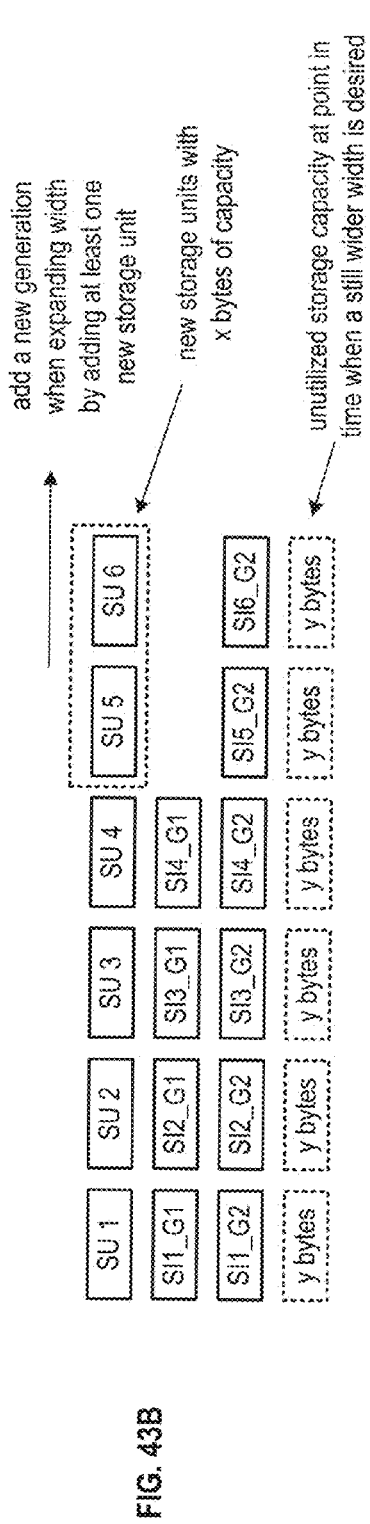
Figure 43C:
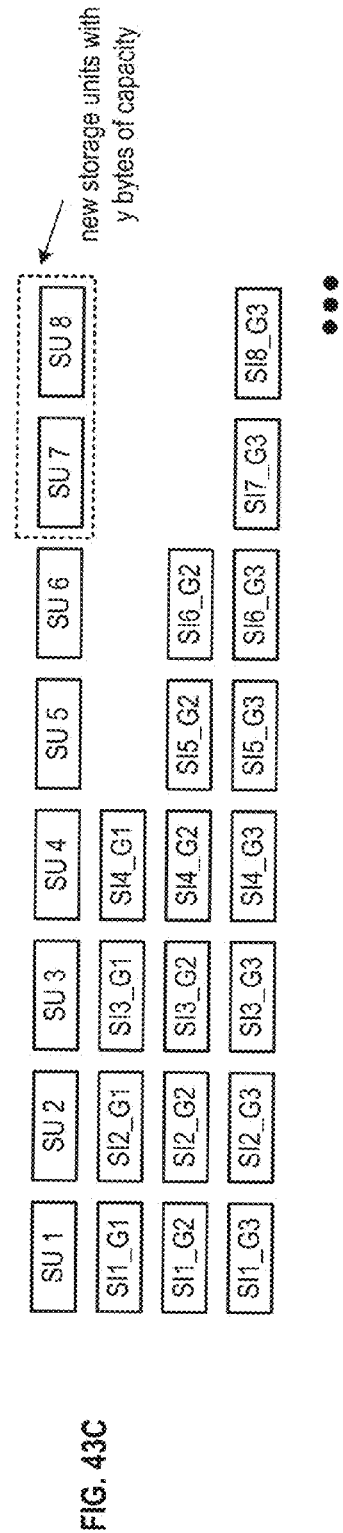

FIGS. 43A, 43B and 43C are diagrams illustrating further examples of generation mapping to storage units that include previous storage units (SU) 1-4 and a new storage units 5-8.

In an embodiment, the dispersed storage and task (DST) processing unit 16 includes at least one module, such as DST client module 34, when operable within a computing device, that causes the computing device to perform the following method steps: storing a set of encoded data slices in an original plurality of storage units of the DSN associated as a current generation of a storage vault; determining whether to increase a width dispersal parameter of the storage vault; when the width dispersal parameter of the storage vault is to be increased, updating the original plurality of storage units to include at least one additional storage unit to generate an updated plurality of storage units associated as a next generation of the storage vault; and storing the set of encoded data slices in the updated plurality of storage units of the DSN associated as the next generation of the storage vault.

In an embodiment, determining whether to increase the width dispersal parameter of the storage vault can include evaluating a performance parameter of the storage vault and increasing the width dispersal parameter when the performance parameter of the storage vault compares unfavorably to a performance threshold. Updating the original plurality of storage units can include determining an updated width dispersal parameter of the storage vault based on a difference between the performance parameter of the storage vault and the performance threshold. Updating the original plurality of storage units can include determining an updated width dispersal parameter of the storage vault by incrementing a previous width dispersal parameter of the storage vault by a predetermined number. Updating the original plurality of storage units can include determining an updated width dispersal parameter of the storage vault and determining an incremental number of storage units based on a difference between the updated width dispersal parameter and a previous width dispersal parameter of the storage vault. Updating the original plurality of storage units can include determining an unutilized capacity for each of the original plurality of storage units. Updating the original plurality of storage units to include at least one additional storage unit can include selecting the at least one additional storage units from a set that includes at least one dormant storage unit and at least one non-dormant storage unit having unutilized capacity.

The method described above in conjunction with the DST processing unit 16 can alternatively be performed by other modules of a dispersed storage network, of a dispersed storage and tracking network or by other devices. In addition, at least one memory section that stores operational instructions can, when executed by one or more processing modules of one or more computing devices of a dispersed storage network (DSN), cause the one or more computing devices to perform any or all of the method steps described above.

In a particular example, FIG. 43A illustrates an initial configuration where the previous storage units 1-4 are mapped to a first generation of a storage vault such that storage unit 1 is associated with storing encoded data slices of slice index 1, storage unit 2 is associated with storing encoded data slices of slice index 2, storage unit 3 is associated with storing encoded data slices of slice index 3, and storage unit4 is associated with storing encoded data slices of slice index 4.

First-generation sets of encoded data slices are stored in the storage units 1-4 in accordance with the mapping. At a point in time, each of the storage units 1-4 has x bytes of unutilized storage capacity when total storage capacity of each of the storage units is substantially the same. A determination may be made at the point in time to add a new generation to accommodate at least one of a wider pillar width and simply adding storage capacity.

FIG. 43B illustrates the point in time of FIG. 43A when a new generation is to be added to accommodate a wider pillar width for the vault. As a specific example, two new storage units (e.g., storage units 5-6) are commissioned to support the new generation (e.g., generation 2), where each of the new storage units includes a minimum of x bytes of total available storage capacity. A mapping of the new generation to the previous storage units 1-4 and the two new storage units 5-6 includes assignment of generation 2 slice index 1 to storage unit 1 , slice index 2 to storage unit 2, through slice index 6 to the storage unit 6.

Second sets of encoded data slices are stored in the storage units 1-6 in accordance with the updated mapping. At another point in time, each of the storage units 1-6 has y bytes of unutilized storage capacity. A determination may be made at the point in time to add another new generation to accommodate at least one of an even wider pillar width and further adding of storage capacity.

FIG. 43C illustrates the point in time of FIG. 43B when another new generation (e.g., generation 3) is to be added to accommodate an even wider pillar width (e.g., 8) for the vault. As a specific example, two more new storage units (e.g., storage units 7- 8) are commissioned to support generation 3, where each of the other new storage units includes a minimum of y bytes of total available storage capacity. A mapping of the new generation to the storage units 1-6 and the two more new storage units 7-8 includes assignment of generation 3 slice index 1 to storage unit 1, slice index 2 to storage unit 2, through slice index 8 to the storage unit 8.

Figure 43D:
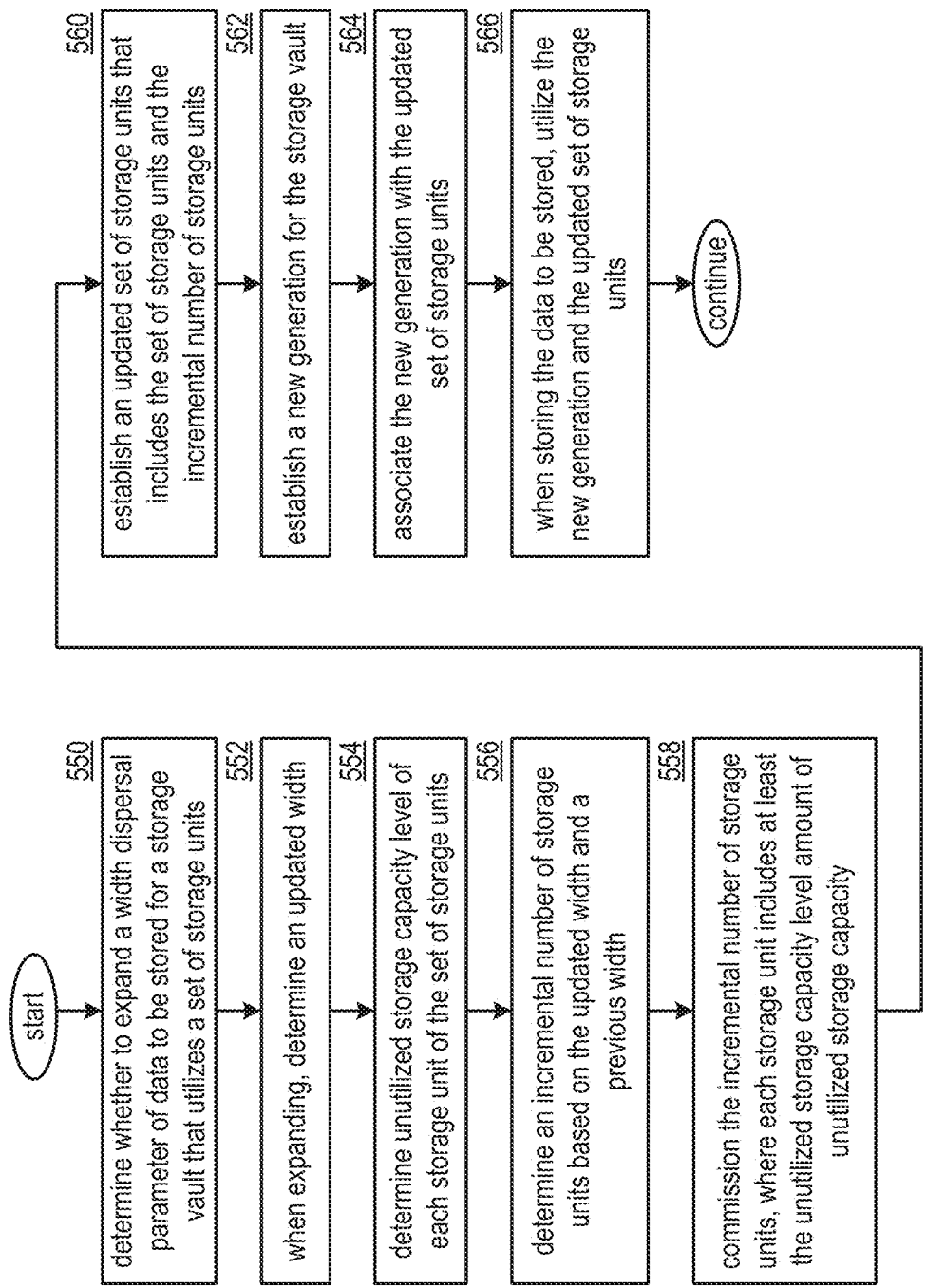
FIG. 43D is a flowchart illustrating another example of commissioning storage units in accordance with the present invention.

FIG. 43D is a flowchart illustrating another example of commissioning storage units. The method includes step 550 where a processing module (e.g., of a distributed storage and task (DST) client module) determines whether to expand a width parameter of dispersal parameters of a dispersed storage error coding function for data to be stored in a storage vault that utilizes a set of storage units. As a specific example, the processing module detects an unfavorable comparison of desired performance (e.g., retrieval reliability) with actual performance of the set of storage units. Alternatively, the processing module determines to add storage capacity without expanding the width of dispersal parameter.

When expanding the pillar width, method continues at step 552 where the processing module determines an updated width. As a specific example, the processing module estimates the updated width based on a comparison of actual performance to desired performance. As another specific example, the processing module adds a default width expansion increment to a current width to produce the updated width. When adding storage capacity without expanding the width, the processing module indicates to continue utilizing the current width.

The method continues at step 554 where the processing module determines an unutilized storage capacity level of each storage unit of the set of storage units. As a specific example, the processing module issues a query and receives a response. The method continues at step 556 where the processing module determines an incremental number of storage units based on the updated width and a previous width (e.g., current width). As a specific example, the processing module determines to utilize two additional storage units when the previous width is 4 and the updated with is 6. Alternatively, the processing module determines the incremental number of storage units based on storage capacity utilization when the storage units are to be added to expand storage capacity. As a specific example, the processing module indicates to utilize two additional storage units when an estimated time frame before adding even further storage units is greater than a time frame threshold level.

The method continues at step 558 where the processing module commissions the incremental number of storage units, where each storage unit includes at least the unutilized storage capacity level amount of unutilized storage capacity. As such, the set of storage units and the incremental storage units have substantially the same amount of unutilized storage capacity. As a specific example, the processing module activates a dormant storage unit with sufficient unutilized storage capacity.

The method continues at step 560 where the processing module establishes an updated set of storage units that includes the set of storage units and the incremental number of storage units. As a specific example, the processing module identifies each storage unit and updates a storage set table in a sub-registry associated with the vault. The method continues at step 562 where the processing module establishes a new generation for the storage vault. As a specific example, the processing module increments a previous generation number by one and updates the sub-registry associated with the vault.

The method continues at step 564 where the processing module associates the new generation with the updated set of storage units. As a specific example, the processing module updates the sub-registry associated with the vault to map the new generation to the updated set of storage units, where slice name ranges for each slice index of the updated width are spread out evenly amongst the updated set of storage units. When storing the data to be stored, the method continues at step 566 where the processing module utilizes the new generation and the updated set of storage units. Alternatively, or in addition to, the processing module may push the updated sub-registry to entities of a dispersed storage network associated with the set of storage units.

Figure 44A:
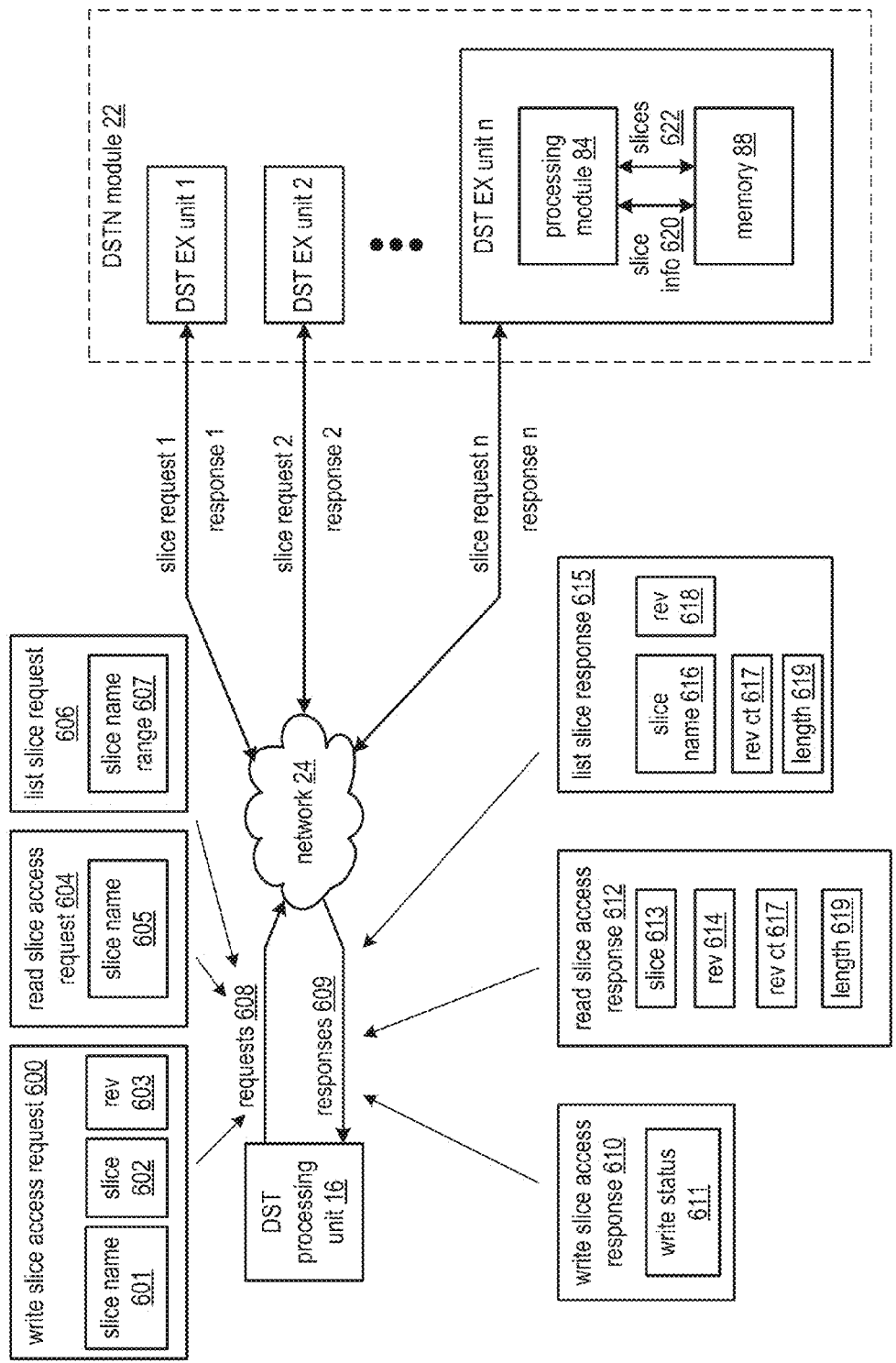
FIG. 44A is a schematic block diagram of another embodiment of a dispersed storage network (DSN) in accordance with the present invention.

FIG. 44A is a schematic block diagram of another embodiment of a dispersed storage network (DSN) that includes the distributed storage and task (DST) processing unit 16, the network 24, and the distributed storage and task network (DSTN) module 22 of FIG. 1. The DSTN module 22 includes a set of DST execution units 1-n of FIG. 1. Each DST execution unit includes the processing module 84 and the memory 88 of FIG. 3.

In an example of operation, the DST processing unit 16 issues, via the network 24, requests to the DSTN module 22, and DST execution units issue responses, via the network 24, to the DST processing unit 16. The requests include at least one of a write slice access request 600, a read slice access request 604, and a list slice request 606. Write slice access request 600 includes one or more of a slice name field 601, a slice field 602, and a revision field 603. Slice name field 601 includes a slice name entry corresponding to a slice entry of slice field 602. Revision field 603 includes a revision entry corresponding to a particular revision of the slice name for the slice entry. Read slice access request 604 includes slice name field 605. List slice request 606 includes a slice name range 607, where slice name range 607 includes a starting slice name and an ending slice name for a plurality of slices associated with slice names that fall within the slice name range.

The responses include at least one of a write slice access response 610 that corresponds to the right slice access request, a read slice access response 612 that corresponds to the read slice access request, and a list slice response 615 that corresponds to the list slice request. Write slice access response 610 includes a write status field 611 that includes one or more write status entries corresponding to a result (e.g., succeeded, failed) of processing a corresponding write slice access request. Read slice access response 612 includes one or more slice fields 613 and one or more corresponding revision fields 614. Slice field 613 includes a slice entry and revision field 614 includes a revision entry corresponding to a slice. Read slice access response 612 may further include one or more of a slice revision count 617 and a slice length indicator 619. Slice revision count 617 indicates a number of visible revisions responding to a common slice name. Slice length indicator 619 indicates a number of bytes of a corresponding slice.

List slice response 615 includes one or more of a slice name field 616 and a revision field 618. Slice name field 616 indicates a slice name of a slice storage in a DST execution unit, where the slice name falls within the slice name range of a corresponding list slice request. Revision field 618 includes a revision entry corresponding to a slice associated with the slice name. As a specific example, multiple revisions are indicated for multiple slices that correspond to a common slice name. List slice responses 615 may further include one or more of the slice revision count 617 and slice length indicator 619.

As a specific example of operation, the DST processing unit 16 issues, via the network 24, a set of write slice access requests 1-n to the set of DST execution units 1-n, where the set of write slice access request includes a set of slice names, a set of revision entries, and a set of slices corresponding to the set of slice names and set of revision entries. With the set of write slice access requests issued, the DST execution unit n receives a write slice access request n. The processing module 84 of the DST execution unit n stores the slice in the memory 88. The processing module 84 generates slice information 620 for the slice 622 and stores the slice information in the memory 88. The slice information includes one or more of storage location information of the slice, a slice name, a revision number (e.g., rev entry), a slice integrity value for the slice, and a slice length indicator for the slice. The storage location information includes one or more of a memory device identifier (ID) of a memory device utilized to store the slice, a offset location within the memory device corresponding to where the slice is stored, and any other descriptions of the storage location associated with storing of the slice to enable subsequent retrieval of the slice. The processing module 84 issues, via the network 24, a write slice access response n to the DST processing unit 16, where the write slice access response n includes a write status (e.g., storage succeeded) with regards to storage of the slice.

As another specific example of operation, the DST processing unit 16 issues, via the network 24, a set of read slice access requests 1-n to the set of DST execution units 1-n, where the set of read slice access request includes the set of slice names. With the set of read slice access requests issued, the DST execution unit n receives a read slice access request n. The processing module 84 of the DST execution unit n accesses the memory 88 to recover the slice information corresponding to the slice name. The processing module 84 interprets the slice information to identify the storage location associated with the previous storage of the slice. The processing module utilizes the interpreted slice information to retrieve the slice from the memory 88. The processing module issues, via the network 24, a read slice access response n to the DST processing unit 16, where the read slice access response n includes the slice and the revision of the slice. The operation of the DST execution unit is discussed in greater detail with reference to FIG. 44B.

Figure 44B:
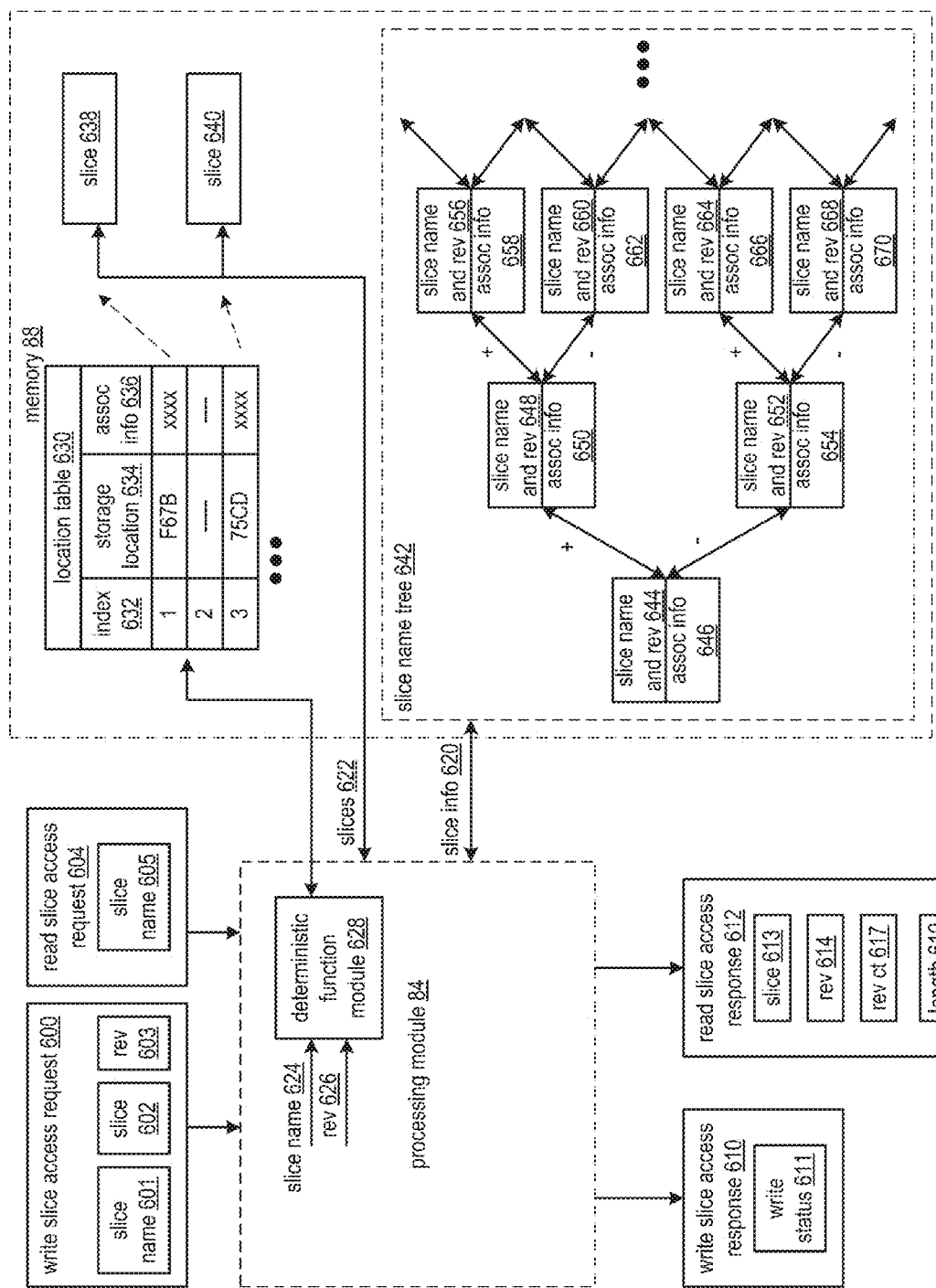
FIG. 44B is a schematic block diagram of another embodiment of a distributed storage and task (DST) execution unit in accordance with the present invention.

FIG. 44B is a schematic block diagram of another embodiment of a distributed storage and task (DST) execution unit that includes the processing module 84 and the memory 88 of FIG. 44A. The processing module 84 includes a deterministic function module 628. The memory 88 includes one or more memory devices, where data is stored as at least one of location table information 630, slices 638 and 640, and a slice name tree 642.

In an example of operation, the processing module 84 receives the write slice access request of FIG. 44A, processes the write slice access request, and issues the write slice access response of FIG. 44A. As a specific example of processing the write slice access request, deterministic function module 628 performs a corresponding deterministic function on one or more of the slice name 624 and the revision 626 of the write slice access request to produce index number 632. The corresponding deterministic function includes at least one of a hashing function, a hash-based message authentication code function, a mask generating function, and a sponge function. Having produced the index number, the processing module 84 obtains (e.g., accesses an available storage location table, initiates a query, receives a response) an available storage location 634 for storage of the slice of the write slice access request. The processing module 84 accesses the location table utilizing the index number to store the storage location. The location table includes one or more of an index field 632, storage location field 634, and an associated information field 636. Index field 632 includes an index entry corresponding to the index number (1-3 . . . ). Storage location field 634 includes a storage location entry corresponding to the storage location of the slice. Associated information field 636 includes one or more associated information entries (xxxx), where an associated information entry includes one or more of the slice name of the write slice access request, the revision number, the slice length of the revision of the slice, and an integrity value of the revision of the slice.

Having stored the storage location and/or associated information in an entry of the location table corresponding to the index number, the processing module 84 stores the slice in the memory 88 in accordance with the storage location. Having stored the slice, the processing module 84 stores slice information as a new entry in slice name tree 642. Slice name tree 642 includes a tree structure, where the tree structure includes linked pairings of slice names/revisions and the associated information of the slice name and revision. Each pairing is directly associated with at most two other pairings, where a first pairing is a next higher slice name/revision and a second pairing is a next lower slice name/revision. As a specific example, the processing module 84 identifies a location within the slice name tree for insertion of the new entry based on slice name 644 and revision of the write slice access request 646 and indicated slice names 648, 652, 656, 660, 664, 668 and respective revisions 650, 654, 658, 662, 666, and 670 of currently stored pairings within the slice name tree. With the location with the slice name tree for insertion identified, the processing module 84 generates the new entry and stores the new entry in the slice name tree, where the storing includes linking the new entry to one or more other previous entries of the slice name tree.

In another example of operation, the processing module 84 receives the read slice access request of FIG. 44A, processes the read slice access request, and issues the read slice access response of FIG. 44A. As a specific example of processing the read slice access request, the deterministic function module performs the corresponding deterministic function on one or more of the slice name and an estimated revision of the read slice access request to reproduce the index number. The processing module 84 may perform the deterministic function for a plurality of estimated revisions. Having produced the index number, the processing module 84 accesses the location table utilizing the index number to retrieve the storage location and/or associated information. The processing module utilizes the storage location to retrieve the slice from the memory 88. The processing module 84 issues the read slice access response that includes the slice.

As another specific example of processing the read slice access request, the processing module 84 accesses the slice name tree using the slice name of the read slice request to obtain the associated information. Having obtained associated information, the processing module 84 identifies one or more revisions associated with the slice of the slice name. For each revision of the one or more revisions, the deterministic function module performs the corresponding deterministic function on the slice name and the revision to reproduce the index number. Having reproduced the index number, the processing module 84 accesses the location table to retrieve the storage location. Having retrieved the storage location, the processing module 84 retrieves the slice and issues the read slice access response that includes the slice.

In another example of operation, the processing module 84 receives the list slice request of FIG. 44A, processes the list slice request, and issues the list slice response of FIG. 44A. as a specific example of processing the list slice request, the processing module 84 accesses the slice name tree utilizing the starting slice name and the ending slice name of the list slice request to retrieve slice name/revisions and associated information. The processing module 84 issues the list slice response to include the retrieved slice name/revisions and the associated information. While not shown, the list response is as previously shown in FIG. 44A, element 615.

FIG. 44C is a flowchart illustrating an example of accessing encoded data slices. The method includes step 672 where a processing module (e.g., of a distributed storage and task (DST) execution unit) receives a slice access request that includes a slice name. The method continues at step 674 where the processing module obtains one or more revision numbers for the slice access request. As a specific example, the processing module extracts a revision number from the slice access request. As another specific example, the processing module searches a slice name tree to extract the one or more revision numbers.

For each combination of revision number and the slice name, the method continues at step 676 where the processing module performs a deterministic function on the combination to produce a slice location table index value. The method continues at step 678 where the processing module accesses a slice location table utilizing the slice location table index value to obtain a slice location. The method continues at step 680 where the processing module accesses a slice utilizing the slice location. As a specific example, the processing module stores the slice at the slice location when the slice access request includes a write slice request. As another specific example, the processing module retrieves the slice from the slice location when the slice access request includes a read slice request. The method continues at step 682 where the processing module generates a slice access response based on the accessing of the slice. As a specific example, the processing module generates a write slice access response when the slice access request includes the write slice access request. As another specific example, the processing module generates a read slice access response when the slice access request includes the read slice access request. The method continues at step 684 where the processing module sends the slice access response to a requesting entity.

FIG. 44D is a flowchart illustrating an example of listing encoded data slices. The method includes step 686 where a processing module (e.g., of a distributed storage and task (DST) execution unit) receives a list slice request that includes a slice name range. The method continues at step 688 where the processing module accesses a slice name tree using the slice name range to obtain associated information for one or more slices of the slice name range. As a specific example, the processing module traverses the slice name tree to find each revision of each slice name within the slice name range and, for each revision, the processing module extracts associated information from the slice name tree.

The method continues at step 690 where the processing module generates a list slice responses to include the associated information. As a specific example, the processing module generates the list slice responses to include, for each slice name, a revision number for each revision, a slice length for each revision, and a slice integrity value for each revision. The method continues at step 692 where the processing module sends the list slice response to a requesting entity.

Figure 45A:
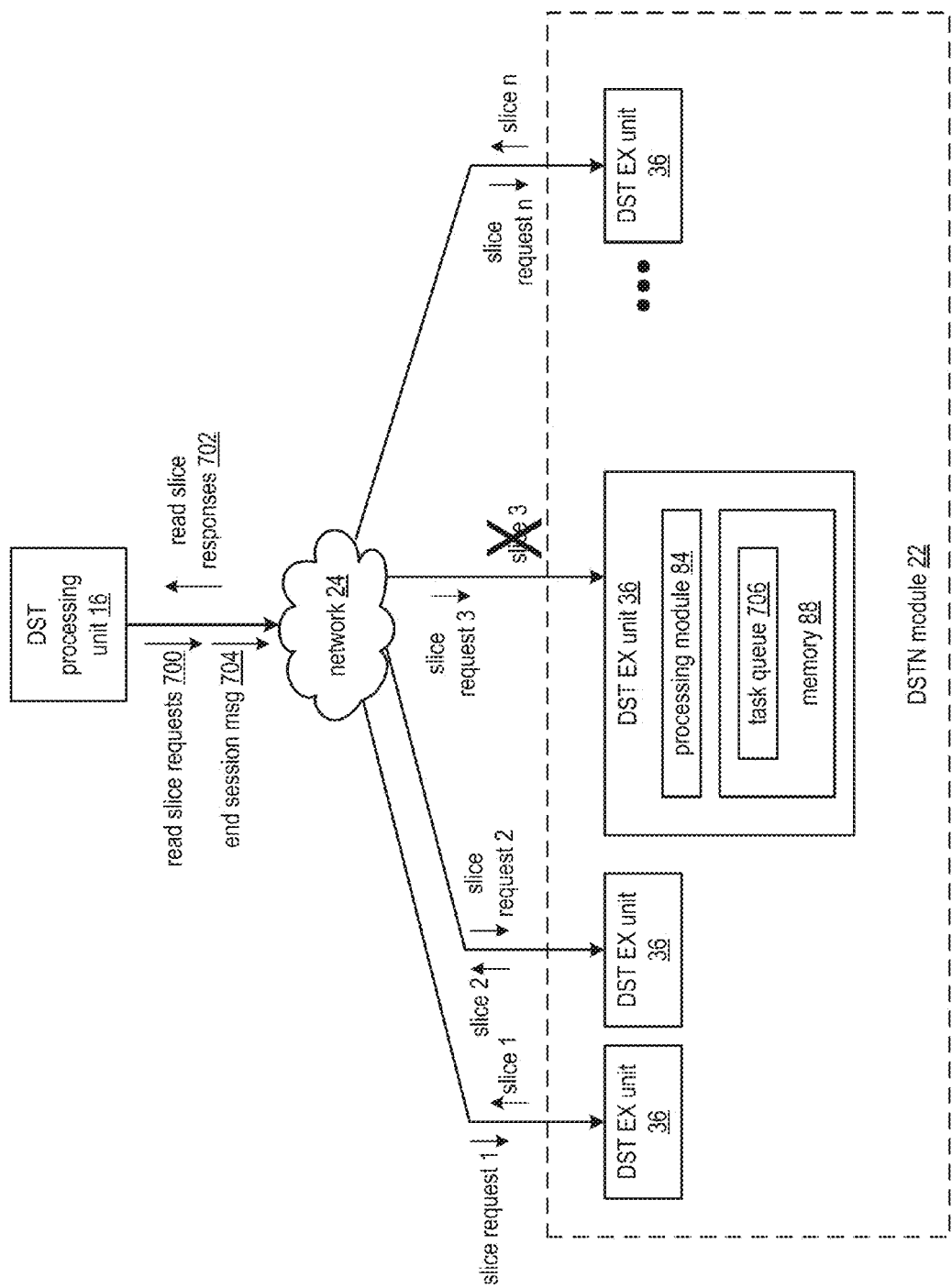
FIG. 45A is a schematic block diagram of another embodiment of a dispersed storage network (DSN) in accordance with the present invention.

FIG. 45A is a schematic block diagram of another embodiment of a dispersed storage network (DSN) that includes the distributed storage and task (DST) processing unit 16, the network 24, and the distributed storage and task network (DSTN) module 22 of FIG. 1. The DSTN module 22 includes a set of DST execution units 1-n of FIG. 1. Each DST execution unit includes the processing module 84 and the memory 88 of FIG. 3.

In an example of operation, the DST processing unit 16 issues a set of read slice requests 700 to the set of DST execution units 36. A DST execution unit 36 receives a corresponding read slice request and identifies a session associated with the read slice request. As a specific example, the processing module 84 of the DST execution unit 36 interprets a transaction number of the read slice request to identify the session. As another specific example, the processing module 84 initiates a query and receives a response that includes a session identifier including the identity of the session. As yet another example, the processing module 84 receives the session identifier from at least one other DST execution unit 36.

Having identified the session, the processing module 84 determines one or more tasks associated with the read slice request. As a specific example, the processing module performs a lookup for tasks associated with requests. Having determined the one or more tasks, the processing module 84 queues the one or more tasks by storing the one or more tasks in a task queue 706 of the memory 88. While the one or more tasks are queued, the processing module 84 determines whether the session is still active. As a specific example, the processing module 84 indicates that the session has ended when receiving an end session message 704 indicating that the session has ended. As another specific example, the processing module indicates that the session has ended when a timeframe has expired since receiving the read slice requests. As yet another example, the processing module 84 indicates that the session has ended when detecting disconnection, via the network 24, with the DST processing unit 16. As another specific example, the processing module indicates that the session has ended when receiving a resource indicator indicating that resources are not available to complete the task. As another specific example, the processing module indicates that the session has ended when receiving an indication that a security threat is available. As another specific example, the processing module indicates that the session has ended when receiving an indication that an aggregated partial result threshold has been met (high confidence that enough partial results have been collected (aggregated) to conclude a successful retrieval. As another specific example, the processing module indicates that the session has ended when initiating a query to make the determination. As another specific example, the processing module indicates that the session has ended when performing a look-up which indicates a session termination. As another specific example, the processing module indicates that the session has ended when de-prioritizing another task associated with the resources.

When the processing module 84 detects that the session is not active, the processing module 84 cancels the one or more tasks associated with the session prior to execution. As a specific example, the processing module 84 removes the one or more tasks from the task queue. Alternatively, the processing module 84 retrieves the one or more tasks from the task queue and facilitates execution of the one or more tasks when resources become available. As a specific example, the processing module 84 retrieves a slice from the memory 88 and issues, via the network 24, a read slice response 702 to the DST processing unit 16, where the read slice response includes the slice.

Figure 45B:
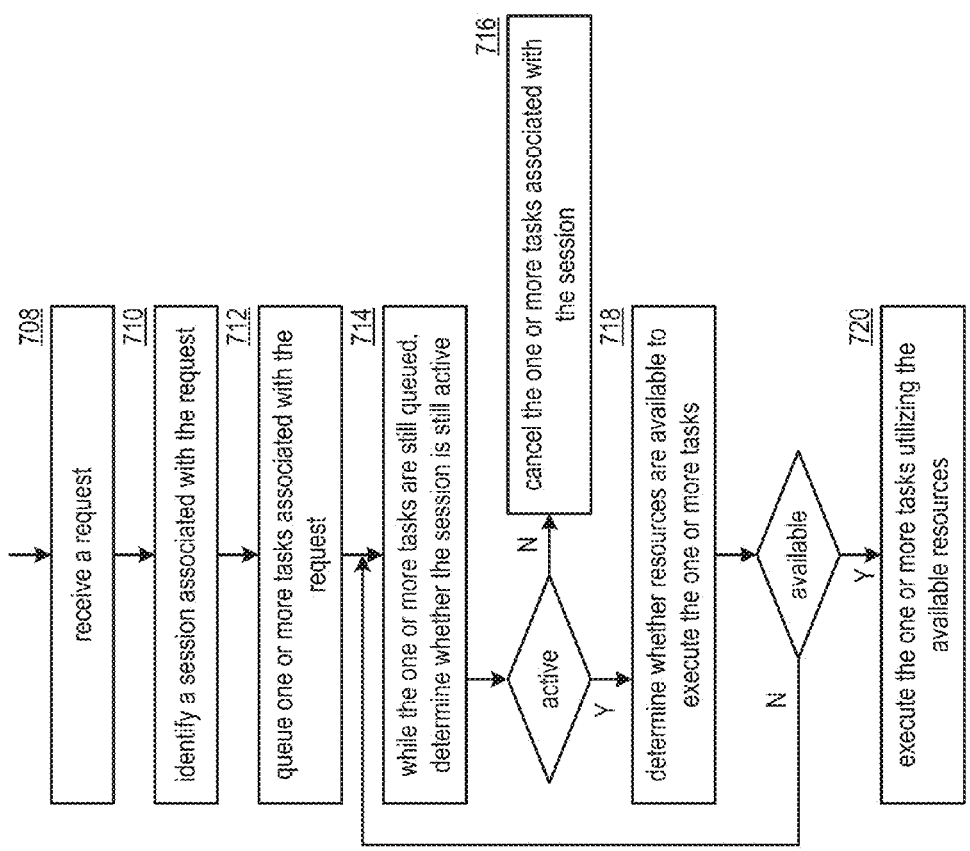
FIG. 45B is a flowchart illustrating an example of canceling a request in accordance with the present invention.

FIG. 45B is a flowchart illustrating an example of canceling a request. The method includes step 708 where a processing module (e.g., of a distributed storage and task (DST) execution unit) receives a request where the request requires resources (e.g., processing resources, storage resources, communication resources) of the DST execution unit. The method continues at step 710 where the processing module identifies a session associated with the request. As a specific example, the processing module assigns a new session number. The method continues at step 712 where the processing module queues one or more tasks associated with the request. As a specific example, the processing module identifies the one or more tasks based on the request and stores the one or more tasks in a task queue of a memory of the DST execution unit.

While the one or more tasks are still queued, the method continues at step 714 where the processing module determines whether the session is still active. As a specific example, the processing module determines that the session is still active when not detecting that the session is inactive. As a specific example of detecting that the session is an active session, the processing module receives an end of session message. The method branches to step 718 where the processing module determines whether resources are available when the session is still active. The method continues to next step 716 when the session is not active. The method continues at step 716 where the processing module cancels the one or more tasks associated with the session when the session is not still active. As a specific example, the processing module removes the one or more tasks from the task queue.

When the session is still active, the method continues at step 718 where the processing module determines whether resources are available to execute the one or more tasks. As a specific example, the processing module receives a resource indicator indicating that resources are available. As another specific example, the processing module initiates a resource query and receives a resource response. As yet another specific example, the processing module de-prioritizes another task associated with the resources. The method branches to step 720 where the processing module executes the one or more tasks when the resources are available. The method loops back to the step where the processing module determines whether the session is still active when the processing module determines that the resources are not available. When the resources are available, the method continues at the step where the processing module executes the one or more tasks utilizing the available resources.

Figure 45C:
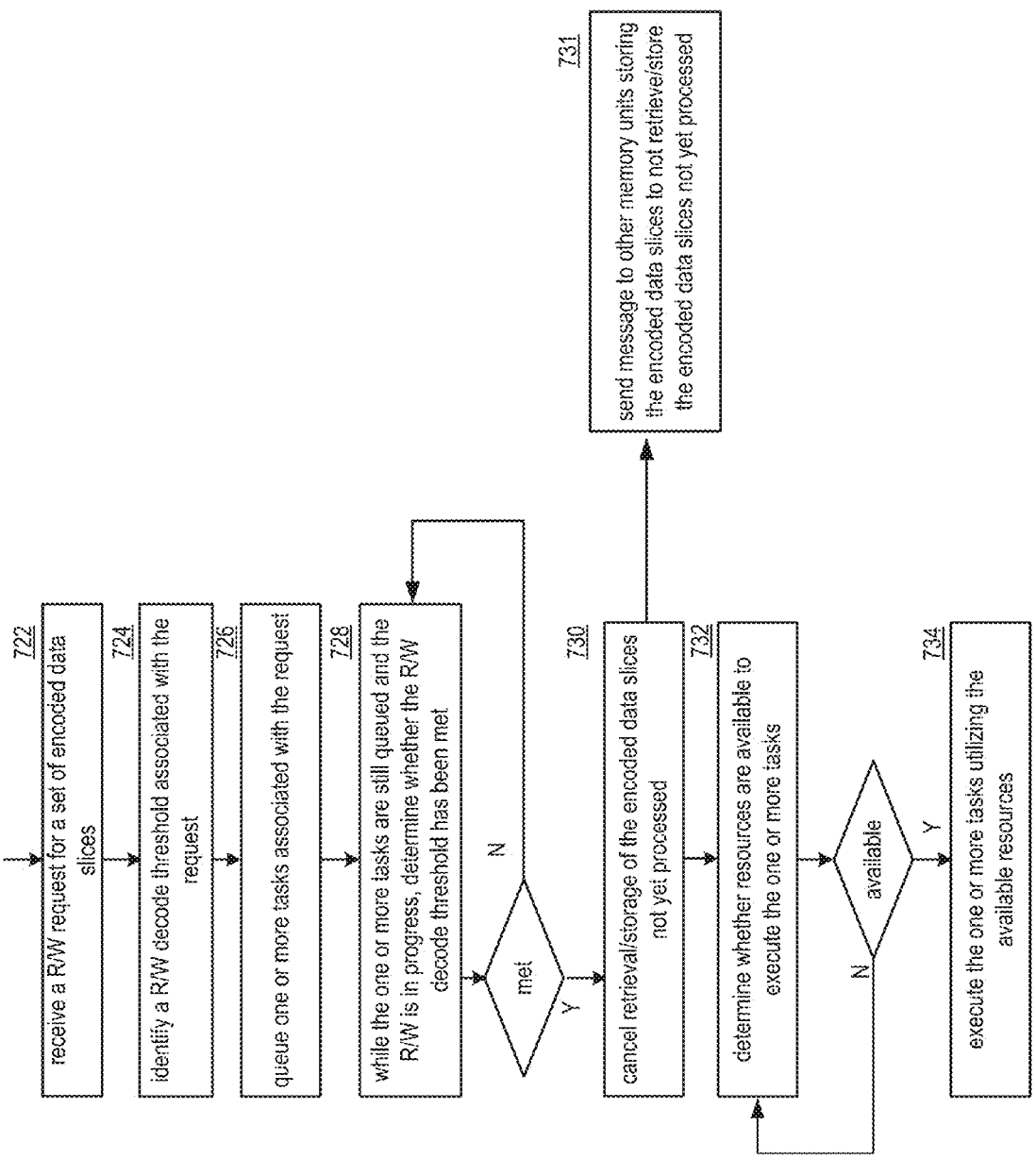
FIG. 45C is another flowchart illustrating an example of canceling a request in accordance with the present invention.

FIG. 45C is a flowchart illustrating an example of canceling a request. The method includes step 722 where a processing module (e.g., of a distributed storage and task (DST) execution unit) receives a read/write (R/W) request (sets of encoded data slices) where the R/W request requires resources (e.g., processing resources, storage resources, communication resources) of the DST execution unit. The method continues at step 724 where the processing module identifies a decode threshold associated with the R/W request. As a specific example, the pillar width is 5 and the decode threshold is 3. The method continues at step 726 where the processing module queues one or more tasks associated with the request. As a specific example, the processing module identifies the one or more tasks based on the request and stores the one or more tasks in task queue 706 of a memory of the DST execution unit.

While the one or more tasks are still queued and the R/W is in progress (encoded data slices being retrieved/written to memory within the DSN), the method continues at step 728 where the processing module determines whether the decode threshold is met. As a specific example, the processing module determines that the 3 pillars have successfully retrieved/stored the encoded data slices of the R/W request. Once the decode threshold is met, the method continues at step 730 where the processing module cancels retrieval/storage of additional encoded data slices and at step 731 sends a message to units which have yet to complete the R/W request to cancel the request. This cancellation message may reduce network congestion and wasted retrieval/storage cycles.

When a successful decode threshold has been met, the method continues at step 732 where the processing module determines whether resources are available to execute the one or more tasks. As a specific example, the processing module receives a resource indicator indicating that resources are available. As another specific example, the processing module initiates a resource query and receives a resource response. As yet another specific example, the processing module de-prioritizes another task associated with the resources. When the resources are not available, the method loops back to the step where the processing module determines whether the resources are available. When the resources are available, the method continues at the step 734 where the processing module executes the one or more tasks utilizing the available resources.

FIGS. 46A-D is a schematic block diagram of another embodiment of a dispersed storage network (DSN) that includes the distribute storage and task (DST) processing unit 16 of FIG. 1, the network 24 of FIG. 1, and the distributed storage and task network (DSTN) module 22 of FIG. 1. The DSTN module 22 includes a set of DST execution (EX) units 1-5. Alternatively, the set of DST execution units may include any number of DST execution units. Hereafter, the DST processing unit 16 may be interchangeably referred to as a computing device. Hereafter, a DST execution unit may be interchangeably referred to as an execution unit and the set of DST execution units may be interchangeably referred to as a set of storage units. Each DST execution unit may be implemented utilizing the DST execution unit 36 of FIG. 1.

The DSN functions to adjust tasks 740 executed by the set of DST execution units. The tasks 740 includes data access tasks and distributed computing tasks. In an example of operation, the DST processing unit 16 receives tasks 740, generates a plurality of task requests, and sends, via the network 24, corresponding sets of sub-task requests to the set of execution units, where a task request includes a set of sub-task requests. Hereafter, the plurality of task requests may be referred to interchangeably as partial tasks 742. For example, the DST processing unit 16 generates the partial tasks 742 to include partial tasks 1-5, where each set of sub-task requests includes a partial task 1, a partial task 2, a partial task 3, a partial task 4, and a partial task 5. For instance, the DST processing unit 16 generates a second set of sub-task requests to include a request 2_1, a request 2_2, a request 2_3, a request 2_4, and a request 2_5; a third set of sub-task requests to include a request 3_1, a request 3_2, a request 3_3, a request 3_4, and a request 3_5; and a fourth set of sub-task requests to include a request 4_1, a request 4_2, a request 4_3, a request 4_4, and a request 4_5.

FIG. 46A illustrates further steps of the example of operation of the adjusting of the tasks where the set of DST execution units receives, over time, a plurality of sets of sub-task requests from the DST processing unit 16. Having received the plurality of sets of sub-task request, the set of DST execution units stores the corresponding sets of sub-task requests, where, in an example, each of a first, a second, and a third execution unit of the set of execution unit stores, respectively, a first, a second, and a third sub-task request of each of the corresponding sets of sub-task requests to produce, respectively, a first, a second, and a third plurality of sub-task requests. As a specific example, the first, the second, and the third execution units respectively stores the first, the second, and the third plurality of sub-task requests in first, second, and third holding queues. For instance, DST execution unit 1 stores the first plurality of sub-task requests to include storing request 2_1, request 3_1, and request 4_1 in a holding queue 1 of the DST execution unit 1.

FIG. 46B illustrates further steps of the example of operation of the adjusting of the tasks where the set of DST execution units generates task status information 744 for the pluralities of sub-task requests and share, via the network 24, the generated task status information 744. Hereafter, the task status information 744 may be interchangeably referred to as sub-task estimation data. The task status information 744 includes one or more of an execution ready status, an execution not ready status, a level of execution readiness, required resources for sub-task execution, available resources for sub-task execution, a processing capability level, storage capability level estimated timeframe for the initiation of sub-task execution, estimated duration for sub-task execution, and sub-task sequencing information.

As a specific example, the first, the second, and the third execution units respectively generating first, second, and third sub-task estimation data for the first, the second, and the third plurality of sub-task requests. For instance, the first execution unit determines an execution ready status for a first selected sub-task request (e.g., request 2_1) of the first plurality of sub-task requests when the first execution unit has resources available to process the first selected sub-task request, or the first execution unit determines an execution not ready status for the first selected sub-task request of the first plurality of sub-task requests when the first execution unit does not have the resources available to process the first selected sub-task request. As another instance, the second execution unit determines an execution ready status for a second selected sub-task request (e.g., request 2_2) of the second plurality of sub-task requests when the second execution unit has resources available to process the second selected sub-task request or the second execution unit determines an execution not ready status for the second selected sub-task requests of the second plurality of sub-task requests when the second execution unit does not have the resources available to process the second selected sub-task request.

As yet another instance, the third execution unit determines an execution ready status for a third selected sub-task request (e.g., request 2_3) of the third plurality of sub-task requests when the third execution unit has resources available to process the third selected sub-task request for the third execution unit determines an execution not ready status for the third selected sub-task requests of the third plurality of sub-task requests when the third execution unit does not have the resources available to process the third selected sub-task request. As a still further instance, a fourth execution unit determines an execution not ready status for a fourth selected sub-task request (e.g., request 2_4) and an execution ready status for another fourth selected sub-task request (e.g., request 3_4) of another set of sub-task requests.

FIG. 46C illustrates further steps of the example of operation of the adjusting of the tasks where the set of DST execution units adjusts timing, sequencing, or processing of the plurality of sub-task requests based on the task status information 744 to produce a pluralities of partial results, where due to one or more difference factors from a list of difference factors, the execution units process the pluralities of sub-task requests at difference paces. The list of difference factors includes differences in amounts of data to be processed per sub-task request, processing capabilities, memory storage capabilities, and networking capabilities.

As a specific example, the first, the second, and the third execution units respectively adjust the timing, the sequencing, or the processing of the first, the second, and the third plurality of sub-task requests based on the first, the second, and the third sub-task estimation data to produce a first, a second, and a third plurality of partial results. For instance, the DST execution unit 4 interprets the task status information from DST execution units 1-3 to determine that each of the DST execution units 1-3 is ready to execute corresponding sub-tasks of the second set of sub-tasks. Having determined that the DST execution units 1-3 are ready to execute the corresponding sub-tasks of the second set of sub-tasks, the DST execution unit 4 selects request 2_4 and adjusts sequencing of the fourth plurality of sub-task requests to provide available resources for execution of request 2_4.

FIG. 46D illustrates further steps of the example of operation of the adjusting of the tasks where the set of DST execution units, having adjusted the plurality of sub-task requests, transfers selected sub-task requests from the holding queues to execution queues prior to executing the selected sub-task requests. As a specific example, the first, the second, the third, and the fourth DST execution unit respectively transfer first, second, and third selected sub-task requests of the first, the second, the third, and the fourth plurality of sub-task requests from the first, the second, the third holding, and the fourth queues to first, second, third, and fourth execution queues prior to respectively executing the first, the second, the third, and the fourth selected sub-task requests.

Having transferred the selected sub-task requests, the execution units execute the transferred and selected sub-task requests to produce the first, the second, the third, and the fourth plurality of partial results. For instance, the DST execution unit 4 executes the request 2_4 to retrieve an encoded data slice and generate a partial result 2_4 that includes the retrieved encoded data slice. As another instance, the DST execution unit 4 executes the request 2_4 to perform a distributed computing function to generate the partial result 2_4.

Having produced the pluralities of partial results, the execution units send the pluralities of partial results to the DST processing unit 16. As a specific example, DST execution units 1- 4 send, via the network 24, partial results 2_1, 2_2, 2_3, and 2_4 to the DST processing unit 16. The DST processing unit 16 receives the pluralities of partial results and compiles the pluralities of partial results to produce a plurality of results 746. As a specific example, the DST processing unit 16 receives the partial results partial results 2_1, 2_2, 2_3, and 2_4 and compiles the partial results partial results 2_1, 2_2, 2_3, and 2_4 to produce the result 746.

Alternatively, when a quorum of the first, the second, and the third execution units exists, where a quorum is reached when two of the first, the second, and the third selected sub-task requests have the execution ready status, the quorum of execution units executes two of the first, the second, or the third selected sub-task requests to produce two of a first, a second, and a third partial results of the first, the second, and the third plurality of partial results. For instance, DST execution units 1-4 forms the quorum when the requests 2_1 through 2_4 are ready for execution and executes the requests 2_1 through 2_4 to produce the partial results 2_1 through 2_4.

Alternatively, or in addition to, for the first, the second, or the third execution unit not in the quorum of execution units, the execution unit not in the quorum deletes the respective first, the second, and the third selected sub-task requests when the two of the first, the second, and the third partial results have been produced and the remaining one of the first, the second, and the third selected sub-task requests has the execution not ready status. For instance, DST execution unit 5 deletes request 2_5 when the quorum including DST execution units 1-4 executes the requests 2_1 through 2_4 to produce the partial results 2_1 through 2_4.

FIG. 46E is a flowchart illustrating an example of adjusting execution of tasks. In particular, a method is presented for use in conjunction with one or more functions and features described in conjunction with FIGS. 1-39, 46 A-D, and also FIG. 46E. The method continues at step 750 where a processing module of a computing device of a dispersed storage network (DSN) issues a plurality of sets of sub-task requests to a set of execution units of the DSN. For example, the computing device generates a plurality of task requests, where a task request of the plurality of task requests includes a set of sub-task requests and where the computing device sends corresponding sets of sub-task requests to the set of execution units when task requests of the plurality of task requests are generated.

The method continues at step 752 where, the set of execution units, over time, receive the plurality of sets of sub-task requests. The method continues at step 754 where the set of execution unit stores the corresponding sets of sub-task requests. Each of a first, a second, and a third execution unit of the set of execution unit stores, respectively, a first, a second, and a third sub-task request of each of the corresponding sets of sub-task requests to produce, respectively, a first, a second, and a third plurality of sub-task requests. For example, the first, the second, and the third execution units respectively stores the first, the second, and the third plurality of sub-task requests in first, second, and third holding queues.

The method continues at step 756 where each execution unit generates sub-task estimation data for a plurality of sub-task requests. For example, the first, the second, and the third execution units respectively generate first, second, and third sub-task estimation data for the first, the second, and the third plurality of sub-task requests. As a specific example of the generating of the sub-task estimation data, the first execution unit determines an execution ready status for a first selected sub-task request of the first plurality of sub-task requests when the first execution unit has resources available to process the first selected sub-task request or the first execution unit determines an execution not ready status for the first selected sub-task request of the first plurality of sub-task requests when the first execution unit does not have the resources available to process the first selected sub-task request. Similarly, each of the second execution unit and the third execution unit determines an execution ready status or an execution not ready status for a respective second and third selected sub-task request based on respective resource availability.

The method continues at step 758 where each execution unit adjusts the plurality of sub-task requests based on sub-task estimation data of the set of execution units. For example, the first, the second, and the third execution units respectively adjust timing, sequencing, or processing of the first, the second, and the third plurality of sub-task requests based on the first, the second, and the third sub-task estimation data to produce a first, a second, and a third plurality of partial results, where, due to one or more difference factors from a list of difference factors, the first, the second, and the third execution units process the first, the second, and the third plurality of sub-task requests at difference paces. The list of difference factors includes differences in amounts of data to be processed per sub-task request, processing capabilities, memory storage capabilities, and networking capabilities. The first, the second, and the third execution units respectively transfer first, second, and third selected sub-task requests of the first, the second, and the third plurality of sub-task requests from the first, the second, and the third holding queues to first, second, and third execution queues prior to respectively executing the first, the second, and the third selected sub-task requests.

The method continues at step 760 where a quorum of execution units executes selected sub-task requests to produce partial results. For example, when a quorum of the first, the second, and the third execution units exists, where a quorum is reached when two of the first, the second, and the third selected sub-task requests have the execution ready status, the quorum of execution units executes two of the first, the second, or the third selected sub-task requests to produce two of a first, a second, and a third partial results of the first, the second, and the third plurality of partial results. Alternatively, or in addition to, for the first, the second, or the third execution unit not in the quorum of execution units, the execution unit not in the quorum deletes the respective first, the second, and the third selected sub-task requests when the two of the first, the second, and the third partial results have been produced and the remaining one of the first, the second, and the third selected sub-task requests has the execution not ready status.

The method continues at step 762 where the quorum of execution units sends the partial results to the computing device for compiling to produce a plurality results. For example, the first, the second, and the third execution unit send the first, the second, and the third plurality of partial results to the computing device, where the computing device compiles the first, the second, and the third plurality of partial results to produce a plurality of results.

The method described above in conjunction with the computing device and the set of execution units can alternatively be performed by other modules of the dispersed storage network or by other devices. In addition, at least one memory section that stores operational instructions can, when executed by one or more processing modules of one or more computing devices of the dispersed storage network (DSN), cause the one or more computing devices to perform any or all of the method steps described above.

FIG. 47A is a schematic block diagram of another embodiment of a dispersed storage network (DSN) that includes a scheduling unit 768, and the distributed storage and task (DST) processing unit 16, the network 24, and the distributed storage and task network (DSTN) module 22 of FIG. 1. The DSTN module 22 includes a set of DST execution units 1-n of FIG. 1.

In an example of operation, the DST processing unit 16 issues a set of requests 770 (e.g., for a write sequence, for a read sequence) to the DSTN module 22. A DST execution unit 36 receives a request of the set of requests 770. Having received the request, the DST execution unit 36 issues status information 772 to the scheduling unit 768. The status information 772 includes one or more of the request, a common session identifier (ID), a timestamp of receipt of the request, a queuing status indicator (e.g., estimated time of de-queuing, queue depth, queue priority), and an estimated time of execution of the request.

The scheduling unit 768 receives the status information 772 from the DST execution unit and from one or more of the other DST execution units 36 in response to requests received by the other DST execution units 36. Having received the status information 772, the scheduling unit 768 aggregates the status information 772 for one or more requests associated with the common session of a plurality of simultaneously active sessions. Having aggregated the status information 772, the scheduling unit 768 generates scheduling information 774, where the scheduling information 774 includes one or more of the task queuing and execution status for the common session, a recommended timeframe for execution of one or more tasks associated with the common session, and task queuing and execution status for other sessions. As a specific example, the scheduling unit 768 generates the scheduling information 774 such that associated requests (e.g., similar requests) of the common session are executed at substantially the same time by the set of DST execution units. Having generated the scheduling information 774, the scheduling unit 768 sends the scheduling information 774 to the set of DST execution units 36. Each DST execution unit 36 utilizes the scheduling information 774 when prioritizing one or more tasks for execution, where the one or more tasks are associated with the common session.

FIG. 47B is a flowchart illustrating an example of processing a request. The method continues at step 776 where an entity of a dispersed storage network (DSN) receives a request associated with a session. As a specific example, the entity of the DSN obtains a session identifier of the session based on the request. The method continues at step 778 where the entity of the DSN issues status information for the request to a scheduling unit. As a specific example, the entity of the DSN generates the status information to include a request identifier, a common session identifier, a timestamp of receipt of the request, a queuing status indicator, an estimated time of execution, a required resource indicator, and a required resource availability level indicator.

The method continues at step 780 where the scheduling unit interprets the status information and other status information from one or more other entities of the DSN to produce summarized status information. As a specific example, the scheduling unit filters the status information to identify a common session, identifies critical resources required for the common session, identifies timing of critical resource availability, and generates a suggested task execution schedule for the entities of the DSN associated with the common session. The method continues at step 782 where the scheduling unit sends the summarized status information to a plurality of entities of the DSN associated with a common session. The method continues at step 784 where the entity of the DSN executes the request associated with the common session in accordance with the summarized status information. As a specific example, the entity of the DSN queues the request in a prioritized order in accordance with the summary status information to align execution of tasks of the request with availability resources and with parallel execution of similar tasks by other entities of the DSN.

FIGS. 48A-B is a schematic block diagram of another embodiment of a dispersed storage network (DSN) that includes the distributed storage and task (DST) processing unit 16 of FIG. 1, the network 24 of FIG. 1, and the distributed storage and task network (DSTN) module 22 of FIG. 1. The DSTN module 22 includes a plurality of DST execution units. In particular, the DSTN module 22 includes at least one set of DST execution units 1-n. Each DST execution unit may be implemented utilizing the DST execution unit 36 of FIG. 1. Hereafter, a DST execution unit may be interchangeably referred to as a storage unit and the set of DST execution units may be interchangeably referred to as a set of storage units.

Each DST execution unit includes the processing module 84 of FIG. 3, a pending request memory 790, and a plurality of memories 1, 2, 3, etc. Each memory of the plurality of memories may be implemented utilizing at least one of a disk drive memory, a solid state memory, and a tape drive memory. The pending request memory 790 may be implemented utilizing at least one of the disk drive memory, the solid state memory, and the tape drive memory. For example, each DST execution unit includes disk drive memories 1, 2, 3, etc. and a fast access solid state memory to implement the pending request memory 790.

The DSN functions to access a plurality of sets of encoded data slices in the set of DST execution units and to migrate stored encoded data slices from one memory to another memory. In an example of operation of accessing the plurality of sets of encoded data slices, the DST processing unit 16 receives a data access request 792. The data access request 792 includes at least one of a store data request and a retrieve data request. Having received the data access request 792, the DST processing unit 16 issues, via the network 24, a slice access requests 1-n to the set of DST execution units 1-n. Issuing the slice access requests 1-n includes sending, via the network 24, slice access requests 1 to the DST execution unit 1, slice access requests 2 to the DST execution unit 2, etc. Each slice access request includes at least one of a write slice request, a read slice request, a list slice request, and a delete slice request. For example, the slice access request includes the write slice request when the data access request 792 includes the store data request and the slice access request includes the read slice request when the data access request 792 includes the retrieve data request.

Each DST execution unit receives a corresponding slice access request and a processing module 84 of each DST execution unit stores the received slice access request in the pending request memory 790. The processing module 84 retrieves the slice access request from the pending request memory 790 in accordance with a performance approach. The performance approach may be based on one or more of an input/output (IO) rate of a memory that corresponds to a slice name of the slice access request, a desired maximum IO rate, a timestamp associated with the slice access request, and a priority level associated with the slice access request. For example, the processing module 84 retrieves a slice access request from the pending request memory 790 that is an oldest request of requests associated with the memory 1, when the IO rate of the memory 1 is less than the desired maximum IO rate where the processing module 84 waits before retrieving the slice access request when the IO of the memory 1 is greater than the desired maximum IO rate.

When retrieving the slice access request from the pending request memory 790, the processing module 84 processes the slice access request to produce a slice access response. Each slice access response includes at least one of a write slice response, a read slice response, a list slice response, and a delete slice response. For example, DST execution unit 3 receives a slice access request 3 that includes a read slice request for encoded data slices A2_1 through A2_M. The processing module 84 of the DST execution unit 3 processes the slice access request 3 by determining which memory (e.g., memory 1) of the memories is associated with storage of the encoded data slices A2_1 through A2_M, retrieving the encoded data slices A2_1 through A2_M from the determined memory, and issuing, via the network 24, a slice access response 3 to the DST processing unit 16, where the slice access response 3 includes a read slice response that includes the encoded data slices A2_1 through A2_M.

FIG. 48A illustrates initial steps of an example of operation of the migration of the stored encoded data slices from the one memory to the other memory where the processing module 84 monitors input/output (IO) rates of the plurality of disk drives (e.g., memories 1, 2, 3 etc.), where the storage unit stores a plurality of encoded data slices from the plurality of sets of encoded data slices in at least some of the plurality of disk drives, and where access requests for encoded data slices of the plurality of encoded data slices occur at varying rates.

Having monitored the IO rates of the plurality of disk drives, the processing module 84 determine that the IO rate of a disk drive of the plurality of disk drives is exceeding the desired maximum IO rate. For example, the processing module 84 of the DST execution unit 3 determines that the IO rate of memory 1 is exceeding the desired maximum IO rate.

Having determined that the IO rate of the disk drive is exceeding the desired maximum IO rate, the processing module 84 identifies a pending access request (e.g., stored in the pending request memory 790) for an encoded data slice stored in the disk drive, where the encoded data slice is of a set of encoded data slices of the plurality of sets of encoded data slices and where a decode threshold number of encoded data slices of the set of encoded data slices is needed to reconstruct a data segment. As a specific example, the processing module 84 identifies the pending access request by one or more of analyzing historical access request information regarding similar access requests to the pending access request and determining a likelihood of future similar access requests to the pending access request. As another specific example, the processing module 84 identifies the pending access request by determining that multiple similar access requests to the pending access request are pending in an access request queue of the pending request memory 790. For instance, the processing module 84 identifies multiple similar access requests for the encoded data slices A2_1 through A2_M.

FIG. 48B illustrates further steps of the example of operation of the migration of the stored encoded data slices from the one memory to the other memory where the processing module 84 evaluates disk drive processing rates of other storage units that are storing other encoded data slices of the set of encoded data slices to determine whether the encoded data slice is needed to satisfy the pending access request. As a specific example, the processing module 84 evaluates the disk drive processing rates of the other storage units by receiving, via the network 24 from each of the other storage units, processing information that includes disk drive processing rates for each of a plurality of other disk drives. For instance, the processing module 84 sends, via the network 24, requests for the disk drive processing rates to the other storage units, where one of the requests includes identity of encoded data slice or identity of one of the other encoded data slices. The processing module 84 receives processing information 1 from DST execution unit 1, processing information 2 from DST execution unit 2, etc.

Having received the disk drive processing rates, the processing module 84 identifies, for each of the other storage units, the disk drive processing rate of another disk drive of the plurality of other disk drives storing one of the other encoded data slices. For example, the processing module 84 identifies the disk drive processing rate for the memory 1 from each of the other DST execution units when each of the memory 1 associated with storage of the other encoded data slices. Having identified the disk drives processing rate of the other disk drive, the processing module 84 determines whether the decode threshold number of the disk drive processing rate of the other disk drives have an IO rate below the desired maximum IO rate. For example, the processing module 84 determines whether ten other DST execution units have the IO rate below the desired maximum IO rate for the memory 1 of each of the ten other DST execution units when the decode threshold number is ten.

When less than the decode threshold number of the disk drive processing rate of the other disk drives have an IO rate below the desired maximum IO rate, the processing module 84 indicates that the encoded data slice is needed. When the decode threshold number of the disk drive processing rate of the other disk drives have an IO rate below the desired maximum IO rate, the processing module 84 indicates that the encoded data slice is not needed.

When the encoded data slice is needed, the processing module 84 migrates the encoded data slice to another disk drive of the plurality of disk drives. For example, the processing module 84 migrates the encoded data slices A2_1 through A2_M from memory 1 to memory 2. The migrating may further include analyzing the IO rate of the memory 2 to determine whether the memory 2 has available IO capacity. Having migrated the encoded data slices A2_1 through A2_M from memory 1 to memory 2, the processing module 84 deletes the encoded data slices A2_1 through A2_M from memory 1 and associates the encoded data slices A2_1 through A2_M with memory 2 (e.g., updates a slice location table).

When the encoded data slice is not needed, the processing module 84 deletes, from the pending request memory 790, the pending access request for the encoded data slice. For example, the processing module 84 deletes pending access requests for the encoded data slices A2_1 through A2_M.

FIG. 48C is a flowchart illustrating an example of migrating encoded data slices. In particular, a method is presented for use in conjunction with one or more functions and features described in conjunction with FIGS. 1-39, 48 A-B, and also FIG. 48C. The method continues at step 800 where a processing module of a storage unit of a dispersed storage network (DSN) monitors input/output (IO) rates of a plurality of disk drives, where the storage unit stores a plurality of encoded data slices from a plurality of sets of encoded data slices in at least some of the plurality of disk drives, and where access requests for encoded data slices of the plurality of encoded data slices occur at varying rates.

The method continues at step 802 where the processing module determines that the IO rate of a disk drive of the plurality of disk drives is exceeding a desired maximum IO rate. The method continues at step 804 where the processing module identifies a pending access request for an encoded data slice stored in the disk drive, where the encoded data slice is of a set of encoded data slices of the plurality of sets of encoded data slices and wherein a decode threshold number of encoded data slices of the set of encoded data slices is needed to reconstruct a data segment. The identifying the pending access request includes one or more of analyzing historical access request information regarding similar access requests to the pending access request and determining a likelihood of future similar access requests to the pending access request. The identifying the pending access request may further include determining that multiple similar access requests to the pending access request are pending in an access request queue.

The method continues at step 806 where the processing module evaluates disk drive processing rates of other storage units that are storing other encoded data slices of the set of encoded data slices to determine whether the encoded data slice is needed to satisfy the pending access request. As a specific example, the processing module sends requests for the disk drive processing rates to the other storage units, where one of the requests includes identity of the encoded data slice or identity of one of the other encoded data slices. The processing module receives, from each of the other storage units, disk drive processing rates for each of a plurality of other disk drives, and identifies, for each of the other storage units, the disk drive processing rate of another disk drive of the plurality of other disk drives storing one of the other encoded data slices. Having identified the disk drive processing rate of the other disk drive, the processing module determines whether the decode threshold number of the disk drive processing rate of the other disk drives have an IO rate below the desired maximum IO rate.

When less than the decode threshold number of the disk drive processing rate of the other disk drives have an IO rate below the desired maximum IO rate, the processing module indicates that the encoded data slice is needed. When the decode threshold number of the disk drive processing rate of the other disk drives have an IO rate below the desired maximum IO rate, the processing module indicates that the encoded data slice is not needed. When the encoded data slice is not needed, the method branches to step 810. When encoded data slice is needed, the method continues to step 808. When the encoded data slice is needed, the method continues at step 808 where the processing module migrates the encoded data slice to another disk drive of the plurality of disk drives. When the encoded data slice is not needed, the method continues at step 810 where the processing module deletes the pending access request for the encoded data slice.

The method described above in conjunction with a processing module can alternatively be performed by other modules of a dispersed storage network or by other devices. In addition, at least one memory section that stores operational instructions can, when executed by one or more processing modules of one or more computing devices of a dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   receiving, over time and by a set of execution units of the DSN, a plurality of sets of sub-task requests from a computing device of the DSN, wherein the computing device generates a plurality of task requests, wherein a task request of the plurality of task requests includes a set of sub-task requests and wherein the computing device sends corresponding sets of sub-task requests to the set of execution units when task requests of the plurality of task requests are generated;
   storing, by the set of execution units, the corresponding sets of sub-task requests, wherein each of a first, a second, and a third execution unit of the set of execution unit stores, respectively, a first, a second, and a third sub-task request of each of the corresponding sets of sub-task requests to produce, respectively, a first, a second, and a third plurality of sub-task requests;
   respectively generating first, second, and third sub-task estimation data for the first, the second, and the third plurality of sub-task requests by the first, the second, and the third execution units;
   determining, for each execution unit, an execution ready status for a selected sub-task request of the set of sub-task requests when each the set of execution units has resources available to process the selected sub-task request; and
   respectively adjusting timing, sequencing, or processing of the first, the second, and the third plurality of sub-task requests by the first, the second, and the third execution units based on the first, the second, and the third sub-task estimation data and a corresponding execution ready status, to produce a first, a second, and a third plurality of partial results, wherein, due to one or more difference factors from a list of difference factors, the first, the second, and the third execution units process the first, the second, and the third plurality of sub-task requests at difference paces, wherein the list of difference factors includes differences in amounts of data to be processed per sub-task request, processing capabilities, memory storage capabilities, and networking capabilities, and wherein at least one partial result of the first, second, and third plurality of partial results is based on dispersed error encoded data stored in the DSN.

2. The method of claim 1 further comprises:
   sending the first, the second, and the third plurality of partial results to the computing device, wherein the computing device compiles the first, the second, and the third plurality of partial results to produce a plurality of results.

3. The method of claim 1 further comprises:
   respectively storing the first, the second, and the third plurality of sub-task requests in first, second, and third holding queues by the first, the second, and the third execution units; and
   respectively transferring first, second, and third selected sub-task requests of the first, the second, and the third plurality of sub-task requests from the first, the second, and the third holding queues to first, second, and third execution queues prior to respectively executing the first, the second, and the third selected sub-task requests.

4. The method of claim 1 further comprises:
determining, by the first execution unit, the execution ready status for a first selected sub-task request of the first plurality of sub-task requests when the first execution unit has resources available to process the first selected sub-task request;
determining, by the first execution unit, an execution not ready status for the first selected sub-task request of the first plurality of sub-task requests when the first execution unit does not have the resources available to process the first selected sub-task request;
determining, by the second execution unit, the execution ready status for a second selected sub-task request of the second plurality of sub-task requests when the second execution unit has resources available to process the second selected sub-task request;
determining, by the second execution unit, an execution not ready status for the second selected sub-task request of the second plurality of sub-task requests when the second execution unit does not have the resources available to process the second selected sub-task request;
determining, by the third execution unit, the execution ready status for a third selected sub-task request of the third plurality of sub-task requests when the third execution unit has resources available to process the third selected sub-task request; and
determining, by the third execution unit, an execution not ready status for the third selected sub-task requests of the third plurality of sub-task requests when the third execution unit does not have the resources available to process the third selected sub-task request.

5. The method of claim 4 further comprises:
when a quorum of the first, the second, and the third execution units exists, wherein a quorum is reached when two of the first, the second, and the third selected sub-task requests have the execution ready status:
executing, by the quorum of the first, the second, and the third execution units, two of the first, the second, or the third selected sub-task requests to produce two of a first, a second, and a third partial results of the first, the second, and the third plurality of partial results.

6. The method of claim 5 further comprises:
for the first, the second, or the third execution unit not in the quorum of execution units, deleting the respective first, the second, and the third selected sub-task requests when the two of the first, the second, and the third partial results have been produced and the remaining one of the first, the second, and the third selected sub-task requests has the execution not ready status.

7. A non-transitory computer-readable storage medium comprises:
at least one memory section that stores operational instructions that, when executed by one or more processing modules of one or more computing devices of a dispersed storage network (DSN), causes the one or more computing devices to:
receive, over time and by a set of execution units of the DSN, a plurality of sets of sub-task requests from a computing device of the DSN, wherein the computing device generates a plurality of task requests, wherein a task request of the plurality of task requests includes a set of sub-task requests and wherein the computing device sends corresponding sets of sub-task requests to the set of execution units when task requests of the plurality of task requests are generated;
store, by the set of execution units, the corresponding sets of sub-task requests, wherein each of a first, a second, and a third execution unit of the set of execution unit stores, respectively, a first, a second, and a third sub-task request of each of the corresponding sets of sub-task requests to produce, respectively, a first, a second, and a third plurality of sub-task requests;
respectively generate first, second, and third sub-task estimation data for the first, the second, and the third plurality of sub-task requests by the first, the second, and the third execution units;
determine, for each execution unit, an execution ready status for a selected sub-task request of the set of sub-task requests when each the set of execution units has resources available to process the selected sub-task request; and
respectively adjust timing, sequencing, or processing of the first, the second, and the third plurality of sub-task requests by the first, the second, and the third execution units based on the first, the second, and the third sub-task estimation data and a corresponding execution ready status, to produce a first, a second, and a third plurality of partial results, wherein, due to one or more difference factors from a list of difference factors, the first, the second, and the third execution units process the first, the second, and the third plurality of sub-task requests at difference paces, wherein the list of difference factors includes differences in amounts of data to be processed per sub-task request, processing capabilities, memory storage capabilities, and networking capabilities, and wherein at least one partial result of the first, second, and third plurality of partial results is based on dispersed error encoded data stored in the DSN.

8. The non-transitory computer-readable storage medium of claim 7 further comprises:
the at least one memory section stores further operational instructions that, when executed by the one or more processing modules, causes the one or more computing devices of the DSN to:
send the first, the second, and the third plurality of partial results to the computing device, wherein the computing device compiles the first, the second, and the third plurality of partial results to produce a plurality of results.

9. The non-transitory computer-readable storage medium of claim 7 further comprises:
the at least one memory section stores further operational instructions that, when executed by the one or more processing modules, causes the one or more computing devices of the DSN to:
respectively store the first, the second, and the third plurality of sub-task requests in first, second, and third holding queues by the first, the second, and the third execution units; and
respectively transfer first, second, and third selected sub-task requests of the first, the second, and the third plurality of sub-task requests from the first, the second, and the third holding queues to first, second, and third execution queues prior to respectively executing the first, the second, and the third selected sub-task requests.

10. The non-transitory computer-readable storage medium of claim 7 further comprises:

the at least one memory section stores further operational instructions that, when executed by the one or more processing modules, causes the one or more computing devices of the DSN to:
determine, by the first execution unit, the execution ready status for a first selected sub-task request of the first plurality of sub-task requests when the first execution unit has resources available to process the first selected sub-task request;
determine, by the first execution unit, an execution not ready status for the first selected sub-task request of the first plurality of sub-task requests when the first execution unit does not have the resources available to process the first selected sub-task request;
determine, by the second execution unit, the execution ready status for a second selected sub-task request of the second plurality of sub-task requests when the second execution unit has resources available to process the second selected sub-task request;
determine, by the second execution unit, an execution not ready status for the second selected sub-task requests of the second plurality of sub-task requests when the second execution unit does not have the resources available to process the second selected sub-task request;
determine, by the third execution unit, the execution ready status for a third selected sub-task request of the third plurality of sub-task requests when the third execution unit has resources available to process the third selected sub-task request; and
determine, by the third execution unit, an execution not ready status for the third selected sub-task requests of the third plurality of sub-task requests when the third execution unit does not have the resources available to process the third selected sub-task request.

11. The non-transitory computer-readable storage medium of claim 10 further comprises:
the at least one memory section stores further operational instructions that, when executed by the one or more processing modules, causes the one or more computing devices of the DSN to:
when a quorum of the first, the second, and the third execution units exists, wherein a quorum is reached when two of the first, the second, and the third selected sub-task requests have the execution ready status:
execute, by the quorum of the first, the second, and the third execution units, two of the first, the second, or the third selected sub-task requests to produce two of a first, a second, and a third partial results of the first, the second, and the third plurality of partial results.

12. The non-transitory computer-readable storage medium of claim 11 further comprises:
the at least one memory section stores further operational instructions that, when executed by the one or more processing modules, causes the one or more computing devices of the DSN to:
for the first, the second, or the third execution unit not in the quorum of execution units, delete the respective first, the second, and the third selected sub-task requests when the two of the first, the second, and the third partial results have been produced and the remaining one of the first, the second, and the third selected sub-task requests has the execution not ready status.

13. An execution unit of a dispersed storage network (DSN), the execution unit comprises:
an interface;
a memory; and
a processing module operably coupled to the interface and the memory, wherein the processing module functions to:
receive, over time via the interface, a plurality of sub-task requests from a computing device of the DSN, wherein a plurality of sets of sub-task requests includes the plurality of sub-task requests, wherein the computing device generates a plurality of task requests, wherein a task request of the plurality of task requests includes a set of sub-task requests, wherein the computing device sends corresponding sets of sub-task requests to a set of execution units of the DSN when task requests of the plurality of task requests are generated and wherein the set of execution units includes the execution unit;
store, in the memory, a corresponding sub-task request of each of the corresponding sets of sub-task requests to produce the plurality of sub-task requests;
generate sub-task estimation data for the plurality of sub-task requests;
determine, for each execution unit, an execution ready status for a selected sub-task request of the set of sub-task requests when each the set of execution units has resources available to process the selected sub-task request; and
adjust timing, sequencing, or processing of the plurality of sub-task requests based on the sub-task estimation data and a corresponding execution ready status, to produce a plurality of partial results, wherein, due to one or more difference factors from a list of difference factors, the execution unit process the plurality of sub-task requests at difference paces, wherein the list of difference factors includes differences in amounts of data to be processed per sub-task request, processing capabilities, memory storage capabilities, and networking capabilities, and wherein at least one partial result of a first, second, and third plurality of the partial results is based on dispersed error encoded data stored in the DSN.

14. The execution unit of claim 13, wherein the processing module further functions to:
send, via the interface, the plurality of partial results to the computing device, wherein the computing device compiles the plurality of partial results to produce a plurality of results.

15. The execution unit of claim 13, wherein the processing module further functions to:
store the plurality of sub-task requests in a holding queue of the memory; and
transfer selected sub-task requests of the plurality of sub-task requests from the holding queue to an execution queue prior to executing the selected sub-task requests.

16. The execution unit of claim 13, wherein the processing module further functions to:
determine the execution ready status for a selected sub-task request of the plurality of sub-task requests when the execution unit has resources available to process the selected sub-task request; and
determine an execution not ready status for the selected sub-task request of the plurality of sub-task requests when the execution unit does not have the resources available to process the selected sub-task request.

17. The execution unit of claim 16, wherein the processing module further functions to:
when a quorum of the execution unit and another execution unit of the set of execution units exists, wherein a quorum is reached when the execution unit has the execution ready status for the selected sub-task request and the other execution has the execution ready status for a corresponding second selected sub-task request of the set of sub-task requests and wherein the set of sub-task requests includes the selected sub-task request and the second selected sub-task request:

execute the selected sub-task requests to produce a partial result of the plurality of partial results.

18. The execution unit of claim 17, wherein the processing module further functions to:

when another quorum is reached without inclusion of the execution unit, delete the selected sub-task request when other partial results have been produced and the selected sub-task requests has the execution not ready status.

* * * * *